United States Patent
Lee et al.

(10) Patent No.: US 12,322,982 B2
(45) Date of Patent: Jun. 3, 2025

(54) METHOD AND DEVICE FOR CONTROLLING POWER OF MULTIPLE DEVICES IN WIRELESS POWER TRANSMISSION SYSTEM

(71) Applicant: LG Electronics Inc., Seoul (KR)

(72) Inventors: Minsoo Lee, Seoul (KR); Gyunghwan Yook, Seoul (KR); Jinho Youn, Seoul (KR); Taewook Kwon, Seoul (KR); Yongcheol Park, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 18/280,375

(22) PCT Filed: Mar. 3, 2022

(86) PCT No.: PCT/KR2022/003018
§ 371 (c)(1),
(2) Date: Sep. 5, 2023

(87) PCT Pub. No.: WO2022/186631
PCT Pub. Date: Sep. 9, 2022

(65) Prior Publication Data
US 2024/0055904 A1  Feb. 15, 2024

(30) Foreign Application Priority Data
Mar. 3, 2021  (KR) .......... 10-2021-0028333

(51) Int. Cl.
*H02J 50/40*  (2016.01)
*H02J 50/80*  (2016.01)
*H02J 7/00*  (2006.01)

(52) U.S. Cl.
CPC .......... *H02J 50/40* (2016.02); *H02J 50/80* (2016.02); *H02J 7/00034* (2020.01)

(58) Field of Classification Search
CPC ........ H02J 50/40; H02J 50/80; H02J 7/00034; H02J 7/00
See application file for complete search history.

(56) References Cited

U.S. PATENT DOCUMENTS 10,581,491 B2 *  3/2020  Won .................. H02J 50/90

\* cited by examiner

*Primary Examiner* — Robert L Deberadinis
(74) *Attorney, Agent, or Firm* — Fish & Richardson P.C.

(57) ABSTRACT

Provided are: a method for establishing out-band communication performed by a wireless power transmitter in a wireless power transmission system; and a device for using same. The method comprises the steps of: transmitting a plurality of pieces of capability information to a plurality of wireless power receivers respectively through in-band communication, wherein each of the plurality of pieces of capability information includes information about whether the wireless power transmitter supports the out-band communication; establishing the out-band communication with the plurality of wireless power transmitters on the basis of the transmission of the plurality of pieces of capability information; and exchanging power control information pertaining to the plurality of wireless power receivers with the plurality of wireless power receivers through the out-band communication.

18 Claims, 38 Drawing Sheets

|  | b7 | b6 | b5 | b4 | b3 | b2 | b1 | b0 |
|---|---|---|---|---|---|---|---|---|
| Byte 0 | Application Profile ||||||||
| Byte 1 | Version ||||||||
| Byte 2-N-1 | Profile-specific data ||||||||

|       | b7   | b6  | b5       | b4 | b3   | b2    | b1 | b0  |
|-------|------|-----|----------|----|------|-------|-----|-----|
| B0    | '00' |     | Reference Power ||||||
| B1    | Reserved ||||||||
| B2    | ZERO | AI  | Reserved | OB | ZERO | Count |||
| B3    | Window Size |||| Window Offset ||||
| B4    | Neg  | Pol | Depth    || Buffer Size ||| Dup |

|  | $b_7$ | $b_6$ | $b_5$ | $b_4$ | $b_3$ | $b_2$ | $b_1$ | $b_0$ |
|---|---|---|---|---|---|---|---|---|
| $B_0$ | Reserved | | Negotiable Load Power | | | | | |
| $B_1$ | Reserved | | Potential Load Power | | | | | |
| $B_2$ | Dup | AR | OB | Buffer Size | | | WPID | NRS |

FIG. 23
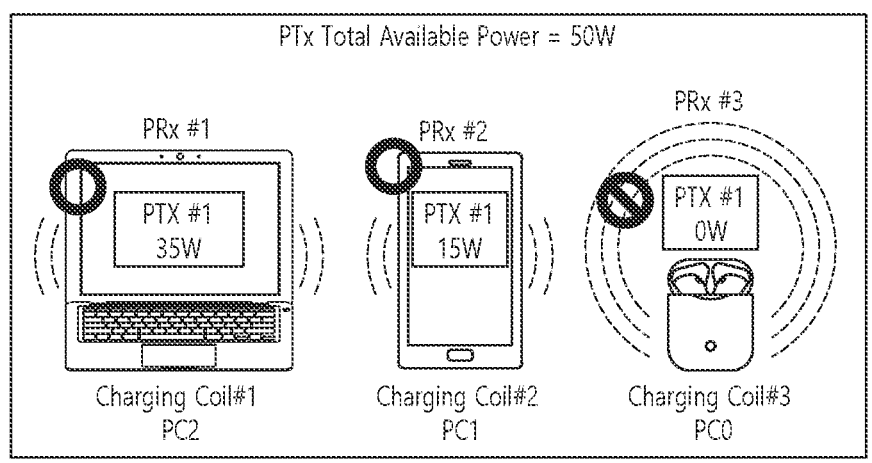
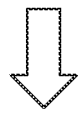
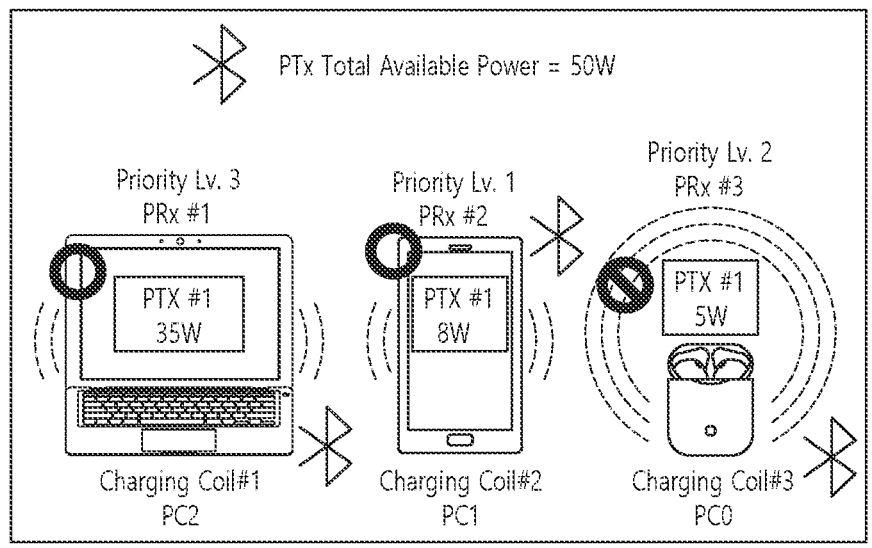

FIG. 28

Power Configuration Control Point Data by BLE OOB

| #PTX | Properties | Value |
|---|---|---|
| 1_pad1 | • Power Class via OOB<br>• Mis-alignment<br>• FOD<br>• Power Transfer Enable<br>• Guaranteed Power<br>• PTx Power Transfer Priority | • PC1<br>• No<br>• No<br>• Yes<br>• 35W<br>• Level 3 |
| 1_pad2 | • Power Class via OOB<br>• Mis-alignment<br>• FOD<br>• Power Transfer Enable<br>• Guaranteed Power<br>• PTx Power Transfer Priority | • PC1<br>• No<br>• No<br>• Yes<br>• 8W<br>• Level 1 |
| 2_pda3 | • Power Class via OOB<br>• Mis-alignment<br>• FOD<br>• Power Transfer Enable<br>• Guaranteed Power<br>• PRx Power Transfer Priority | • PC0<br>• No<br>• No<br>• No<br>• 5W<br>• Level 2 |

FIG. 29

|  | $b_7$ | $b_6$ | $b_5$ | $b_4$ | $b_3$ | $b_2$ | $b_1$ | $b_0$ |
|---|---|---|---|---|---|---|---|---|
| $B_0$ | '00' | | Reference Power | | | | | |
| $B_1$ | Power Transfer Priority | | | | | | | |
| $B_2$ | ZERO | AI | Reserved | OB | ZERO | Count | | |
| $B_3$ | Window Size | | | | Window Offset | | | |
| $B_4$ | Neg | Pol | Depth | | Buffer Size | | | Dup |

FIG. 31

Before Power Negotiation

| #PTX | Properties | Value |
|---|---|---|
| 1_pad1 ○ | • Device ID/Type<br>• Power Class via OOB<br>• Mis-alignment<br>• FOD<br>• Power Transfer Enable<br>• Guaranteed Power<br>• PTx Power Transfer Priority | • LG/Laptop/gram<br>• PC1<br>• No<br>• No<br>• Yes<br>• 35W<br>• Level 1 |
| 1_pad2 ○ | • Device ID/Type<br>• Power Class via OOB<br>• Mis-alignment<br>• FOD<br>• Power Transfer Enable<br>• Guaranteed Power<br>• PTx Power Transfer Priority | • LG/Phone/V50s<br>• PC1<br>• No<br>• No<br>• Yes<br>• 15W<br>• Level 2 |
| 2_pda3 ⊘ | • Device ID/Type<br>• Power Class via OOB<br>• Mis-alignment<br>• FOD<br>• Power Transfer Enable<br>• Guaranteed Power<br>• PRx Power Transfer Priority | • LG/Earbuds/Tone<br>• Free<br>• PC0<br>• No<br>• Yes<br>• 0W<br>• Level 1 |

PTx sets charging priority based on SoC
ex. phone
  > earbuds
  > laptop

After Power Negotiation (by BLE OOB)

| #PTX | Properties | Value |
|---|---|---|
| 1_pad1 ○ | • Device ID/Type<br>• Power Class via OOB<br>• Mis-alignment<br>• FOD<br>• Power Transfer Enable<br>• Guaranteed Power<br>• PTx Power Transfer Priority | • LG/Laptop/gram<br>• PC1<br>• No<br>• No<br>• Yes<br>• 30W<br>• Level 1 |
| 1_pad2 ○ | • Device ID/Type<br>• Power Class via OOB<br>• Mis-alignment<br>• FOD<br>• Power Transfer Enable<br>• Guaranteed Power<br>• PTx Power Transfer Priority | • LG/Phone/V50s<br>• PC1<br>• No<br>• No<br>• Yes<br>• 15W<br>• Level 3 |
| 2_pda3 ○ | • Device ID/Type<br>• Power Class via OOB<br>• Mis-alignment<br>• FOD<br>• Power Transfer Enable<br>• Guaranteed Power<br>• PRx Power Transfer Priority | • LG/Earbuds/Tone<br>• Free<br>• PC0<br>• No<br>• Yes<br>• 5W<br>• Level 2 |

FIG. 33

| #PTX | Before Negotiation | | After Negotiation | |
|---|---|---|---|---|
| | Guaranteed Power | Power Ratio to Total PRx(s) Power | Guaranteed Power | Power Ratio to Total PRx(s) Power |
| 1_pad1 | 30W | 50% | 15W | 50% |
| 1_pad2 | 20W | 33% | 10W | 33% |
| 2_pad3 | 10W | 17% | 5W | 17% |

FIG. 34

Before Power Negotiation

| #PTX | Properties | Value |
|---|---|---|
| 1_pad1 ⊙ | • Device ID/Type<br>• Power Class via OOB<br>• Mis-alignment<br>• FOD<br>• Power Transfer Enable<br>• Guaranteed Power<br>• PTx Power Transfer Priority | • LG/Laptop/gram<br>• PC1<br>• No<br>• No<br>• Yes<br>• 30W<br>• Level 3 |
| 1_pad2 ⊙ | • Device ID/Type<br>• Power Class via OOB<br>• Mis-alignment<br>• FOD<br>• Power Transfer Enable<br>• Guaranteed Power<br>• PTx Power Transfer Priority | • LG/Phone/V50s<br>• PC1<br>• No<br>• No<br>• Yes<br>• 20W<br>• Level 3 |
| 2_pda3 ⊘ | • Device ID/Type<br>• Power Class via OOB<br>• Mis-alignment<br>• FOD<br>• Power Transfer Enable<br>• Guaranteed Power<br>• PRx Power Transfer Priority | • LG/Earbuds/Tone<br>• Free<br>• PC0<br>• No<br>• Yes<br>• 10W(Cannot charging)<br>• Level 3 |

PTx (re)allocates power according to the ratio requested by PRx ⇒

After Power Negotiation (by BLE OOB)

| #PTX | Properties | Value |
|---|---|---|
| 1_pad1 ⊙ | • Device ID/Type<br>• Power Class via OOB<br>• Mis-alignment<br>• FOD<br>• Power Transfer Enable<br>• Guaranteed Power<br>• PTx Power Transfer Priority | • LG/Laptop/gram<br>• PC1<br>• No<br>• No<br>• Yes<br>• 15W<br>• Level 1 |
| 1_pad2 ⊙ | • Device ID/Type<br>• Power Class via OOB<br>• Mis-alignment<br>• FOD<br>• Power Transfer Enable<br>• Guaranteed Power<br>• PTx Power Transfer Priority | • LG/Phone/V50s<br>• PC1<br>• No<br>• No<br>• Yes<br>• 10W<br>• Level 1 |
| 2_pda3 ⊙ | • Device ID/Type<br>• Power Class via OOB<br>• Mis-alignment<br>• FOD<br>• Power Transfer Enable<br>• Guaranteed Power<br>• PRx Power Transfer Priority | • LG/Earbuds/Tone<br>• Free<br>• PC0<br>• No<br>• No<br>• Yes<br>• 5W<br>• Level 2 |

FIG. 40

| #PTX | Properties | Value |
|---|---|---|
| 1_pad1 | • PTx Coil Number<br>• SIG(Signal Strength)<br>• ID (PRx Device & Manufacturer ID)<br>• Guaranteed Power<br>• PRx Power Transfer Priority | • 1<br>• 220<br>• LG gram<br>• 35W<br>• Level 3 |
| 1_pad2 | • PTx Coil Number<br>• SIG(Signal Strength)<br>• ID (PRx Device & Manufacturer ID)<br>• Guaranteed Power<br>• PRx Power Transfer Priority | • 1<br>• 200<br>• LG Velvet<br>• 8W<br>• Level 1 |
| 2_pda3 | • PTx Coil Number<br>• SIG(Signal Strength)<br>• ID (PRx Device & Manufacturer ID)<br>• Guaranteed Power<br>• PRx Power Transfer Priority | • 1<br>• N/A<br>• N/A<br>• 5W<br>• N/A |

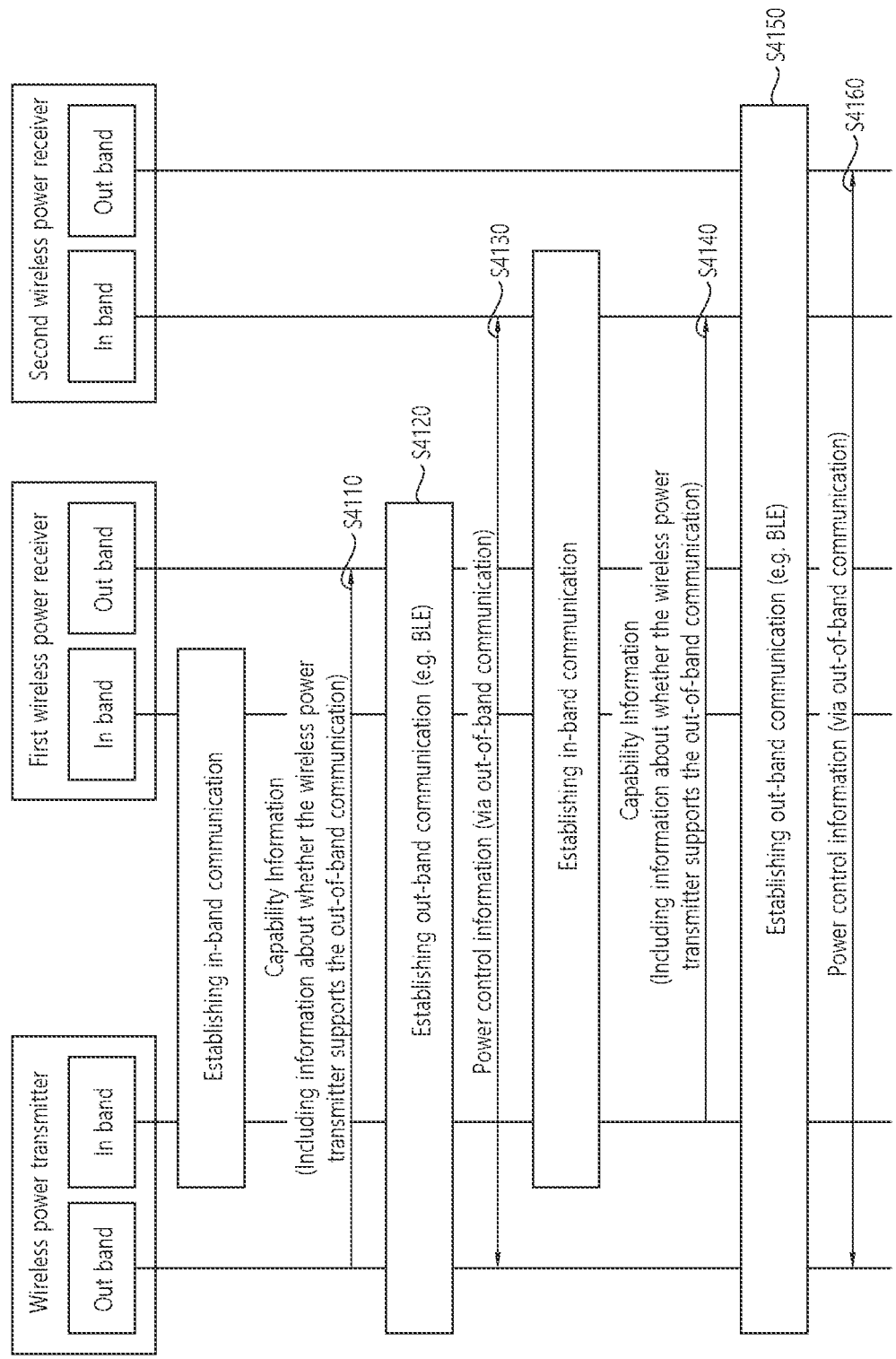

METHOD AND DEVICE FOR CONTROLLING POWER OF MULTIPLE DEVICES IN WIRELESS POWER TRANSMISSION SYSTEM

CROSS-REFERENCE TO RELATED APPLICATIONS

This application is a National Stage application under 35 U.S.C. § 371 of International Application No. PCT/KR2022/003018, filed on Mar. 3, 2022, which claims the benefit of Korean Patent Application No. 10-2021-0028333, filed on Mar. 3, 2021. The disclosures of the prior applications are incorporated by reference in their entirety.

TECHNICAL FIELD

This specification relates to wireless power transfer.

BACKGROUND ART

The wireless power transfer (or transmission) technology corresponds to a technology that may wirelessly transfer (or transmit) power between a power source and an electronic device. For example, by allowing the battery of a wireless device, such as a smartphone or a tablet PC, and so on, to be recharged by simply loading the wireless device on a wireless charging pad, the wireless power transfer technique may provide more outstanding mobility, convenience, and safety as compared to the conventional wired charging environment, which uses a wired charging connector. Apart from the wireless charging of wireless devices, the wireless power transfer technique is raising attention as a replacement for the conventional wired power transfer environment in diverse fields, such as electric vehicles, Bluetooth earphones, 3D glasses, diverse wearable devices, household (or home) electric appliances, furniture, underground facilities, buildings, medical equipment, robots, leisure, and so on.

The wireless power transfer (or transmission) method is also referred to as a contactless power transfer method, or a no point of contact power transfer method, or a wireless charging method. A wireless power transfer system may be configured of a wireless power transmitter supplying electric energy by using a wireless power transfer method, and a wireless power receiver receiving the electric energy being supplied by the wireless power transmitter and supplying the receiving electric energy to a receiver, such as a battery cell, and so on.

The wireless power transfer technique includes diverse methods, such as a method of transferring power by using magnetic coupling, a method of transferring power by using radio frequency (RF), a method of transferring power by using microwaves, and a method of transferring power by using ultrasound (or ultrasonic waves). The method that is based on magnetic coupling is categorized as a magnetic induction method and a magnetic resonance method. The magnetic induction method corresponds to a method transmitting power by using electric currents that are induced to the coil of the receiver by a magnetic field, which is generated from a coil battery cell of the transmitter, in accordance with an electromagnetic coupling between a transmitting coil and a receiving coil. The magnetic resonance method is similar to the magnetic induction method in that is uses a magnetic field. However, the magnetic resonance method is different from the magnetic induction method in that energy is transmitted due to a concentration of magnetic fields on both a transmitting end and a receiving end, which is caused by the generated resonance.

Meanwhile, in wireless charging, the aim is to provide a method for one-to-many, many-to-one, and many-to-many communication between a wireless power transmitter and a wireless power receiver, and a device using the same.

SUMMARY

According to an embodiment of the present specification, a method and apparatus establishing out-of-band communication with a plurality of wireless power receivers and exchanging power control information for the plurality of wireless power receivers with a plurality of wireless power receivers through out-of-band communication may be provided.

According to the present specification, multiple devices within an effective charging range can dynamically manage charging power through rapid and safe message exchange. In addition, one or multiple devices can safely and quickly determine the wireless charging status of each other and manage the wireless charging status safely and quickly.

Effects obtainable through specific examples of the present specification are not limited to the effects listed above. For example, there may be various technical effects that a person having ordinary skill in the related art can understand or derive from this specification. Accordingly, the specific effects of the present specification are not limited to those explicitly described in the present specification, and may include various effects that can be understood or derived from the technical features of the present specification.

BRIEF DESCRIPTION OF THE DRAWINGS

FIG. 23 shows an example of a schematic comparison between the existing technology and the proposed technology from the perspective of priority-based power negotiation/allocation.

FIGS. 27 and 28 schematically illustrate examples of differential power negotiation and/or power allocation, and examples of data according to these examples.

FIG. 29 shows an example of a Qi packet to which information about negotiation priority is added.

FIGS. 31 and 32 schematically show an example of charging priority allocation based on the device type of the wireless power receiver.

FIG. 33 shows an example of power allocation when the total available power of the wireless power transmitter is 50 W.

FIGS. 34 and 35 schematically show examples of power allocation based on the requested power of the wireless power receiver.

FIGS. 39 and 40 schematically show a conceptual diagram of a wireless power transmitter receiving data for coil selection from at least one wireless power receiver and an example of data for coil selection.

FIG. 41 is a flowchart of a method for establishing out-of-band communication in a wireless power transmission system, according to another embodiment of the present specification.

MODE

In this specification, "A or B" may refer to "only A", "only B" or "both A and B". In other words, "A or B" in this specification may be interpreted as "A and/or B". For example, in this specification, "A, B. or C" may refer to "only A", "only B", "only C", or any combination of "A, B and C".

The slash (/) or comma used in this specification may refer to "and/or". For example, "A/B" may refer to "A and/or B". Accordingly, "A/B" may refer to "only A", "only B", or "both A and B". For example, "A, B, C" may refer to "A, B, or C".

In this specification, "at least one of A and B" may refer to "only A", "only B", or "both A and B". In addition, in this specification, the expression of "at least one of A or B" or "at least one of A and/or B" may be interpreted to be the same as "at least one of A and B".

Also, in this specification, "at least one of A. B and C" may refer to "only A", "only B", "only C", or "any combination of A. B and C". Also, "at least one of A, B or C" or "at least one of A, B and/or C" may refer to "at least one of A, B and C".

In addition, parentheses used in the present specification may refer to "for example". Specifically, when indicated as "control information (PDCCH)", "PDCCH" may be proposed as an example of "control information". In other words, "control information" in this specification is not limited to "PDCCH", and "PDCCH" may be proposed as an example of "control information". In addition, even when indicated as "control information (i.e., PDCCH)", "PDCCH" may be proposed as an example of "control information".

In the present specification, technical features that are individually described in one drawing may be individually or simultaneously implemented. The term "wireless power", which will hereinafter be used in this specification, will be used to refer to an arbitrary form of energy that is related to an electric field, a magnetic field, and an electromagnetic field, which is transferred (or transmitted) from a wireless power transmitter to a wireless power receiver without using any physical electromagnetic conductors. The wireless power may also be referred to as a wireless power signal, and this may refer to an oscillating magnetic flux that is enclosed by a primary coil and a secondary coil. For example, power conversion for wirelessly charging devices including mobile phones, cordless phones, iPods, MP3 players, headsets, and so on, within the system will be described in this specification. Generally, the basic principle of the wireless power transfer technique includes, for example, all of a method of transferring power by using magnetic coupling, a method of transferring power by using radio frequency (RF), a method of transferring power by using microwaves, and a method of transferring power by using ultrasound (or ultrasonic waves).

Figure 1:
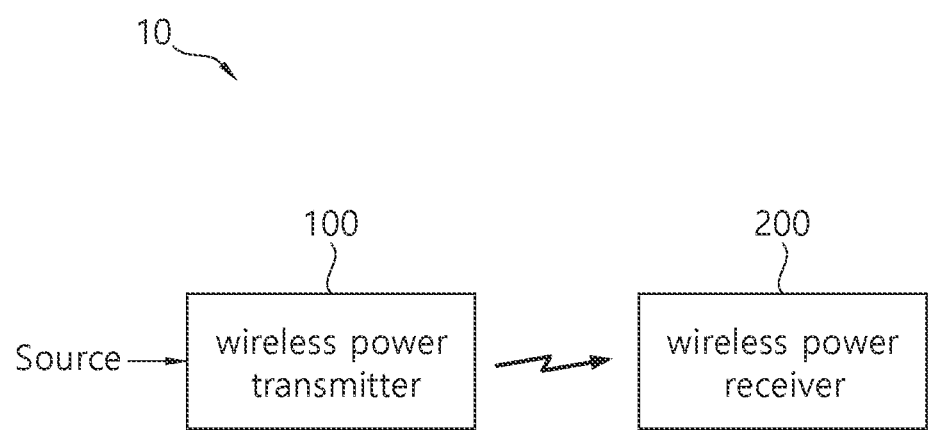
FIG. 1 is a block diagram of a wireless power system (10) according to an exemplary embodiment of the present disclosure.

FIG. 1 is a block diagram of a wireless power system (10) according to an exemplary embodiment of the present disclosure.

Referring to FIG. 1, the wireless power system (10) include a wireless power transmitter (100) and a wireless power receiver (200).

The wireless power transmitter (100) is supplied with power from an external power source (S) and generates a magnetic field. The wireless power receiver (200) generates electric currents by using the generated magnetic field, thereby being capable of wirelessly receiving power.

Additionally, in the wireless power system (10), the wireless power transmitter (100) and the wireless power receiver (200) may transceive (transmit and/or receive) diverse information that is required for the wireless power transfer. Herein, communication between the wireless power transmitter (100) and the wireless power receiver (200) may be performed (or established) in accordance with any one of an in-band communication, which uses a magnetic field that is used for the wireless power transfer (or transmission), and an out-band communication, which uses a separate communication carrier. Out-band communication may also be referred to as out-of-band communication. Hereinafter, out-band communication will be largely described. Examples of out-band communication may include NFC, Bluetooth, Bluetooth low energy (BLE), and the like.

Herein, the wireless power transmitter (100) may be provided as a fixed type or a mobile (or portable) type. Examples of the fixed transmitter type may include an embedded type, which is embedded in in-door ceilings or wall surfaces or embedded in furniture, such as tables, an implanted type, which is installed in out-door parking lots, bus stops, subway stations, and so on, or being installed in means of transportation, such as vehicles or trains. The mobile (or portable) type wireless power transmitter (100) may be implemented as a part of another device, such as a mobile device having a portable size or weight or a cover of a laptop computer, and so on.

Additionally, the wireless power receiver (200) should be interpreted as a comprehensive concept including diverse home appliances and devices that are operated by being wirelessly supplied with power instead of diverse electronic devices being equipped with a battery and a power cable. Typical examples of the wireless power receiver (200) may include portable terminals, cellular phones, smartphones, personal digital assistants (PDAs), portable media players (PDPs), Wibro terminals, tablet PCs, phablet, laptop computers, digital cameras, navigation terminals, television, electronic vehicles (EVs), and so on.

Figure 2:
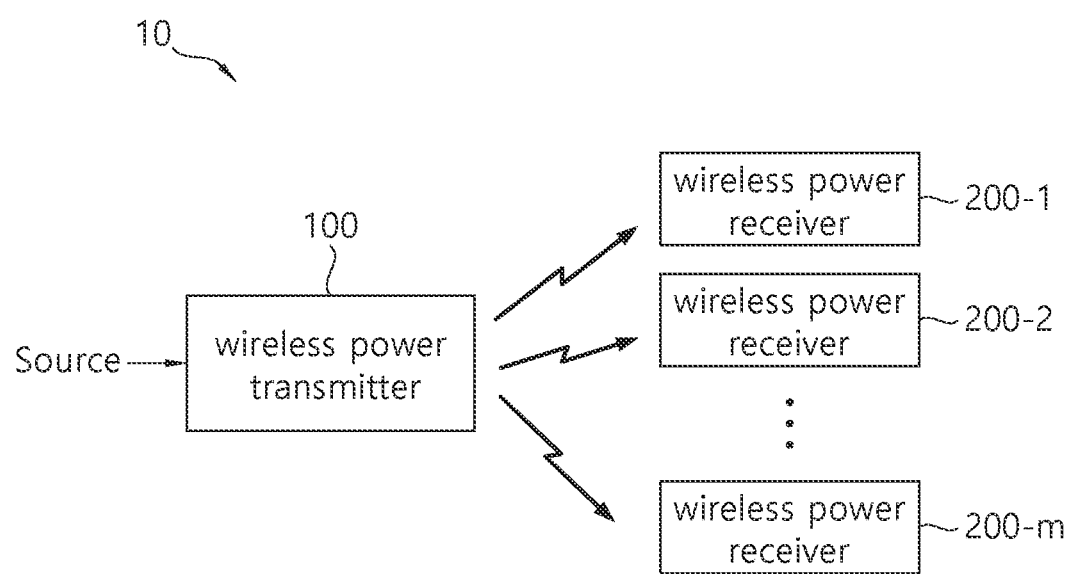
FIG. 2 is a block diagram of a wireless power system (10) according to another exemplary embodiment of the present disclosure.

FIG. 2 is a block diagram of a wireless power system (10) according to another exemplary embodiment of the present disclosure.

Referring to FIG. 2, in the wireless power system (10), one wireless power receiver (200) or a plurality of wireless power receivers may exist. Although it is shown in FIG. 1 that the wireless power transmitter (100) and the wireless power receiver (200) send and receive power to and from one another in a one-to-one correspondence (or relationship), as shown in FIG. 2, it is also possible for one wireless power transmitter (100) to simultaneously transfer power to multiple wireless power receivers (200-1, 200-2, . . . , 200-M). Most particularly, in case the wireless power transfer (or transmission) is performed by using a magnetic resonance method, one wireless power transmitter (100) may transfer power to multiple wireless power receivers (200-1, 200-2, . . . , 200-M) by using a synchronized transport (or transfer) method or a time-division transport (or transfer) method.

Additionally, although it is shown in FIG. 1 that the wireless power transmitter (100) directly transfers (or transmits) power to the wireless power receiver (200), the wireless power system (10) may also be equipped with a separate wireless power transceiver, such as a relay or repeater, for increasing a wireless power transport distance between the wireless power transmitter (100) and the wireless power receiver (200). In this case, power is delivered to the wireless power transceiver from the wireless power transmitter (100), and, then, the wireless power transceiver may transfer the received power to the wireless power receiver (200).

Hereinafter, the terms wireless power receiver, power receiver, and receiver, which are mentioned in this specification, will refer to the wireless power receiver (200). Also, the terms wireless power transmitter, power transmitter, and transmitter, which are mentioned in this specification, will refer to the wireless power transmitter (100).

Figures 3, 4:
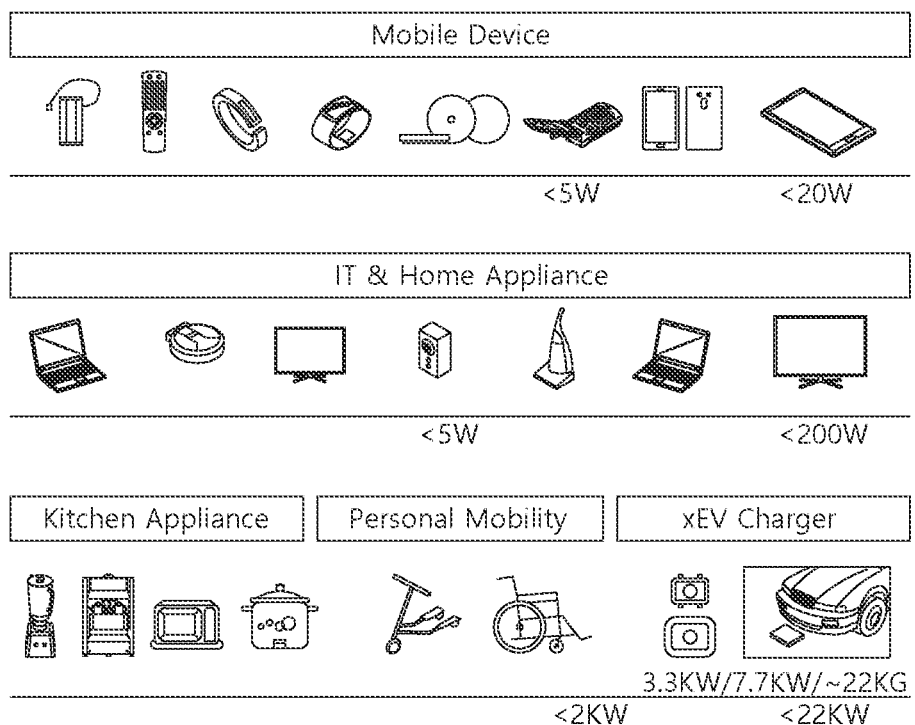
FIG. 3 shows an exemplary embodiment of diverse electronic devices adopting a wireless power transfer system.
FIG. 4 shows an example of a WPC NDEF in a wireless power transfer system.

FIG. 3 shows an exemplary embodiment of diverse electronic devices adopting a wireless power transfer system.

As shown in FIG. 3, the electronic devices included in the wireless power transfer system are sorted in accordance with the amount of transmitted power and the amount of received power. Referring to FIG. 3, wearable devices, such as smart watches, smart glasses, head mounted displays (HMDs), smart rings, and so on, and mobile electronic devices (or portable electronic devices), such as earphones, remote controllers, smartphones, PDAs, tablet PCs, and so on, may adopt a low-power (approximately 5 W or less or approximately 20 W or less) wireless charging method.

Small-sized/Mid-sized electronic devices, such as laptop computers, robot vacuum cleaners, TV receivers, audio devices, vacuum cleaners, monitors, and so on, may adopt a mid-power (approximately 50 W or less or approximately 200 W or less) wireless charging method. Kitchen appliances, such as mixers, microwave ovens, electric rice cookers, and so on, and personal transportation devices (or other electric devices or means of transportation), such as powered wheelchairs, powered kick scooters, powered bicycles, electric cars, and so on may adopt a high-power (approximately 2 kW or less or approximately 22 kW or less) wireless charging method.

The electric devices or means of transportation, which are described above (or shown in FIG. 1) may each include a wireless power receiver, which will hereinafter be described in detail. Therefore, the above-described electric devices or means of transportation may be charged (or recharged) by wirelessly receiving power from a wireless power transmitter.

Hereinafter, although the present disclosure will be described based on a mobile device adopting the wireless power charging method, this is merely exemplary. And, therefore, it shall be understood that the wireless charging method according to the present disclosure may be applied to diverse electronic devices.

A standard for the wireless power transfer (or transmission) includes a wireless power consortium (WPC), an air fuel alliance (AFA), and a power matters alliance (PMA).

The WPC standard defines a baseline power profile (BPP) and an extended power profile (EPP). The BPP is related to a wireless power transmitter and a wireless power receiver supporting a power transfer of 5 W, and the EPP is related to a wireless power transmitter and a wireless power receiver supporting the transfer of a power range greater than 5 W and less than 30 W.

Diverse wireless power transmitters and wireless power receivers each using a different power level may be covered by each standard and may be sorted by different power classes or categories.

For example, the WPC may categorize (or sort) the wireless power transmitters and the wireless power receivers as PC-1, PC0, PC1, and PC2, and the WPC may provide a standard document (or specification) for each power class (PC). The PC-1 standard relates to wireless power transmitters and receivers providing a guaranteed power of less than 5 W. The application of PC-1 includes wearable devices, such as smart watches.

The PC0 standard relates to wireless power transmitters and receivers providing a guaranteed power of 5 W. The PC0 standard includes an EPP having a guaranteed power ranges that extends to 30 W. Although in-band (IB) communication corresponds to a mandatory communication protocol of PC0, out-of-band (OB) communication that is used as an optional backup channel may also be used for PC0. The wireless power receiver may be identified by setting up an OB flag, which indicates whether or not the OB is supported, within a configuration packet. A wireless power transmitter supporting the OB may enter an OB handover phase by transmitting a bit-pattern for an OB handover as a response to the configuration packet. The response to the configuration packet may correspond to an NAK, an ND, or an 8-bit pattern that is newly defined. The application of the PC0 includes smartphones.

The PC1 standard relates to wireless power transmitters and receivers providing a guaranteed power ranging from 30 W to 150 W. OB corresponds to a mandatory communication channel for PC1, and IB is used for initialization and link establishment to OB. The wireless power transmitter may enter an OB handover phase by transmitting a bit-pattern for an OB handover as a response to the configuration packet. The application of the PC1 includes laptop computers or power tools.

The PC2 standard relates to wireless power transmitters and receivers providing a guaranteed power ranging from 200 W to 2 kW, and its application includes kitchen appliances.

As described above, the PCs may be differentiated in accordance with the respective power levels. And, information on whether or not the compatibility between the same PCs is supported may be optional or mandatory. Herein, the compatibility between the same PCs indicates that power transfer/reception between the same PCs is possible. For example, in case a wireless power transmitter corresponding to PC x is capable of performing charging of a wireless power receiver having the same PC x, it may be understood that compatibility is maintained between the same PCs. Similarly, compatibility between different PCs may also be supported. Herein, the compatibility between different PCs indicates that power transfer/reception between different PCs is also possible. For example, in case a wireless power transmitter corresponding to PC x is capable of performing charging of a wireless power receiver having PC y, it may be understood that compatibility is maintained between the different PCs.

The support of compatibility between PCs corresponds to an extremely important issue in the aspect of user experience and establishment of infrastructure. Herein, however, diverse problems, which will be described below, exist in maintaining the compatibility between PCs.

In case of the compatibility between the same PCs, for example, in case of a wireless power receiver using a lap-top charging method, wherein stable charging is possible only when power is continuously transferred, even if its respective wireless power transmitter has the same PC, it may be difficult for the corresponding wireless power receiver to stably receive power from a wireless power transmitter of the power tool method, which transfers power non-continuously. Additionally, in case of the compatibility between different PCs, for example, in case a wireless power transmitter having a minimum guaranteed power of 200 W transfers power to a wireless power receiver having a maximum guaranteed power of 5 W, the corresponding wireless power receiver may be damaged due to an overvoltage. As a result, it may be inappropriate (or difficult) to use the PS as an index/reference standard representing/indicating the compatibility.

Wireless power transmitters and receivers may provide a very convenient user experience and interface (UX/UI). That is, a smart wireless charging service may be provided, and the smart wireless charging service may be implemented based on a UX/UI of a smartphone including a wireless power transmitter. For these applications, an interface between a processor of a smartphone and a wireless charging receiver allows for "drop and play" two-way communication between the wireless power transmitter and the wireless power receiver.

Hereinafter, 'profiles' will be newly defined based on indexes/reference standards representing/indicating the compatibility. More specifically, it may be understood that by maintaining compatibility between wireless power transmitters and receivers having the same 'profile', stable power transfer/reception may be performed, and that power transfer/reception between wireless power transmitters and receivers having different 'profiles' cannot be performed. The 'profiles' may be defined in accordance with whether or not compatibility is possible and/or the application regardless of (or independent from) the power class.

For example, the profile may be sorted into 3 different categories, such as i) Mobile, ii) Power tool and iii) Kitchen.

For another example, the profile may be sorted into 4 different categories, such as i) Mobile, ii) Power tool, iii) Kitchen, and iv) Wearable.

In case of the 'Mobile' profile, the PC may be defined as PC0 and/or PC1, the communication protocol/method may be defined as IB and OB communication, and the operation frequency may be defined as 87 to 205 kHz, and smartphones, laptop computers, and so on, may exist as the exemplary application.

In case of the 'Power tool' profile, the PC may be defined as PC1, the communication protocol/method may be defined as IB communication, and the operation frequency may be defined as 87 to 145 kHz, and power tools, and so on, may exist as the exemplary application.

In case of the 'Kitchen' profile, the PC may be defined as PC2, the communication protocol/method may be defined as NFC-based communication, and the operation frequency may be defined as less than 100 kHz, and kitchen/home appliances, and so on, may exist as the exemplary application.

In the case of power tools and kitchen profiles, NFC communication may be used between the wireless power transmitter and the wireless power receiver. The wireless power transmitter and the wireless power receiver may confirm that they are NFC devices with each other by exchanging WPC NFC data exchange profile format (NDEF).

FIG. 4 shows an example of a WPC NDEF in a wireless power transfer system.

Referring to FIG. 4, the WPC NDEF may include, for example, an application profile field (e.g., 1B), a version field (e.g., 1B), and profile specific data (e.g., 1B). The application profile field indicates whether the corresponding device is i) mobile and computing, ii) power tool, and iii) kitchen, and an upper nibble in the version field indicates a major version and a lower nibble indicates a minor version. In addition, profile-specific data defines content for the kitchen.

In case of the 'Wearable' profile, the PC may be defined as PC-1, the communication protocol/method may be defined as IB communication, and the operation frequency may be defined as 87 to 205 kHz, and wearable devices that are worn by the users, and so on, may exist as the exemplary application.

It may be mandatory to maintain compatibility between the same profiles, and it may be optional to maintain compatibility between different profiles.

The above-described profiles (Mobile profile, Power tool profile, Kitchen profile, and Wearable profile) may be generalized and expressed as first to nth profile, and a new profile may be added/replaced in accordance with the WPC standard and the exemplary embodiment.

In case the profile is defined as described above, the wireless power transmitter may optionally perform power transfer only to the wireless power receiving corresponding to the same profile as the wireless power transmitter, thereby being capable of performing a more stable power transfer. Additionally, since the load (or burden) of the wireless power transmitter may be reduced and power transfer is not attempted to a wireless power receiver for which compatibility is not possible, the risk of damage in the wireless power receiver may be reduced.

PC1 of the 'Mobile' profile may be defined by being derived from an optional extension, such as OB, based on PC0. And, the 'Power tool' profile may be defined as a simply modified version of the PC1 'Mobile' profile. Additionally, up until now, although the profiles have been defined for the purpose of maintaining compatibility between the same profiles, in the future, the technology may be evolved to a level of maintaining compatibility between different profiles. The wireless power transmitter or the wireless power receiver may notify (or announce) its profile to its counterpart by using diverse methods.

In the AFA standard, the wireless power transmitter is referred to as a power transmitting unit (PTU), and the wireless power receiver is referred to as a power receiving unit (PRU). And, the PTU is categorized to multiple classes, as shown in Table 1, and the PRU is categorized to multiple classes, as shown in Table 2.

TABLE 1

| PTU | $P_{TX\_IN\_MAX}$ | Minimum category support requirement | Minimum value for a maximum number of supported devices |
|---|---|---|---|
| Class 1 | 2 W | 1x Category 1 | 1x Category 1 |
| Class 2 | 10 W | 1x Category 3 | 2x Category 2 |
| Class 3 | 16 W | 1x Category 4 | 2x Category 3 |

TABLE 1-continued

| PTU | $P_{TX\_IN\_MAX}$ | Minimum category support requirement | Minimum value for a maximum number of supported devices |
|---|---|---|---|
| Class 4 | 33 W | 1x Category 5 | 3x Category 3 |
| Class 5 | 50 W | 1x Category 6 | 4x Category 3 |
| Class 6 | 70 W | 1x Category 7 | 5x Category 3 |

TABLE 2

| PRU | $P_{RX\_OUT\_MAX}$ | Exemplary application |
|---|---|---|
| Category 1 | TBD | Bluetooth headset |
| Category 2 | 3.5 W | Feature phone |
| Category 3 | 6.5 W | Smartphone |
| Category 4 | 13 W | Tablet PC. Phablet |
| Category 5 | 25 W | Small form factor laptop |
| Category 6 | 37.5 W | General laptop |
| Category 7 | 50 W | Home appliance |

Figure 5:
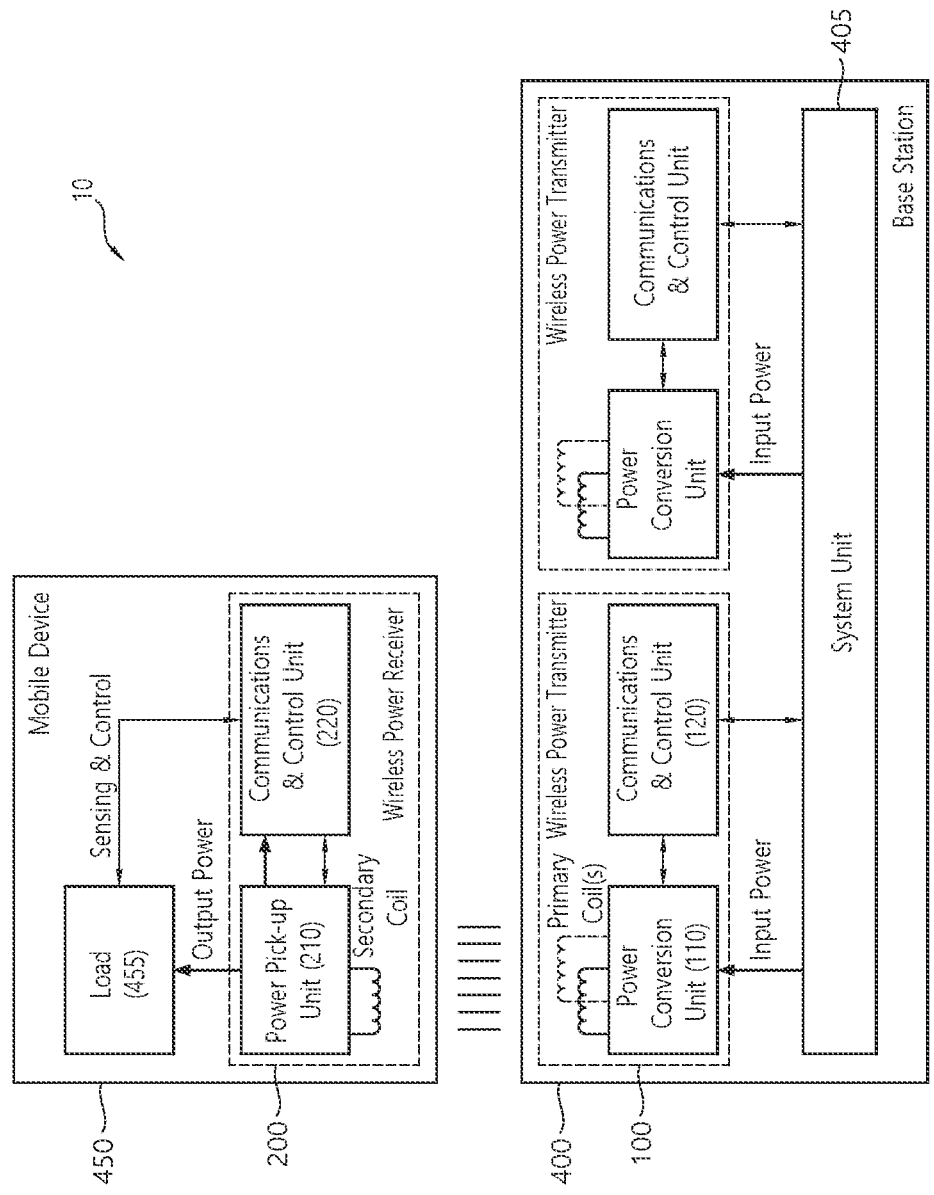
FIG. 5 is a block diagram of a wireless power transfer system according to another exemplary embodiment of the present disclosure.

As shown in Table 1, a maximum output power capability of Class n PTU may be equal to or greater than the $P_{TX\_IN\_MAX}$ of the corresponding class. The PRU cannot draw a power that is higher than the power level specified in the corresponding category. FIG. 5 is a block diagram of a wireless power transfer system according to another exemplary embodiment of the present disclosure.

Referring to FIG. 5, the wireless power transfer system (10) includes a mobile device (450), which wirelessly receives power, and a base station (400), which wirelessly transmits power.

As a device providing induction power or resonance power, the base station (400) may include at least one of a wireless power transmitter (100) and a system unit (405). The wireless power transmitter (100) may transmit induction power or resonance power and may control the transmission. The wireless power transmitter (100) may include a power conversion unit (110) converting electric energy to a power signal by generating a magnetic field through a primary coil (or primary coils), and a communications & control unit (120) controlling the communication and power transfer between the wireless power receiver (200) in order to transfer power at an appropriate (or suitable) level. The system unit (405) may perform input power provisioning, controlling of multiple wireless power transmitters, and other operation controls of the base station (400), such as user interface control.

The primary coil may generate an electromagnetic field by using an alternating current power (or voltage or current). The primary coil is supplied with an alternating current power (or voltage or current) of a specific frequency, which is being outputted from the power conversion unit (110). And, accordingly, the primary coil may generate a magnetic field of the specific frequency. The magnetic field may be generated in a non-radial shape or a radial shape. And, the wireless power receiver (200) receives the generated magnetic field and then generates an electric current. In other words, the primary coil wirelessly transmits power.

In the magnetic induction method, a primary coil and a secondary coil may have randomly appropriate shapes. For example, the primary coil and the secondary coil may correspond to copper wire being wound around a high-permeability formation, such as ferrite or a non-crystalline metal. The primary coil may also be referred to as a transmitting coil, a primary core, a primary winding, a primary loop antenna, and so on. Meanwhile, the secondary coil may also be referred to as a receiving coil, a secondary core, a secondary winding, a secondary loop antenna, a pickup antenna, and so on.

In case of using the magnetic resonance method, the primary coil and the secondary coil may each be provided in the form of a primary resonance antenna and a secondary resonance antenna. The resonance antenna may have a resonance structure including a coil and a capacitor. At this point, the resonance frequency of the resonance antenna may be determined by the inductance of the coil and a capacitance of the capacitor. Herein, the coil may be formed to have a loop shape. And, a core may be placed inside the loop. The core may include a physical core, such as a ferrite core, or an air core.

The energy transmission (or transfer) between the primary resonance antenna and the second resonance antenna may be performed by a resonance phenomenon occurring in the magnetic field. When a near field corresponding to a resonance frequency occurs in a resonance antenna, and in case another resonance antenna exists near the corresponding resonance antenna, the resonance phenomenon refers to a highly efficient energy transfer occurring between the two resonance antennas that are coupled with one another. When a magnetic field corresponding to the resonance frequency is generated between the primary resonance antenna and the secondary resonance antenna, the primary resonance antenna and the secondary resonance antenna resonate with one another. And, accordingly, in a general case, the magnetic field is focused toward the second resonance antenna at a higher efficiency as compared to a case where the magnetic field that is generated from the primary antenna is radiated to a free space. And, therefore, energy may be transferred to the second resonance antenna from the first resonance antenna at a high efficiency. The magnetic induction method may be implemented similarly to the magnetic resonance method. However, in this case, the frequency of the magnetic field is not required to be a resonance frequency. Nevertheless, in the magnetic induction method, the loops configuring the primary coil and the secondary coil are required to match one another, and the distance between the loops should be very close-ranged.

Although it is not shown in the drawing, the wireless power transmitter (100) may further include a communication antenna. The communication antenna may transmit and/or receive a communication signal by using a communication carrier apart from the magnetic field communication. For example, the communication antenna may transmit and/or receive communication signals corresponding to Wi-Fi, Bluetooth, Bluetooth LE, ZigBee, NFC, and so on.

The communications & control unit (120) may transmit and/or receive information to and from the wireless power receiver (200). The communications & control unit (120) may include at least one of an IB communication module and an OB communication module.

The IB communication module may transmit and/or receive information by using a magnetic wave, which uses a specific frequency as its center frequency. For example, the communications & control unit (120) may perform in-band (IB) communication by transmitting communication information on the operating frequency of wireless power transfer through the primary coil or by receiving communication information on the operating frequency through the primary coil. At this point, the communications & control unit (120) may load information in the magnetic wave or may interpret the information that is carried by the magnetic wave by using a modulation scheme, such as binary phase shift keying (BPSK), Frequency Shift Keying (FSK) or amplitude shift keying (ASK), and so on, or a coding scheme, such as Manchester coding or non-return-to-zero level (NZR-L) coding, and so on. By using the above-described IB communication, the communications & control unit (120) may transmit and/or receive information to distances of up to several meters at a data transmission rate of several kbps.

The OB communication module may also perform out-of-band communication through a communication antenna. For example, the communications & control unit (120) may be provided to a near field communication module. Examples of the near field communication module may include communication modules, such as Wi-Fi, Bluetooth, Bluetooth LE, ZigBee, NFC, and so on.

The communications & control unit (120) may control the overall operations of the wireless power transmitter (100). The communications & control unit (120) may perform calculation and processing of diverse information and may also control each configuration element of the wireless power transmitter (100).

The communications & control unit (120) may be implemented in a computer or a similar device as hardware, software, or a combination of the same. When implemented in the form of hardware, the communications & control unit (120) may be provided as an electronic circuit performing control functions by processing electrical signals. And, when implemented in the form of software, the communications & control unit (120) may be provided as a program that operates the communications & control unit (120).

By controlling the operating point, the communications & control unit (120) may control the transmitted power. The operating point that is being controlled may correspond to a combination of a frequency (or phase), a duty cycle, a duty ratio, and a voltage amplitude. The communications & control unit (120) may control the transmitted power by adjusting any one of the frequency (or phase), the duty cycle, the duty ratio, and the voltage amplitude. Additionally, the wireless power transmitter (100) may supply a consistent level of power, and the wireless power receiver (200) may control the level of received power by controlling the resonance frequency.

The mobile device (450) includes a wireless power receiver (200) receiving wireless power through a secondary coil, and a load (455) receiving and storing the power that is received by the wireless power receiver (200) and supplying the received power to the device.

The wireless power receiver (200) may include a power pick-up unit (210) and a communications & control unit (220). The power pick-up unit (210) may receive wireless power through the secondary coil and may convert the received wireless power to electric energy. The power pick-up unit (210) rectifies the alternating current (AC) signal, which is received through the secondary coil, and converts the rectified signal to a direct current (DC) signal. The communications & control unit (220) may control the transmission and reception of the wireless power (transfer and reception of power).

The secondary coil may receive wireless power that is being transmitted from the wireless power transmitter (100). The secondary coil may receive power by using the magnetic field that is generated in the primary coil. Herein, in case the specific frequency corresponds a resonance frequency, magnetic resonance may occur between the primary coil and the secondary coil, thereby allowing power to be transferred with greater efficiency.

Although it is not shown in FIG. 5, the communications & control unit (220) may further include a communication antenna. The communication antenna may transmit and/or receive a communication signal by using a communication carrier apart from the magnetic field communication. For example, the communication antenna may transmit and/or receive communication signals corresponding to Wi-Fi, Bluetooth, Bluetooth LE, ZigBee, NFC, and so on.

The communications & control unit (220) may transmit and/or receive information to and from the wireless power transmitter (100). The communications & control unit (220) may include at least one of an IB communication module and an OB communication module.

The IB communication module may transmit and/or receive information by using a magnetic wave, which uses a specific frequency as its center frequency. For example, the communications & control unit (220) may perform IB communication by loading information in the magnetic wave and by transmitting the information through the secondary coil or by receiving a magnetic wave carrying information through the secondary coil. At this point, the communications & control unit (120) may load information in the magnetic wave or may interpret the information that is carried by the magnetic wave by using a modulation scheme, such as binary phase shift keying (BPSK), Frequency Shift Keying (FSK) or amplitude shift keying (ASK), and so on, or a coding scheme, such as Manchester coding or non-return-to-zero level (NZR-L) coding, and so on. By using the above-described IB communication, the communications & control unit (220) may transmit and/or receive information to distances of up to several meters at a data transmission rate of several kbps.

The OB communication module may also perform out-of-band communication through a communication antenna. For example, the communications & control unit (220) may be provided to a near field communication module.

Examples of the near field communication module may include communication modules, such as Wi-Fi, Bluetooth, Bluetooth LE, ZigBee, NFC, and so on.

The communications & control unit (220) may control the overall operations of the wireless power receiver (200). The communications & control unit (220) may perform calculation and processing of diverse information and may also control each configuration element of the wireless power receiver (200).

The communications & control unit (220) may be implemented in a computer or a similar device as hardware, software, or a combination of the same. When implemented in the form of hardware, the communications & control unit (220) may be provided as an electronic circuit performing control functions by processing electrical signals. And, when implemented in the form of software, the communications & control unit (220) may be provided as a program that operates the communications & control unit (220).

Figure 6:
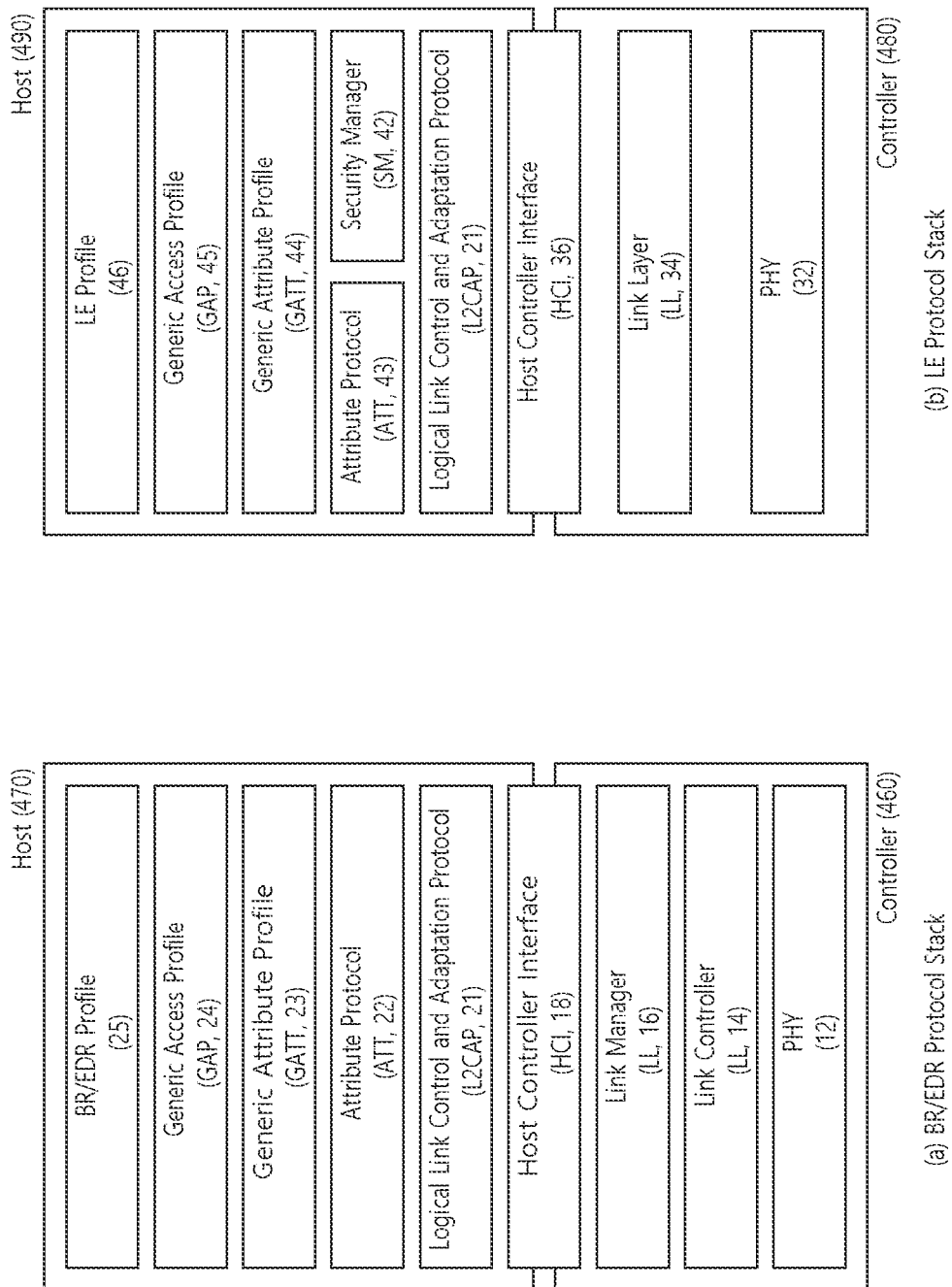
FIG. 6 is a diagram illustrating an example of a Bluetooth communication architecture to which an embodiment according to the present disclosure may be applied.

When the communication/control circuit 120 and the communication/control circuit 220 are Bluetooth or Bluetooth LE as an OB communication module or a short-range communication module, the communication/control circuit 120 and the communication/control circuit 220 may each be implemented and operated with a communication architecture as shown in FIG. 6.

FIG. 6 is a diagram illustrating an example of a Bluetooth communication architecture to which an embodiment according to the present disclosure may be applied.

Referring to FIG. 6, (a) of FIG. 6 shows an example of a protocol stack of Bluetooth basic rate (BR)/enhanced data rate (EDR) supporting GATT, and (b) shows an example of Bluetooth low energy (BLE) protocol stack.

Specifically, as shown in (a) of FIG. 6, the Bluetooth BR/EDR protocol stack may include an upper control stack 460 and a lower host stack 470 based on a host controller interface (HCI) 18.

The host stack (or host module) 470 refers to hardware for transmitting or receiving a Bluetooth packet to or from a wireless transmission/reception module which receives a Bluetooth signal of 2.4 GHz, and the controller stack 460 is connected to the Bluetooth module to control the Bluetooth module and perform an operation.

The host stack 470 may include a BR/EDR PHY layer 12, a BR/EDR baseband layer 14, and a link manager layer 16.

The BR/EDR PHY layer 12 is a layer that transmits and receives a 2.4 GHz radio signal, and in the case of using Gaussian frequency shift keying (GFSK) modulation, the BR/EDR PHY layer 12 may transmit data by hopping 79 RF channels.

The BR/EDR baseband layer 14 serves to transmit a digital signal, selects a channel sequence for hopping 1400 times per second, and transmits a time slot with a length of 625 us for each channel.

The link manager layer 16 controls an overall operation (link setup, control, security) of Bluetooth connection by utilizing a link manager protocol (LMP).

The link manager layer 16 may perform the following functions.

Performs ACL/SCO logical transport, logical link setup, and control.

Detach: It interrupts connection and informs a counterpart device about a reason for the interruption.

Performs power control and role switch.

Performs security (authentication, pairing, encryption) function.

The host controller interface layer 18 provides an interface between a host module and a controller module so that a host provides commands and data to the controller and the controller provides events and data to the host.

The host stack (or host module, 470) includes a logical link control and adaptation protocol (L2CAP) 21, an attribute protocol 22, a generic attribute profile (GATT) 23, a generic access profile (GAP) 24, and a BR/EDR profile 25.

The logical link control and adaptation protocol (L2CAP) 21 may provide one bidirectional channel for transmitting data to a specific protocol or profile.

The L2CAP 21 may multiplex various protocols, profiles, etc., provided from upper Bluetooth.

L2CAP of Bluetooth BR/EDR uses dynamic channels, supports protocol service multiplexer, retransmission, streaming mode, and provides segmentation and reassembly, per-channel flow control, and error control.

The generic attribute profile (GATT) 23 may be operable as a protocol that describes how the attribute protocol 22 is used when services are configured. For example, the generic attribute profile 23 may be operable to specify how ATT attributes are grouped together into services and may be operable to describe features associated with services.

Accordingly, the generic attribute profile 23 and the attribute protocols (ATT) 22 may use features to describe device's state and services, how features are related to each other, and how they are used.

The attribute protocol 22 and the BR/EDR profile 25 define a service (profile) using Bluetooth BR/EDR and an application protocol for exchanging these data, and the generic access profile (GAP) 24 defines device discovery, connectivity, and security level.

As shown in (b) of FIG. 6, the Bluetooth LE protocol stack includes a controller stack 480 operable to process a wireless device interface important in timing and a host stack 490 operable to process high level data.

First, the controller stack 480 may be implemented using a communication module that may include a Bluetooth wireless device, for example, a processor module that may include a processing device such as a microprocessor.

The host stack 490 may be implemented as apart of an OS running on a processor module or as an instantiation of a package on the OS.

In some cases, the controller stack and the host stack may be run or executed on the same processing device in a processor module.

The controller stack 480 includes a physical layer (PHY) 32, a link layer 34, and a host controller interface 36.

The physical layer (PHY, wireless transmission/reception module) 32 is a layer that transmits and receives a 2.4 GHz radio signal and uses Gaussian frequency shift keying (GFSK) modulation and a frequency hopping scheme including 40 RF channels.

The link layer 34, which serves to transmit or receive Bluetooth packets, creates connections between devices after performing advertising and scanning functions using 3 advertising channels and provides a function of exchanging data packets of up to 257 bytes through 37 data channels.

The host stack includes a generic access profile (GAP) 45, a logical link control and adaptation protocol (L2CAP, 41), a security manager (SM) 42, and an attribute protocol (ATT) 43, a generic attribute profile (GATT) 44, a generic access profile 45, and an LE profile 46. However, the host stack 490 is not limited thereto and may include various protocols and profiles.

The host stack multiplexes various protocols, profiles, etc., provided from upper Bluetooth using L2CAP.

First, the logical link control and adaptation protocol (L2CAP) 41 may provide one bidirectional channel for transmitting data to a specific protocol or profile.

The L2CAP 41 may be operable to multiplex data between higher layer protocols, segment and reassemble packages, and manage multicast data transmission.

In Bluetooth LE, three fixed channels (one for signaling CH, one for security manager, and one for attribute protocol) are basically used. Also, a dynamic channel may be used as needed.

Meanwhile, a basic channel/enhanced data rate (BR/EDR) uses a dynamic channel and supports protocol service multiplexer, retransmission, streaming mode, and the like.

The security manager (SM) 42 is a protocol for authenticating devices and providing key distribution.

The attribute protocol (ATT) 43 defines a rule for accessing data of a counterpart device in a server-client structure. The ATT has the following 6 message types (request, response, command, notification, indication, confirmation).

① Request and Response message: A request message is a message for requesting specific information from the client device to the server device, and the response message is a response message to the request message, which is a message transmitted from the server device to the client device.

② Command message: It is a message transmitted from the client device to the server device in order to indicate a command of a specific operation. The server device does not transmit a response with respect to the command message to the client device.

③. Notification message: It is a message transmitted from the server device to the client device in order to notify an event, or the like. The client device does not transmit a confirmation message with respect to the notification message to the server device.

④. Indication and confirmation message: It is a message transmitted from the server device to the client device in order to notify an event, or the like. Unlike the notification message, the client device transmits a confirmation message regarding the indication message to the server device.

In the present disclosure, when the GATT profile using the attribute protocol (ATT) 43 requests long data, a value regarding a data length is transmitted to allow a client to clearly know the data length, and a characteristic value may be received from a server by using a universal unique identifier (UUID).

The generic access profile (GAP) 45, a layer newly implemented for the Bluetooth LE technology, is used to select a role for communication between Bluetooth LED devices and to control how a multi-profile operation takes place.

Also, the generic access profile (GAP) 45 is mainly used for device discovery, connection generation, and security procedure part, defines a scheme for providing information to a user, and defines types of attributes as follows.

① Service: It defines a basic operation of a device by a combination of behaviors related to data ② Include: It defines a relationship between services ③ Characteristics: It is a data value used in a server ④ Behavior: It is a format that may be read by a computer defined by a UUID (value type).

The LE profile 46, including profiles dependent upon the GATT, is mainly applied to a Bluetooth LE device. The LE profile 46 may include, for example, Battery, Time, FindMe, Proximity. Time, Object Delivery Service, and the like, and details of the GATT-based profiles are as follows.

① Battery: Battery information exchanging method

② Time: Time information exchanging method

③ FindMe: Provision of alarm service according to distance

④ Proximity: Battery information exchanging method

⑤ Time: Time information exchanging method

The generic attribute profile (GATT) 44 may operate as a protocol describing how the attribute protocol (ATT) 43 is used when services are configured. For example, the GATT 44 may operate to define how ATT attributes are grouped together with services and operate to describe features associated with services.

Thus, the GATT 44 and the ATT 43 may use features in order to describe status and services of a device and describe how the features are related and used.

Hereinafter, procedures of the Bluetooth low energy (BLE) technology will be briefly described.

The BLE procedure may be classified as a device filtering procedure, an advertising procedure, a scanning procedure, a discovering procedure, and a connecting procedure.

Device Filtering Procedure

The device filtering procedure is a method for reducing the number of devices performing a response with respect to a request, indication, notification, and the like, in the controller stack.

When requests are received from all the devices, it is not necessary to respond thereto, and thus, the controller stack may perform control to reduce the number of transmitted requests to reduce power consumption.

An advertising device or scanning device may perform the device filtering procedure to limit devices for receiving an advertising packet, a scan request or a connection request.

Here, the advertising device refers to a device transmitting an advertising event, that is, a device performing an advertisement and is also termed an advertiser.

The scanning device refers to a device performing scanning, that is, a device transmitting a scan request.

In the BLE, in a case in which the scanning device receives some advertising packets from the advertising device, the scanning device should transmit a scan request to the advertising device.

However, in a case in which a device filtering procedure is used so a scan request transmission is not required, the scanning device may disregard the advertising packets transmitted from the advertising device.

Even in a connection request process, the device filtering procedure may be used. In a case in which device filtering is used in the connection request process, it is not necessary to transmit a response with respect to the connection request by disregarding the connection request.

Advertising Procedure

The advertising device performs an advertising procedure to perform undirected broadcast to devices within a region.

Here, the undirected broadcast is advertising toward all the devices, rather than broadcast toward a specific device, and all the devices may scan advertising to make an supplemental information request or a connection request.

In contrast, directed advertising may make an supplemental information request or a connection request by scanning advertising for only a device designated as a reception device.

The advertising procedure is used to establish a Bluetooth connection with an initiating device nearby.

Or, the advertising procedure may be used to provide periodical broadcast of user data to scanning devices performing listening in an advertising channel.

In the advertising procedure, all the advertisements (or advertising events) are broadcast through an advertisement physical channel.

The advertising devices may receive scan requests from listening devices performing listening to obtain additional user data from advertising devices. The advertising devices transmit responses with respect to the scan requests to the devices which have transmitted the scan requests, through the same advertising physical channels as the advertising physical channels in which the scan requests have been received.

Broadcast user data sent as part of advertising packets are dynamic data, while the scan response data is generally static data.

The advertisement device may receive a connection request from an initiating device on an advertising (broadcast) physical channel. If the advertising device has used a connectable advertising event and the initiating device has not been filtered according to the device filtering procedure, the advertising device may stop advertising and enter a connected mode. The advertising device may start advertising after the connected mode.

Scanning Procedure

A device performing scanning, that is, a scanning device performs a scanning procedure to listen to undirected broadcasting of user data from advertising devices using an advertising physical channel.

The scanning device transmits a scan request to an advertising device through an advertising physical channel in order to request additional data from the advertising device. The advertising device transmits a scan response as a response with respect to the scan request, by including additional user data which has requested by the scanning device through an advertising physical channel.

The scanning procedure may be used while being connected to other BLE device in the BLE piconet.

If the scanning device is in an initiator mode in which the scanning device may receive an advertising event and initiates a connection request. The scanning device may transmit a connection request to the advertising device through the advertising physical channel to start a Bluetooth connection with the advertising device.

When the scanning device transmits a connection request to the advertising device, the scanning device stops the initiator mode scanning for additional broadcast and enters the connected mode.

Discovering Procedure

Devices available for Bluetooth communication (hereinafter, referred to as "Bluetooth devices") perform an advertising procedure and a scanning procedure in order to discover devices located nearby or in order to be discovered by other devices within a given area.

The discovering procedure is performed asymmetrically. A Bluetooth device intending to discover other device nearby is termed a discovering device, and listens to discover devices advertising an advertising event that may be scanned. A Bluetooth device which may be discovered by other device and available to be used is termed a discoverable device and positively broadcasts an advertising event such that it may be scanned by other device through an advertising (broadcast) physical channel.

Both the discovering device and the discoverable device may have already been connected with other Bluetooth devices in a piconet.

Connecting Procedure

A connecting procedure is asymmetrical, and requests that, while a specific Bluetooth device is performing an advertising procedure, another Bluetooth device should perform a scanning procedure.

That is, an advertising procedure may be aimed, and as a result, only one device may response to the advertising. After a connectable advertising event is received from an advertising device, a connecting request may be transmitted to the advertising device through an advertising (broadcast) physical channel to initiate connection.

Hereinafter, operational states, that is, an advertising state, a scanning state, an initiating state, and a connection state, in the BLE technology will be briefly described.

Advertising State

A link layer (LL) enters an advertising state according to an instruction from a host (stack). In a case in which the LL is in the advertising state, the LL transmits an advertising packet data unit (PDU) in advertising events.

Each of the advertising events include at least one advertising PDU, and the advertising PDU is transmitted through an advertising channel index in use. After the advertising PDU is transmitted through an advertising channel index in use, the advertising event may be terminated, or in a case in which the advertising device may need to secure a space for performing other function, the advertising event may be terminated earlier.

Scanning State

The LL enters the scanning state according to an instruction from the host (stack). In the scanning state, the LL listens to advertising channel indices.

The scanning state includes two types: passive scanning and active scanning. Each of the scanning types is determined by the host.

Time for performing scanning or an advertising channel index are not defined.

During the scanning state, the LL listens to an advertising channel index in a scan window duration. A scan interval is defined as an interval between start points of two continuous scan windows.

When there is no collision in scheduling, the LL should listen in order to complete all the scan intervals of the scan window as instructed by the host. In each scan window, the LL should scan other advertising channel index. The LL uses every available advertising channel index.

In the passive scanning, the LL only receives packets and cannot transmit any packet.

In the active scanning, the LL performs listening in order to be relied on an advertising PDU type for requesting advertising PDUs and advertising device-related supplemental information from the advertising device.

Initiating State

The LL enters the initiating state according to an instruction from the host (stack).

When the LL is in the initiating state, the LL performs listening on advertising channel indices.

During the initiating state, the LL listens to an advertising channel index during the scan window interval.

Connection State

When the device performing a connection state, that is, when the initiating device transmits a CONNECT_REQ PDU to the advertising device or when the advertising device receives a CONNECT_REQ PDU from the initiating device, the LL enters a connection state.

It is considered that a connection is generated after the LL enters the connection state. However, it is not necessary to consider that the connection should be established at a point in time at which the LL enters the connection state. The only difference between a newly generated connection and an already established connection is a LL connection supervision timeout value.

When two devices are connected, the two devices play different roles.

An LL serving as a master is termed a master, and an LL serving as a slave is termed a slave. The master adjusts a timing of a connecting event, and the connecting event refers to a point in time at which the master and the slave are synchronized.

Hereinafter, packets defined in an Bluetooth interface will be briefly described. BLE devices use packets defined as follows.

Packet Format

The LL has only one packet format used for both an advertising channel packet and a data channel packet.

Each packet includes four fields of a preamble, an access address, a PDU, and a CRC.

When one packet is transmitted in an advertising physical channel, the PDU may be an advertising channel PDU, and when one packet is transmitted in a data physical channel, the PDU may be a data channel PDU.

Advertising Channel PDU

An advertising channel PDU has a 16-bit header and payload having various sizes.

A PDU type field of the advertising channel PDU included in the heater indicates PDU types defined in Table 3 below.

TABLE 3

| PDU Type | Packet Name |
|---|---|
| 0000 | ADV_IND |
| 0001 | ADV_DIRECT_IND |

TABLE 3-continued

| PDU Type | Packet Name |
|---|---|
| 0010 | ADV_NONCONN_IND |
| 0011 | SCAN_REQ |
| 0100 | SCAN_RSP |
| 0101 | CONNECT_REQ |
| 0110 | ADV_SCAN_IND |
| 0111-1111 | Reserved |

Advertising PDU The following advertising channel PDU types are termed advertising PDUs and used in a specific event.

ADV_IND: Connectable undirected advertising event

ADV_DIRECT_IND: Connectable directed advertising event

ADV_NONCONN_IND: Unconnectable undirected advertising event

ADV_SCAN_IND: Scannable undirected advertising event

The PDUs are transmitted from the LL in an advertising state, and received by the LL in a scanning state or in an initiating state.

Scanning PDU

The following advertising channel DPU types are termed scanning PDUs and are used in a state described hereinafter.

SCAN_REQ: Transmitted by the LL in a scanning state and received by the LL in an advertising state.

SCAN_RSP: Transmitted by the LL in the advertising state and received by the LL in the scanning state.

Initiating PDU

The following advertising channel PDU type is termed an initiating PDU.

CONNECT_REQ: Transmitted by the LL in the initiating state and received by the LL in the advertising state.

Data Channel PDU

The data channel PDU may include a message integrity check (MIC) field having a 16-bit header and payload having various sizes.

The procedures, states, and packet formats in the BLE technology discussed above may be applied to perform the methods proposed in the present disclosure.

Referring to FIG. 5, the load (455) may correspond to a battery. The battery may store energy by using the power that is being outputted from the power pick-up unit (210). Meanwhile, the battery is not mandatorily required to be included in the mobile device (450). For example, the battery may be provided as a detachable external feature. As another example, the wireless power receiver may include an operating means that may execute diverse functions of the electronic device instead of the battery.

As shown in the drawing, although the mobile device (450) is illustrated to be included in the wireless power receiver (200) and the base station (400) is illustrated to be included in the wireless power transmitter (100), in a broader meaning, the wireless power receiver (200) may be identified (or regarded) as the mobile device (450), and the wireless power transmitter (100) may be identified (or regarded) as the base station (400).

Figure 7:
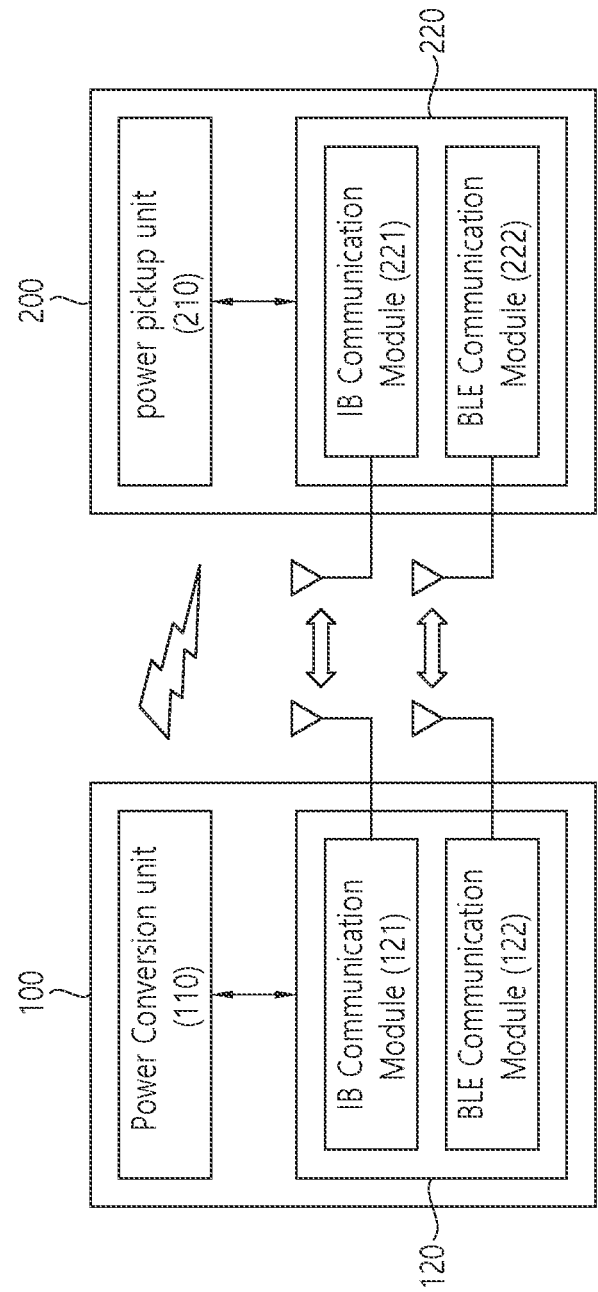
FIG. 7 is a block diagram illustrating a wireless power transfer system using BLE communication according to an example.

When the communication/control circuit 120 and the communication/control circuit 220 include Bluetooth or Bluetooth LE as an OB communication module or a short-range communication module in addition to the IB communication module, the wireless power transmitter 100 including the communication/control circuit 120 and the wireless power receiver 200 including the communication/control circuit 220 may be represented by a simplified block diagram as shown in FIG. 7.

FIG. 7 is a block diagram illustrating a wireless power transfer system using BLE communication according to an example.

Referring to FIG. 7, the wireless power transmitter 100 includes a power conversion circuit 110 and a communication/control circuit 120. The communication/control circuit 120 includes an in-band communication module 121 and a BLE communication module 122.

Meanwhile, the wireless power receiver 200 includes a power pickup circuit 210 and a communication/control circuit 220. The communication/control circuit 220 includes an in-band communication module 221 and a BLE communication module 222.

In one aspect, the BLE communication modules 122 and 222 perform the architecture and operation according to FIG. 6. For example, the BLE communication modules 122 and 222 may be used to establish a connection between the wireless power transmitter 100 and the wireless power receiver 200 and exchange control information and packets necessary for wireless power transfer.

In another aspect, the communication/control circuit 120 may be configured to operate a profile for wireless charging. Here, the profile for wireless charging may be GATT using BLE transmission.

Figure 8:
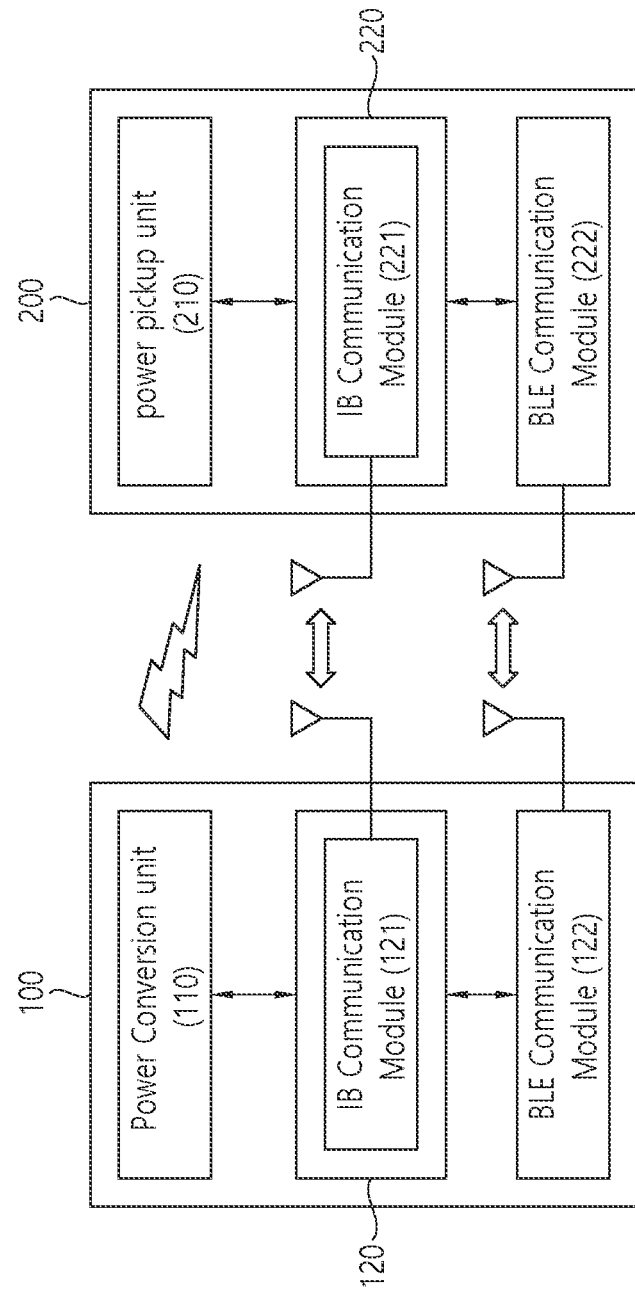
FIG. 8 is a block diagram illustrating a wireless power transfer system using BLE communication according to another example.

FIG. 8 is a block diagram illustrating a wireless power transfer system using BLE communication according to another example.

Referring to FIG. 8, the communication/control circuits 120 and 220 respectively include only in-band communication modules 121 and 221, and the BLE communication modules 122 and 222 may be provided to be separated from the communication/control circuits 120 and 220.

Hereinafter, the coil or coil unit includes a coil and at least one device being approximate to the coil, and the coil or coil unit may also be referred to as a coil assembly, a coil cell, or a cell.

Figure 9:
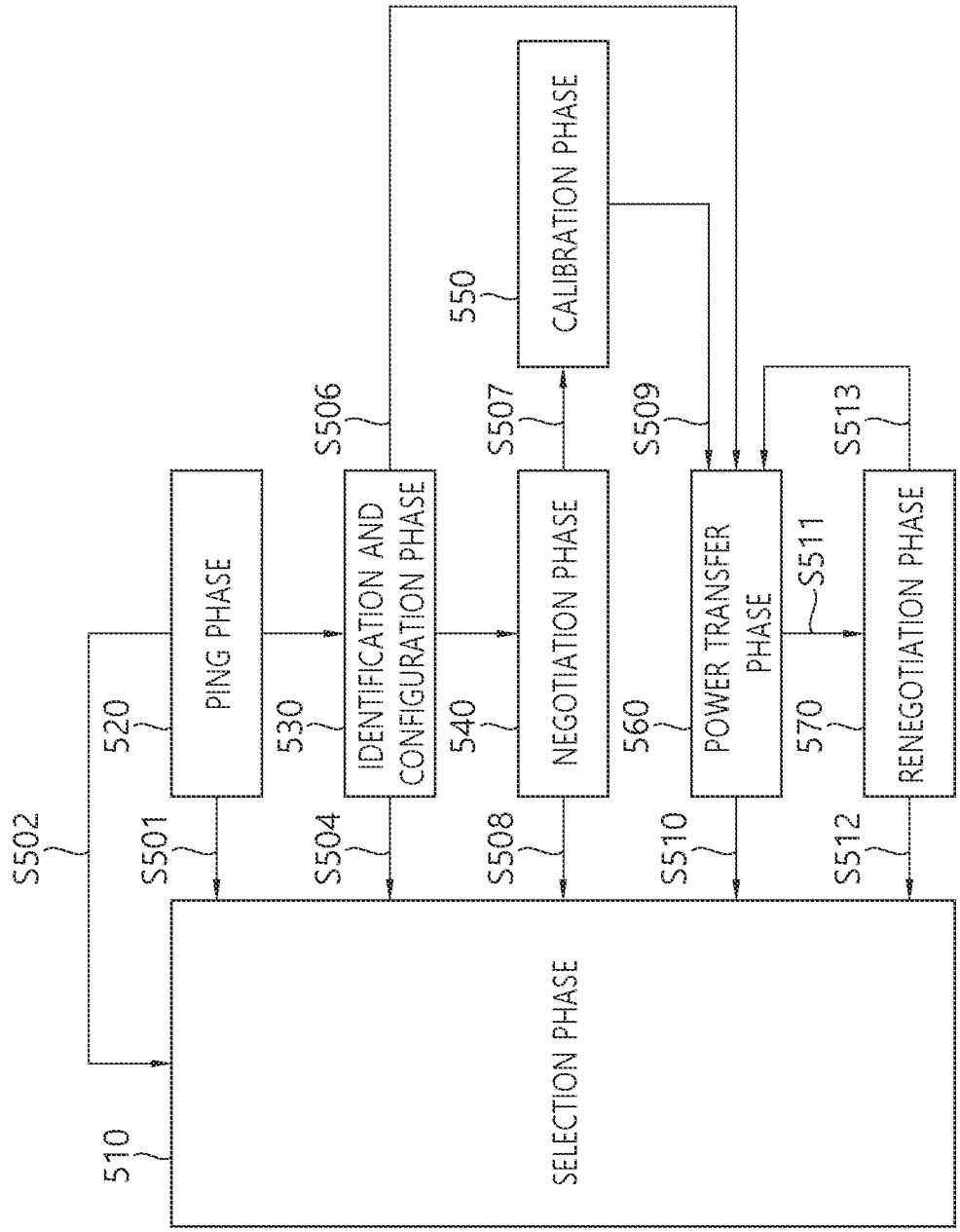
FIG. 9 is a state transition diagram for describing a wireless power transfer procedure.

FIG. 9 is a state transition diagram for describing a wireless power transfer procedure.

Referring to FIG. 9, the power transfer (or transfer) from the wireless power transmitter to the wireless power receiver according to an exemplary embodiment of the present disclosure may be broadly divided into a selection phase (510), a ping phase (520), an identification and configuration phase (530), a negotiation phase (540), a calibration phase (550), a power transfer phase (560), and a renegotiation phase (570).

If a specific error or a specific event is detected when the power transfer is initiated or while maintaining the power transfer, the selection phase (510) may include a shifting phase (or step)—reference numerals S502, S504, S508, S510, and S512. Herein, the specific error or specific event will be specified in the following description. Additionally, during the selection phase (510), the wireless power transmitter may monitor whether or not an object exists on an interface surface. If the wireless power transmitter detects that an object is placed on the interface surface, the process step may be shifted to the ping phase (520). During the selection phase (510), the wireless power transmitter may transmit an analog ping having a power signal (or a pulse) corresponding to an extremely short duration, and may detect whether or not an object exists within an active area of the interface surface based on a current change in the transmitting coil or the primary coil.

In case an object is sensed (or detected) in the selection phase (510), the wireless power transmitter may measure a quality factor of a wireless power resonance circuit (e.g., power transfer coil and/or resonance capacitor). According to the exemplary embodiment of the present disclosure, during the selection phase (510), the wireless power transmitter may measure the quality factor in order to determine whether or not a foreign object exists in the charging area along with the wireless power receiver. In the coil that is provided in the wireless power transmitter, inductance and/or components of the series resistance may be reduced due to a change in the environment, and, due to such decrease, a value of the quality factor may also be decreased. In order to determine the presence or absence of a foreign object by using the measured quality factor value, the wireless power transmitter may receive from the wireless power receiver a reference quality factor value, which is measured in advance in a state where no foreign object is placed within the charging area. The wireless power transmitter may determine the presence or absence of a foreign object by comparing the measured quality factor value with the reference quality factor value, which is received during the negotiation phase (540). However, in case of a wireless power receiver having a low reference quality factor value—e.g., depending upon its type, purpose, characteristics, and so on, the wireless power receiver may have a low reference quality factor value—in case a foreign object exists, since the difference between the reference quality factor value and the measured quality factor value is small (or insignificant), a problem may occur in that the presence of the foreign object cannot be easily determined. Accordingly, in this case, other determination factors should be further considered, or the present or absence of a foreign object should be determined by using another method.

According to another exemplary embodiment of the present disclosure, in case an object is sensed (or detected) in the selection phase (510), in order to determine whether or not a foreign object exists in the charging area along with the wireless power receiver, the wireless power transmitter may measure the quality factor value within a specific frequency area (e.g., operation frequency area). In the coil that is provided in the wireless power transmitter, inductance and/or components of the series resistance may be reduced due to a change in the environment, and, due to such decrease, the resonance frequency of the coil of the wireless power transmitter may be changed (or shifted). More specifically, a quality factor peak frequency that corresponds to a frequency in which a maximum quality factor value is measured within the operation frequency band may be moved (or shifted).

In the ping phase (520), if the wireless power transmitter detects the presence of an object, the transmitter activates (or Wakes up) a receiver and transmits a digital ping for identifying whether or not the detected object corresponds to the wireless power receiver. During the ping phase (520), if the wireless power transmitter fails to receive a response signal for the digital ping—e.g., a signal intensity packet—from the receiver, the process may be shifted back to the selection phase (510). Additionally, in the ping phase (520), if the wireless power transmitter receives a signal indicating the completion of the power transfer—e.g., charging complete packet—from the receiver, the process may be shifted back to the selection phase (510).

If the ping phase (520) is completed, the wireless power transmitter may shift to the identification and configuration phase (530) for identifying the receiver and for collecting configuration and status information.

In the identification and configuration phase (530), if the wireless power transmitter receives an unwanted packet (i.e., unexpected packet), or if the wireless power transmitter fails to receive a packet during a predetermined period of time (i.e., out of time), or if a packet transmission error occurs (i.e., transmission error), or if a power transfer contract is not configured (i.e., no power transfer contract), the wireless power transmitter may shift to the selection phase (510).

The wireless power transmitter may confirm (or verify) whether or not its entry to the negotiation phase (540) is needed based on a Negotiation field value of the configuration packet, which is received during the identification and configuration phase (530). Based on the verified result, in case a negotiation is needed, the wireless power transmitter enters the negotiation phase (540) and may then perform a predetermined FOD detection procedure. Conversely, in case a negotiation is not needed, the wireless power transmitter may immediately enter the power transfer phase (560).

In the negotiation phase (540), the wireless power transmitter may receive a Foreign Object Detection (FOD) status packet that includes a reference quality factor value. Or, the wireless power transmitter may receive an FOD status packet that includes a reference peak frequency value. Alternatively, the wireless power transmitter may receive a status packet that includes a reference quality factor value and a reference peak frequency value. At this point, the wireless power transmitter may determine a quality coefficient threshold value for FO detection based on the reference quality factor value. The wireless power transmitter may determine a peak frequency threshold value for FO detection based on the reference peak frequency value.

The wireless power transmitter may detect the presence or absence of an FO in the charging area by using the determined quality coefficient threshold value for FO detection and the currently measured quality factor value (i.e., the quality factor value that was measured before the ping phase), and, then, the wireless power transmitter may control the transmitted power in accordance with the FO detection result. For example, in case the FO is detected, the power transfer may be stopped. However, the present disclosure will not be limited only to this.

The wireless power transmitter may detect the presence or absence of an FO in the charging area by using the determined peak frequency threshold value for FO detection and the currently measured peak frequency value (i.e., the peak frequency value that was measured before the ping phase), and, then, the wireless power transmitter may control the transmitted power in accordance with the FO detection result. For example, in case the FO is detected, the power transfer may be stopped. However, the present disclosure will not be limited only to this.

In case the FO is detected, the wireless power transmitter may return to the selection phase (510). Conversely, in case the FO is not detected, the wireless power transmitter may proceed to the calibration phase (550) and may, then, enter the power transfer phase (560). More specifically, in case the FO is not detected, the wireless power transmitter may determine the intensity of the received power that is received by the receiving end during the calibration phase (550) and may measure power loss in the receiving end and the transmitting end in order to determine the intensity of the power that is transmitted from the transmitting end. In other words, during the calibration phase (550), the wireless power transmitter may estimate the power loss based on a difference between the transmitted power of the transmitting end and the received power of the receiving end. The wireless power transmitter according to the exemplary embodiment of the present disclosure may calibrate the threshold value for the FOD detection by applying the estimated power loss.

In the power transfer phase (560), in case the wireless power transmitter receives an unwanted packet (i.e., unexpected packet), or in case the wireless power transmitter fails to receive a packet during a predetermined period of time (i.e., time-out), or in case a violation of a predetermined power transfer contract occurs (i.e., power transfer contract violation), or in case charging is completed, the wireless power transmitter may shift to the selection phase (510).

Additionally, in the power transfer phase (560), in case the wireless power transmitter is required to reconfigure the power transfer contract in accordance with a status change in the wireless power transmitter, the wireless power transmitter may shift to the renegotiation phase (570). At this point, if the renegotiation is successfully completed, the wireless power transmitter may return to the power transfer phase (560).

In this embodiment, the calibration step 550 and the power transfer phase 560 are divided into separate steps, but the calibration step 550 may be integrated into the power transfer phase 560. In this case, operations in the calibration step 550 may be performed in the power transfer phase 560.

The above-described power transfer contract may be configured based on the status and characteristic information of the wireless power transmitter and receiver. For example, the wireless power transmitter status information may include information on a maximum amount of transmittable power, information on a maximum number of receivers that may be accommodated, and so on. And, the receiver status information may include information on the required power, and so on.

Figure 10:
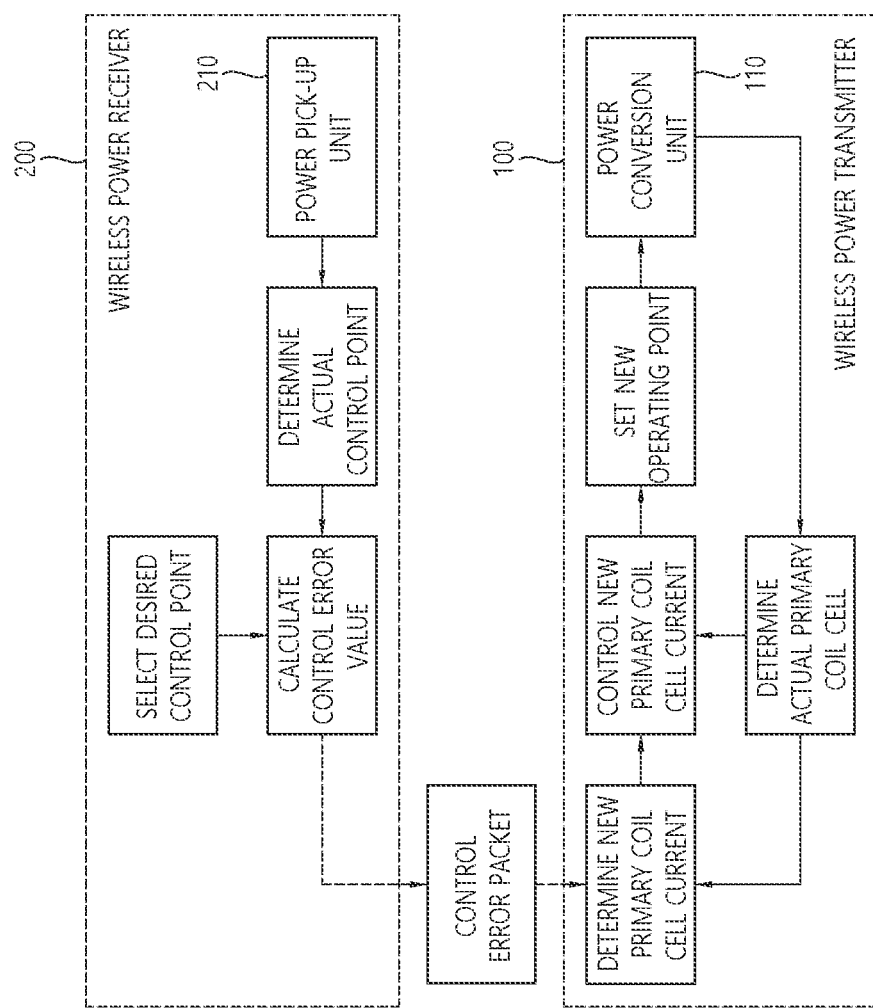
FIG. 10 shows a power control method according to an exemplary embodiment of the present disclosure.

FIG. 10 shows a power control method according to an exemplary embodiment of the present disclosure.

As shown in FIG. 10, in the power transfer phase (560), by alternating the power transfer and/or reception and communication, the wireless power transmitter (100) and the wireless power receiver (200) may control the amount (or size) of the power that is being transferred. The wireless power transmitter and the wireless power receiver operate at a specific control point. The control point indicates a combination of the voltage and the electric current that are provided from the output of the wireless power receiver, when the power transfer is performed.

More specifically, the wireless power receiver selects a desired control point, a desired output current/voltage, a temperature at a specific location of the mobile device, and so on, and additionally determines an actual control point at which the receiver is currently operating. The wireless power receiver calculates a control error value by using the desired control point and the actual control point, and, then, the wireless power receiver may transmit the calculated control error value to the wireless power transmitter as a control error packet.

Also, the wireless power transmitter may configure/control a new operating point—amplitude, frequency, and duty cycle—by using the received control error packet, so as to control the power transfer. Therefore, the control error packet may be transmitted/received at a constant time interval during the power transfer phase, and, according to the exemplary embodiment, in case the wireless power receiver attempts to reduce the electric current of the wireless power transmitter, the wireless power receiver may transmit the control error packet by setting the control error value to a negative number. And, in case the wireless power receiver intends to increase the electric current of the wireless power transmitter, the wireless power receiver transmit the control error packet by setting the control error value to a positive number. During the induction mode, by transmitting the control error packet to the wireless power transmitter as described above, the wireless power receiver may control the power transfer.

In the resonance mode, which will hereinafter be described in detail, the device may be operated by using a method that is different from the induction mode. In the resonance mode, one wireless power transmitter should be capable of serving a plurality of wireless power receivers at the same time. However, in case of controlling the power transfer just as in the induction mode, since the power that is being transferred is controlled by a communication that is established with one wireless power receiver, it may be difficult to control the power transfer of additional wireless power receivers. Therefore, in the resonance mode according to the present disclosure, a method of controlling the amount of power that is being received by having the wireless power transmitter commonly transfer (or transmit) the basic power and by having the wireless power receiver control its own resonance frequency. Nevertheless, even during the operation of the resonance mode, the method described above in FIG. 10 will not be completely excluded. And, additional control of the transmitted power may be performed by using the method of FIG. 10.

Figure 11:
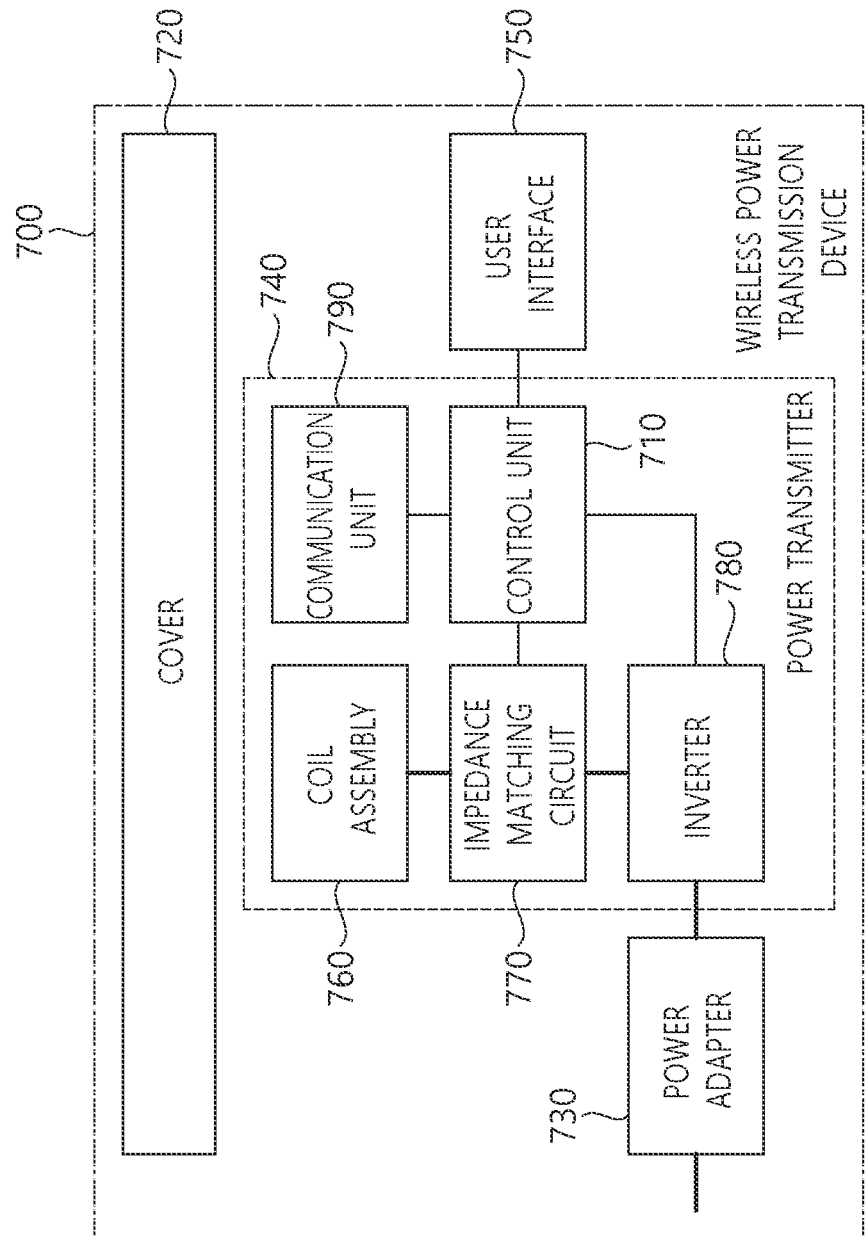
FIG. 11 is a block diagram of a wireless power transmitter according to another exemplary embodiment of the present disclosure.

FIG. 11 is a block diagram of a wireless power transmitter according to another exemplary embodiment of the present disclosure.

This may belong to a wireless power transfer system that is being operated in the magnetic resonance mode or the shared mode. The shared mode may refer to a mode performing a several-for-one (or one-to-many) communication and charging between the wireless power transmitter and the wireless power receiver. The shared mode may be implemented as a magnetic induction method or a resonance method.

Referring to FIG. 11, the wireless power transmitter (700) may include at least one of a cover (720) covering a coil assembly, a power adapter (730) supplying power to the power transmitter (740), a power transmitter (740) transmitting wireless power, and a user interface (750) providing information related to power transfer processing and other related information. Most particularly, the user interface (750) may be optionally included or may be included as another user interface (750) of the wireless power transmitter (700).

The power transmitter (740) may include at least one of a coil assembly (760), an impedance matching circuit (770), an inverter (780), a communication unit (790), and a control unit (710).

The coil assembly (760) includes at least one primary coil generating a magnetic field. And, the coil assembly (760) may also be referred to as a coil cell.

The impedance matching circuit (770) may provide impedance matching between the inverter and the primary coil(s). The impedance matching circuit (770) may generate resonance from a suitable frequency that boosts the electric current of the primary coil(s). In a multi-coil power transmitter (740), the impedance matching circuit may additionally include a multiplex that routes signals from the inverter to a subset of the primary coils. The impedance matching circuit may also be referred to as a tank circuit.

The impedance matching circuit (770) may include a capacitor, an inductor, and a switching device that switches the connection between the capacitor and the inductor. The impedance matching may be performed by detecting a reflective wave of the wireless power that is being transferred (or transmitted) through the coil assembly (760) and by switching the switching device based on the detected reflective wave, thereby adjusting the connection status of the capacitor or the inductor or adjusting the capacitance of the capacitor or adjusting the inductance of the inductor. In some cases, the impedance matching may be carried out even though the impedance matching circuit (770) is omitted. This specification also includes an exemplary embodiment of the wireless power transmitter (700), wherein the impedance matching circuit (770) is omitted.

The inverter (780) may convert a DC input to an AC signal. The inverter (780) may be operated as a half-bridge inverter or a full-bridge inverter in order to generate a pulse wave and a duty cycle of an adjustable frequency. Additionally, the inverter may include a plurality of stages in order to adjust input voltage levels.

The communication unit (790) may perform communication with the power receiver. The power receiver performs load modulation in order to communicate requests and information corresponding to the power transmitter. Therefore, the power transmitter (740) may use the communication unit (790) so as to monitor the amplitude and/or phase of the electric current and/or voltage of the primary coil in order to demodulate the data being transmitted from the power receiver.

Additionally, the power transmitter (740) may control the output power to that the data may be transferred through the communication unit (790) by using a Frequency Shift Keying (FSK) method, and so on.

The control unit (710) may control communication and power transfer (or delivery) of the power transmitter (740). The control unit (710) may control the power transfer by adjusting the above-described operating point. The operating point may be determined by, for example, at least any one of the operation frequency, the duty cycle, and the input voltage.

The communication unit (790) and the control unit (710) may each be provided as a separate unit/device/chipset or may be collectively provided as one unit/device/chipset.

Figure 12:
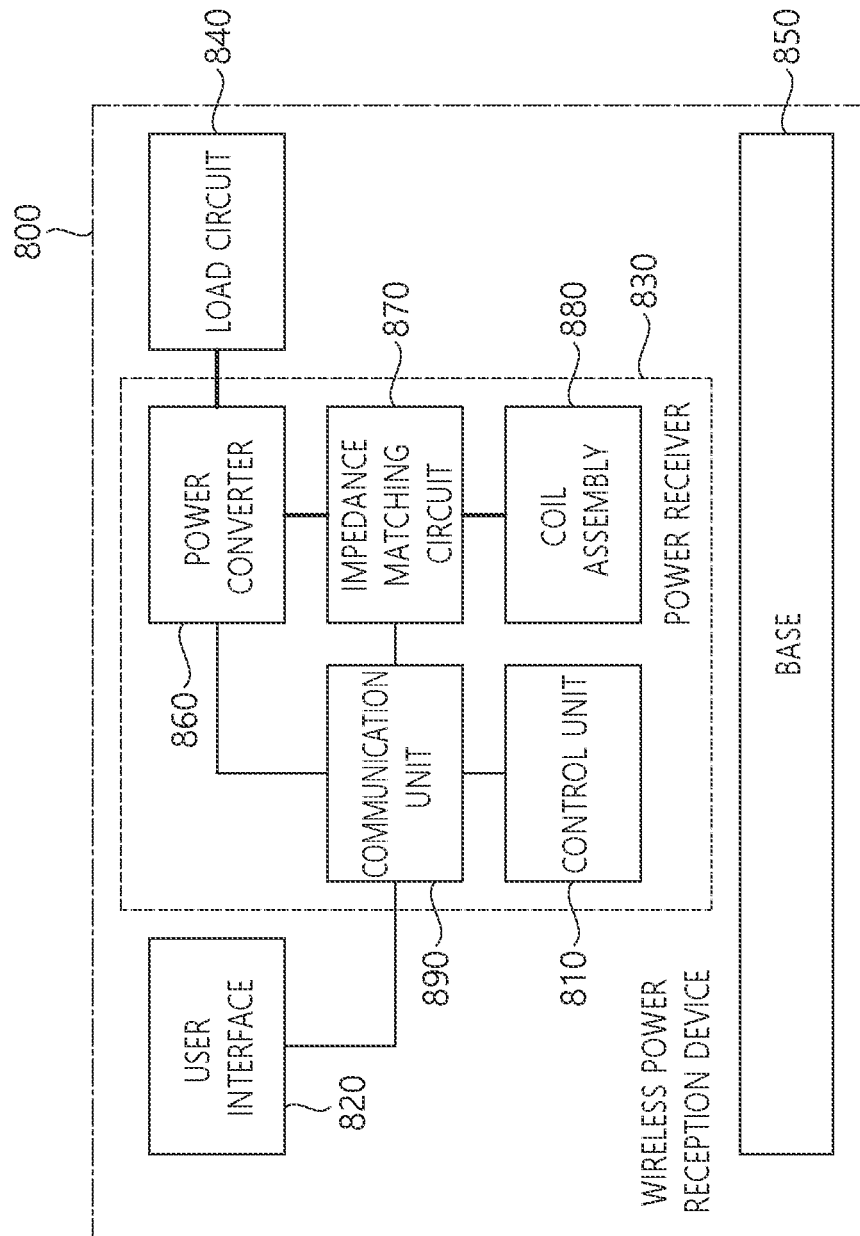
FIG. 12 shows a wireless power receiver according to another exemplary embodiment of the present disclosure.

FIG. 12 shows a wireless power receiver according to another exemplary embodiment of the present disclosure.

This may belong to a wireless power transfer system that is being operated in the magnetic resonance mode or the shared mode.

Referring to FIG. 12, the wireless power receiver (800) may include at least one of a user interface (820) providing information related to power transfer processing and other related information, a power receiver (830) receiving wireless power, a load circuit (840), and a base (850) supporting and covering the coil assembly. Most particularly, the user interface (820) may be optionally included or may be included as another user interface (820) of the wireless power receiver (800).

The power receiver (830) may include at least one of a power converter (860), an impedance matching circuit (870), a coil assembly (880), a communication unit (890), and a control unit (810).

The power converter (860) may convert the AC power that is received from the secondary coil to a voltage and electric current that are suitable for the load circuit. According to an exemplary embodiment, the power converter (860) may include a rectifier. The rectifier may rectify the received wireless power and may convert the power from an alternating current (AC) to a direct current (DC). The rectifier may convert the alternating current to the direct current by using a diode or a transistor, and, then, the rectifier may smooth the converted current by using the capacitor and resistance. Herein, a full-wave rectifier, a half-wave rectifier, a voltage multiplier, and so on, that are implemented as abridge circuit may be used as the rectifier. Additionally, the power converter may adapt a reflected impedance of the power receiver.

The impedance matching circuit (870) may provide impedance matching between a combination of the power converter (860) and the load circuit (840) and the secondary coil. According to an exemplary embodiment, the impedance matching circuit may generate a resonance of approximately 100 kHz, which may reinforce the power transfer. The impedance matching circuit (870) may include a capacitor, an inductor, and a switching device that switches the combination of the capacitor and the inductor. The impedance matching may be performed by controlling the switching device of the circuit that configured the impedance matching circuit (870) based on the voltage value, electric current value, power value, frequency value, and so on, of the wireless power that is being received. In some cases, the impedance matching may be carried out even though the impedance matching circuit (870) is omitted. This specification also includes an exemplary embodiment of the wireless power receiver (200), wherein the impedance matching circuit (870) is omitted.

The coil assembly (880) includes at least one secondary coil, and, optionally, the coil assembly (880) may further include an element shielding the metallic part of the receiver from the magnetic field.

The communication unit (890) may perform load modulation in order to communicate requests and other information to the power transmitter.

For this, the power receiver (830) may perform switching of the resistance or capacitor so as to change the reflected impedance.

The control unit (810) may control the received power. For this, the control unit (810) may determine/calculate a difference between an actual operating point and a target operating point of the power receiver (830). Thereafter, by performing a request for adjusting the reflected impedance of the power transmitter and/or for adjusting an operating point of the power transmitter, the difference between the actual operating point and the target operating point may be adjusted/reduced. In case of minimizing this difference, an optimal power reception may be performed.

The communication unit (890) and the control unit (810) may each be provided as a separate device/chipset or may be collectively provided as one device/chipset.

As described in FIG. 9 etc., the wireless power transmitter and the wireless power receiver go through a Ping Phase and a Configuration Phase to enter the Negotiation Phase, or may go through a ping phase, a configuration phase, and a negotiation phase to enter a power transfer phase and then to a re-negotiation phase.

Figure 13:
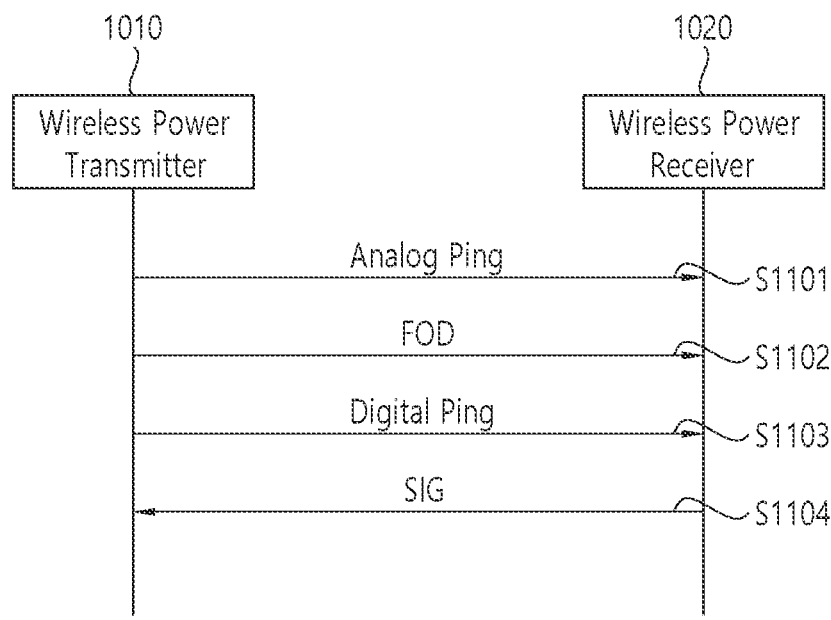
FIG. 13 is a flowchart schematically illustrating a protocol of a ping phase according to an embodiment.

FIG. 13 is a flowchart schematically illustrating a protocol of a ping phase according to an embodiment.

Referring to FIG. 13, in the ping phase, the wireless power transmitter 1010 checks whether an object exists in an operating volume by transmitting an analog ping (S1101). The wireless power transmitter 1010 may detect whether an object exists in the working space based on a change in current of a transmission coil or a primary coil.

If it is determined that an object exists in the operating volume by analog ping, the wireless power transmitter 1010 may perform foreign object detection (FOD) before power transmission to check whether a foreign object exists in the operating volume (S1102). The wireless power transmitter 1010 may perform an operation for protecting the NFC card and/or the RFID tag.

Thereafter, the wireless power transmitter 1010 identifies the wireless power receiver 1020 by transmitting a digital ping (S1103). The wireless power receiver 1020 recognizes the wireless power transmitter 1010 by receiving the digital ping.

The wireless power receiver 1020 that has received the digital ping transmits a signal strength data packet (SIG) to the wireless power transmitter 1010 (S1104).

The wireless power transmitter 1010 receiving the SIG from the wireless power receiver 1020 may identify that the wireless power receiver 1020 is located in the operating volume.

Figure 14:
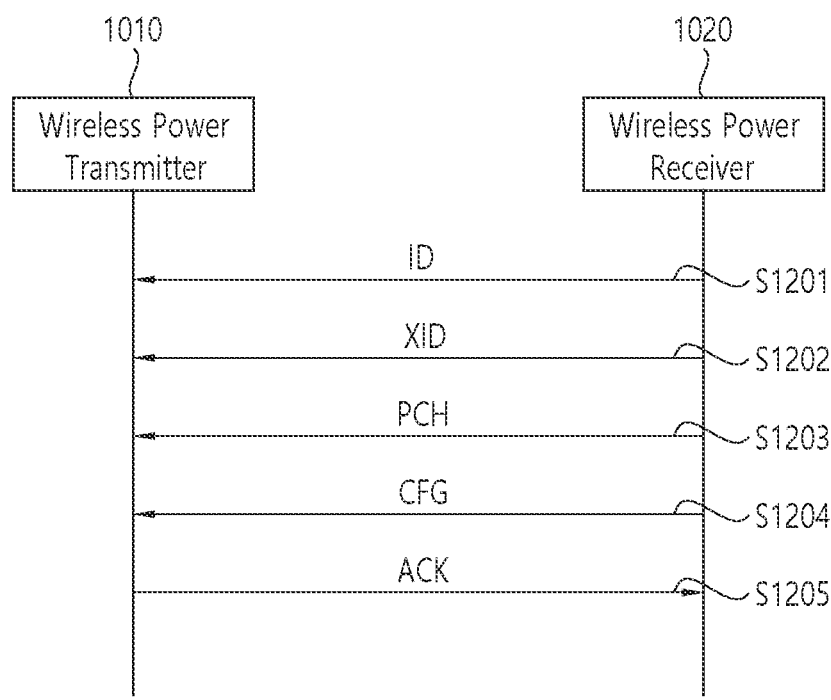
FIG. 14 is a flowchart schematically illustrating a protocol of a configuration phase according to an embodiment.

FIG. 14 is a flowchart schematically illustrating a protocol of a configuration phase according to an embodiment.

In the configuration phase (or identification and configuration phase), the wireless power receiver 1020 transmits its identification information to the wireless power transmitter 1010, the wireless power receiver 1020 and the wireless power transmitter 1010 may establish a baseline Power Transfer Contract.

Referring to FIG. 14, in the configuration phase, the wireless power receiver 1020 may transmit an identification data packet (ID) to the wireless power transmitter 1010 to identify itself (S1201). In addition, the wireless power receiver 1020 may transmit an XID (Extended Identification data packet) to the wireless power transmitter 1010 (S1202). In addition, the wireless power receiver 1020 may transmit a power control hold-off data packet (PCH) to the wireless power transmitter 1010 for a power transfer contract (S1203). In addition, the wireless power receiver 1020 may transmit a configuration data packet (CFG) to the wireless power transmitter (S1204).

In accordance with the Extended Protocol for EPP, the wireless power transmitter 1010 may transmit an ACK in response to the CFG (S1205).

Figures 15, 16:
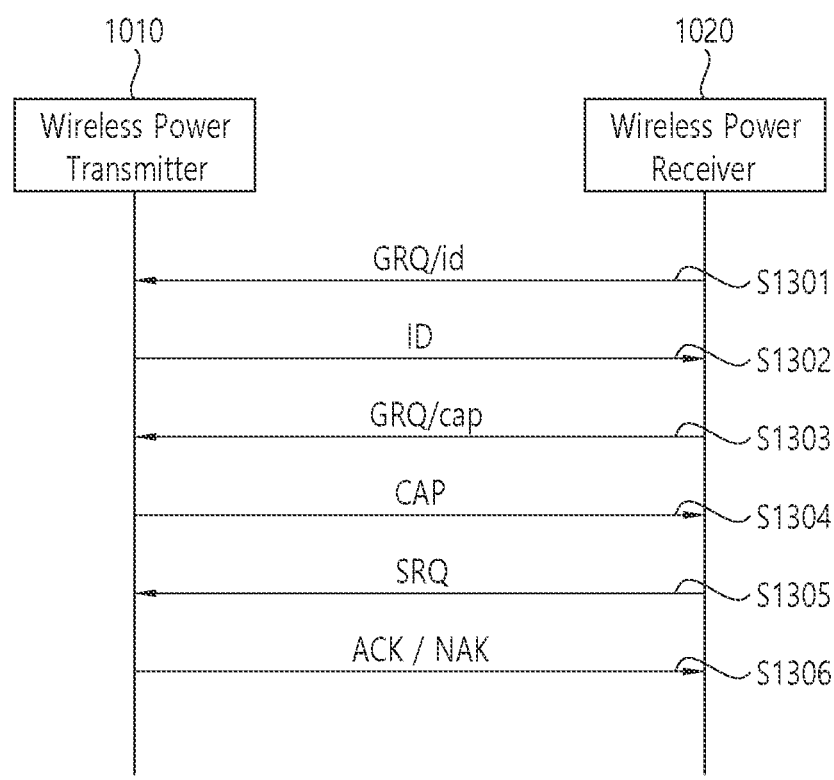
FIG. 15 is a diagram illustrating a message field of a configuration packet (CFG) of a wireless power receiver according to an embodiment.
FIG. 16 is a flowchart schematically illustrating a protocol of a negotiation step or a renegotiation step according to an embodiment.

FIG. 15 is a diagram illustrating a message field of a configuration packet (CFG) of a wireless power receiver according to an embodiment.

A configuration packet (CFG) according to an embodiment may have a header value of 0x51 and may include a message field of 5 bytes, referring to FIG. 15.

Referring to FIG. 15, the message field of the configuration packet CFG may include a 1-bit authentication (AI) flag, and a 1-bit out-of-band (OB) flag.

The authentication flag AI indicates whether the wireless power receiver 1020 supports the authentication function. For example, if the value of the authentication flag AI is '1', it indicates that the wireless power receiver 1020 supports an authentication function or operates as an authentication initiator, if the value of the authentication flag AI is '0', it may indicate that the wireless power receiver 1020 does not support an authentication function or cannot operate as an authentication initiator.

The out-band (OB) flag indicates whether the wireless power receiver 1020 supports out-band communication. For example, if the value of the out-band (OB) flag is '1', the wireless power receiver 1020 instructs out-band communication, if the value of the out-band (OB) flag is '0', it may indicate that the wireless power receiver 1020 does not support out-band communication.

In the configuration phase, the wireless power transmitter 1010 may receive the configuration packet (CFG) of the wireless power receiver 1020 and check whether the wireless power receiver 1020 supports an authentication function and supports out-of-band communication.

FIG. 16 is a flowchart schematically illustrating a protocol of a negotiation step or a renegotiation step according to an embodiment.

In the negotiation phase or renegotiation phase, the power transfer contract related to the reception/transmission of wireless power between the wireless power receiver and the wireless power transmitter is expanded or changed, or a renewal of the power transfer contract is made that adjusts at least some of the elements of the power transfer contract, or exchange of information for establishing out-band communication may be performed.

Referring to FIG. 16, in the negotiation phase, the wireless power receiver 1020 may receive an identification data packet (ID) and a capabilities data packet (CAP) of the wireless power transmitter 1010 using a general request data packet (GRQ).

The general request packet (GRQ) may have a header value of 0x07 and may include a 1-byte message field. The message field of the general request packet (GRQ) may include a header value of a data packet that the wireless power receiver 1020 requests from the wireless power transmitter 1010 using the GRQ packet. For example, when the wireless power receiver 1020 requests an ID packet of the wireless power transmitter 1010 using a GRQ packet, the wireless power receiver 1020 transmits a general request packet (GRQ/id) including a header value (0x30) of the ID packet of the wireless power transmitter 1010 in the message field of the general request packet (GRQ).

Referring to FIG. 16, in the negotiation phase or renegotiation phase, the wireless power receiver 1020 may transmit a GRQ packet (GRQ/id) requesting the ID packet of the wireless power transmitter 1010 to the wireless power transmitter 1010 (S1301).

The wireless power transmitter 1010 receiving the GRQ/id may transmit the ID packet to the wireless power receiver 1020 (S1302). The ID packet of the wireless power transmitter 1010 includes information on the Manufacturer Code. The ID packet including information on the Manufacturer Code allows the manufacturer of the wireless power transmitter 1010 to be identified.

Referring to FIG. 16, in the negotiation phase or renegotiation phase, the wireless power receiver 1020 may transmit a GRQ packet (GRQ/cap) requesting a capability packet (CAP) of the wireless power transmitter 1010 to the wireless power transmitter 1010 (S1303). The message field of the GRQ/cap may include a header value (0x31) of the capability packet (CAP).

The wireless power transmitter 1010 receiving the GRQ/cap may transmit a capability packet (CAP) to the wireless power receiver 1020 (S1304).

Figures 17, 18:
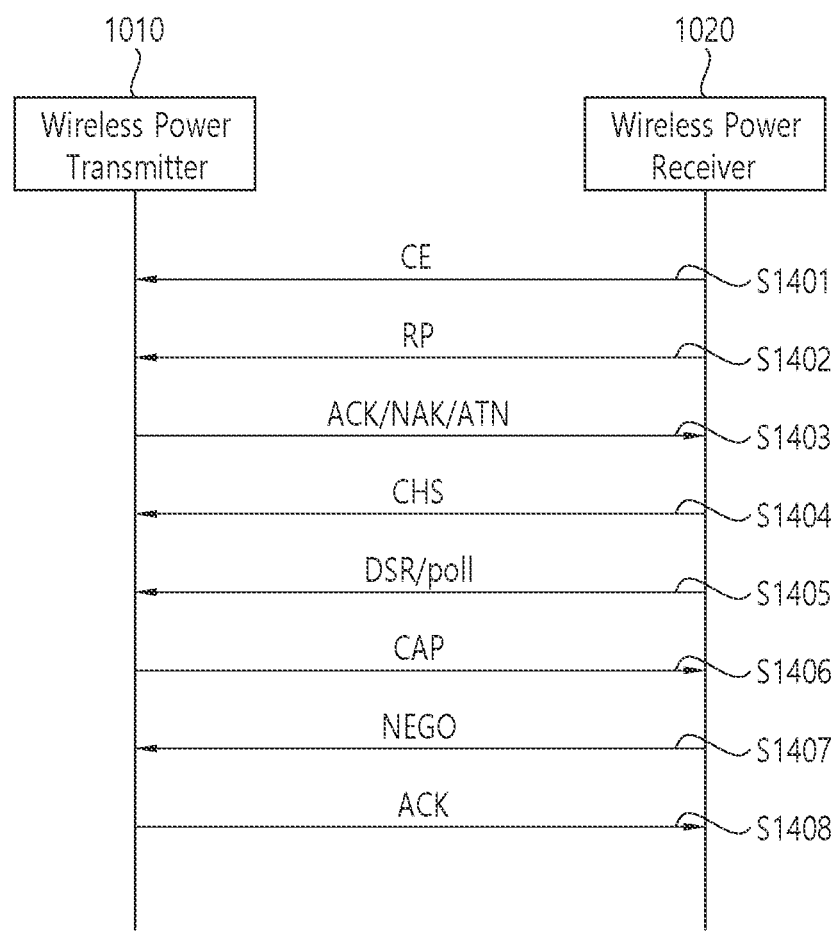
FIG. 17 is a diagram illustrating a message field of a capability packet (CAP) of a wireless power transmitter according to an embodiment.
FIG. 18 is a flowchart schematically illustrating a protocol of a power transmission step according to an embodiment.

FIG. 17 is a diagram illustrating a message field of a capability packet (CAP) of a wireless power transmitter according to an embodiment.

A capability packet (CAP) according to an embodiment may have a header value of 0x31, and referring to FIG. 17, may include a message field of 3 bytes.

Referring to FIG. 17, a 1-bit authentication (AR) flag and a 1-bit out-of-band (OB) flag may be included in the message field of the capability packet (CAP).

The authentication flag AR indicates whether the wireless power transmitter 1010 supports the authentication function. For example, if the value of the authentication flag AR is '1', it indicates that the wireless power transmitter 1010 supports an authentication function or can operate as an authentication responder, if the value of the authentication flag AR is '0', it may indicate that the wireless power transmitter 1010 does not support the authentication function or cannot operate as an authentication responder.

The out-band (OB) flag indicates whether the wireless power transmitter 1010 supports out-band communication. For example, if the value of the out-band (OB) flag is '1', the wireless power transmitter 1010 instructs out-band communication, if the value of the out-band (OB) flag is '0', it may indicate that the wireless power transmitter 1010 does not support out-band communication.

In the negotiation phase, the wireless power receiver 1020 receives a capability packet (CAP) of the wireless power transmitter 1010, it is possible to check whether the wireless power transmitter 1010 supports an authentication function, supports out-of-band communication, and the like.

And, according to FIG. 13, in the negotiation phase or re-negotiation phase, the wireless power receiver 1020 may use at least one specific request packet (SRQ, Specific Request data packet) to update the elements of the Power Transfer Contract related to the power to be provided in the power transfer phase, the negotiation phase or the re-negotiation phase may be ended (S1305).

The wireless power transmitter 1010 may transmit only ACK, only ACK or NAK, or only ACK or ND in response to the specific request packet SRQ according to the type of the specific request packet SRQ (SI 306).

In the above-described ping phase, configuration phase, and negotiation/renegotiation phase, a data packet or message exchanged between the wireless power transmitter 1010 and the wireless power receiver 1020 may be transmitted/received through in-band communication.

Although not shown separately, in order to expand the CAP packet, an XCAP packet, which is information about the capabilities of the wireless power transmitter, may be provided separately. Here, the XCAP packet may include a 1-bit out-of-band (OB) flag, similar to CAP.

FIG. 18 is a flowchart schematically illustrating a protocol of a power transmission step according to an embodiment.

In the power transfer phase, the wireless power transmitter 1010 and the wireless power receiver 1020 may transmit/receive wireless power based on a power transfer contract.

Referring to FIG. 18, in the power transfer phase, the wireless power receiver 1020 transmits a control error data packet (CE) including information on the difference between the actual operating point and the target operating point to the wireless power transmitter 1010 (S1401).

Also, in the power transfer phase, the wireless power receiver 1020 transmits a received power packet (RP, Received Power data packet) including information on the received power value of the wireless power received from the wireless power transmitter 1010 to the wireless power transmitter 1010 (S1402).

In the power transfer phase, the control error packet (CE) and the received power packet (RP) are data packets that are repeatedly transmitted/received according to timing constraints required for wireless power control.

The wireless power transmitter 1010 may control the level of wireless power transmitted based on the control error packet (CE) and the received power packet (RP) received from the wireless power receiver 1020.

The wireless power transmitter 1010 may respond with an 8-bit bit pattern such as ACK, NAK, ATN, etc. to the received power packet (RP) (S1403).

For a received power packet (RP/0) with a mode value of 0, when the wireless power transmitter 1010 responds with ACK, it means that power transmission can continue at the current level.

For a received power packet (RP/0) with a mode value of 0, when the wireless power transmitter 1010 responds with NAK, it means that the wireless power receiver 1020 should reduce power consumption.

For a received power packet (RP/1 or RP/2) having a mode value of 1 or 2, when the wireless power transmitter 1010 responds with ACK, it means that the wireless power receiver 1020 has accepted the power correction value included in the received power packet (RP/1 or RP/2).

For a received power packet (RP/1 or RP/2) having a mode value of 1 or 2, when the wireless power transmitter 1010 responds with NAK, it means that the wireless power receiver 1020 does not accept the power correction value included in the received power packet RP/1 or RP/2.

About Receive Power Packet (RP), when the wireless power transmitter 1010 responds with ATN, it means that the wireless power transmitter 1010 requests permission for communication.

The wireless power transmitter (1010) and the wireless power receiver (1020) can control the transmitted/received power level based on a control error packet (CE), a received power packet (RP), and a response to the received power packet (RP).

Also, in the power transfer phase, the wireless power receiver 1020 transmits a charge status data packet (CHS) including information on the charge state of the battery to the wireless power transmitter 1010 (S1404). The wireless power transmitter 1010 may control the power level of the wireless power based on the information on the state of charge of the battery included in the state of charge packet (CHS).

Meanwhile, in the power transfer phase, the wireless power transmitter 1010 and/or the wireless power receiver 1020 may enter a renegotiation phase to renew the power transfer contract.

In the power transfer phase, when the wireless power transmitter 1010 wants to enter the renegotiation phase, the wireless power transmitter 1010 responds to the received power packet (RP) with ATN. In this case, the wireless power receiver 1020 may transmit a DSR/poll packet to the wireless power transmitter 1010 to give the wireless power transmitter 1010 an opportunity to transmit a data packet (S1405).

When the wireless power transmitter 1010 transmits a capability packet (CAP or XCAP) to the wireless power receiver 1020 in response to the DSR/poll packet (S1406), the wireless power receiver 1020 transmits a renegotiation packet (NEGO) requesting the progress of the re-negotiation phase to the wireless power transmitter 1010 (S1407), when the wireless power transmitter 1010 responds with an ACK to the renegotiation packet (NEGO) (S1408), the wireless power transmitter 1010 and the wireless power receiver 1020 enter a re-negotiation phase.

In the power transfer phase, w % ben the wireless power receiver 1020 wants to enter the re-negotiation phase, the wireless power receiver 1020 transmits a renegotiation packet (NEGO) requesting the progress of the re-negotiation phase to the wireless power transmitter 1010 (S1407), when the wireless power transmitter 1010 responds with an ACK to the renegotiation packet (NEGO) (S1408), the wireless power transmitter 1010 and the wireless power receiver 1020 enter a re-negotiation phase.

Meanwhile, the wireless power transmission system may have an application layer message exchange function to support expansion into various application fields. Based on this function, device authentication related information or other application level messages may be transmitted and received between the wireless power transmitter 1010 and the wireless power receiver 1020. In this way, in order to exchange upper layer messages between the wireless power transmitter 1010 and the wireless power receiver 1020, A separate hierarchical architecture for data transmission is required, an efficient management and operation method of hierarchical architecture is required.

Hereinafter, this Specification Will be Described in More Detail.

Bluetooth standard technology is divided into core specifications into BR/EDR (Basic Rate/Enhanced Data Rate) and LE (Low Energy). Of these, BR/EDR is a wireless communication technology that occupies a dominant position in the short-distance WPAN technology and is applied to many products. Bluetooth Low Energy (BLE) is designed to achieve higher energy efficiency compared to the existing Bluetooth BR/EDR.

Meanwhile, wireless charging methods include a magnetic induction method using a magnetic induction phenomenon between a primary coil and a secondary coil, and a magnetic resonance method in which magnetic resonance is performed using a frequency in a band of several tens of kHz to several MHz to transmit power. Here, the wireless charging standard for the magnetic resonance method is led by a conference called A4WP, and the magnetic induction method is led by the WPC (Wireless Power Consortium).

WPC is designed to send and receive various status information and commands related to the wireless charging system in-band. However, in the case of in-band communication, information exchange is relatively slow because it is not a system designed specifically for communication. Accordingly, in-band communication may not be appropriate communication for fast information exchange and exchange of various information.

Under the above background, a method in which information related to a wireless charging system is exchanged by combining out-of-band communication (in other words, out-of-band communication) with a wireless charging system (e.g., in-band communication) has been attempted. As representative out-of-band technologies, NFC and BLE technologies may correspond to candidate technologies.

On the other hand, in order to wirelessly charge between devices, information is exchanged between devices before charging starts, in addition to this, information for identifying each other's status can be continuously exchanged even during charging.

Currently, in-band technology in WPC communication technology has a technical limitation in that it only supports one-to-one connection between a wireless power transmitter and a wireless power receiver. This point creates difficulties in quickly determining the charging status and managing real-time charging power control. Below, specification will explain the problems that arise from supporting only one-to-one connection from two major perspectives.

Problem 1

When a wireless power transmitter (e.g., including a plurality of coils) wishes to transmit power to multiple wireless power receivers, that is, if a wireless power transmitter wants to communicate with multiple wireless power receivers, it may cause operational delays for certificate-based authentication and/or power control operations. A more specific example of this is explained through the drawings as follows.

Figure 19:
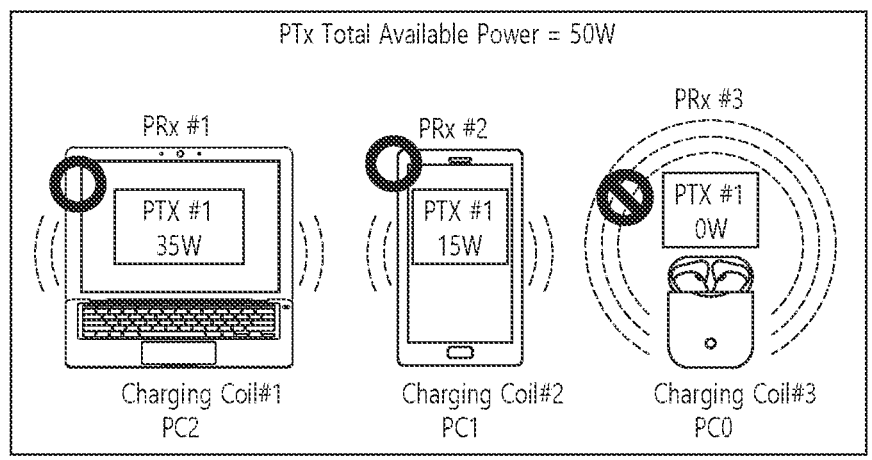
FIG. 19 is an example illustrating problems caused by multiple wireless power receivers requesting power exceeding the maximum output of the wireless power transmitter.

FIG. 19 is an example illustrating problems caused by multiple wireless power receivers requesting power exceeding the maximum output of the wireless power transmitter.

According to FIG. 19, the wireless power transmitter is equipped with, for example, three charging coils and can perform wireless charging to three wireless power receivers at the same time. At this time, each of the three wireless power receivers will attempt to perform wireless charging by being placed on each charging coil.

Meanwhile, in the above situation, as shown on the left side of FIG. 19, for example, a first wireless power receiver with a guaranteed power of 35 W and a second wireless power receiver with a guaranteed power of 15 W are disposed on a wireless power transmitter whose total available power is 50 W, let's assume that the first and second wireless power receivers receive 50 W, which is the total available power that the wireless power transmitter can provide. Here, when a third wireless power receiver is newly deployed and wants to receive wireless power from a wireless power transmitter, since the first wireless power receiver and the second wireless power receiver are already receiving all the available power of the wireless power transmitter, a problem may occur in which the third wireless power receiver cannot receive power from the wireless power transmitter.

That is, in the above situation, as shown on the right side of FIG. 19, 1_pad1 corresponding to charging coil #1 provides guaranteed power of 35 W to the first wireless power receiver, so power transfer enable may be 'Yes'. In addition, 1_pad2, which corresponds to charging coil #2, provides guaranteed power of 15 W to the second wireless power receiver, so power transfer availability may be 'Yes'. However, 2_pad3, which corresponds to charging coil #3, provides 0W to the third wireless power receiver, so power transfer availability may be 'No'.

This problem may be maximized, for example, when the third wireless power receiver has a higher charging priority than the first wireless power receiver and/or the second wireless power receiver. This is because, although the device on which wireless charging must actually be performed is a third wireless power receiver, this is because power is preferentially transmitted to the first and/or second wireless power receivers of relatively low importance.

The reason why wireless charging is preferentially performed for wireless power receivers with relatively low priority as described above is as follows.

As described above, the current wireless charging system supports only one-to-one communication between a wireless power transmitter and a wireless power receiver. In other words, current wireless power transmitters have never considered communicating about wireless power with a plurality of wireless power receivers. Accordingly, current wireless power transmitters do not also consider charging priorities among a plurality of wireless power receivers. Because of this, the current wireless power transmitter preferentially transmits wireless power to the wireless power receiver with low charging priority.

Additionally, since current wireless power transmitters only support one-to-one communication with wireless power receivers, users and others cannot set charging priorities (between wireless power receivers). Here, the fact that a user or the like cannot set priorities among wireless power receivers may mean that charging priority can be determined depending on the implementation of the wireless power transmitter. Because of this, the current wireless power transmitter preferentially transmits wireless power to the wireless power receiver with low charging priority.

In summary, in the current case, as shown in FIG. 19, in a situation where the wireless power transmitter supports multiple coils, if the wireless power transmitter receives (differently or identically) requests for power exceeding the maximum output of the wireless power transmitter from several wireless power receivers, since there is no charging management standard (e.g., predefined charging priority of wireless power receiver, etc.), efficient charging management is difficult. That is, in the current case, (re)negotiation between a wireless power transmitter having a plurality of coils and a plurality of wireless power receivers (or a plurality of wireless power transmitters and a plurality of wireless power receivers) is not clearly defined. And this can cause major delays.

Problem 2

When a wireless power transmitter (e.g., including a plurality of coils) wishes to transmit power to one or more wireless power receivers, that is, when a wireless power transmitter wants to communicate with one or more wireless power receivers, this may cause operational delays for certificate-based authentication and/or power control operations. A more specific example of this is explained through the drawings as follows.

Figure 20:
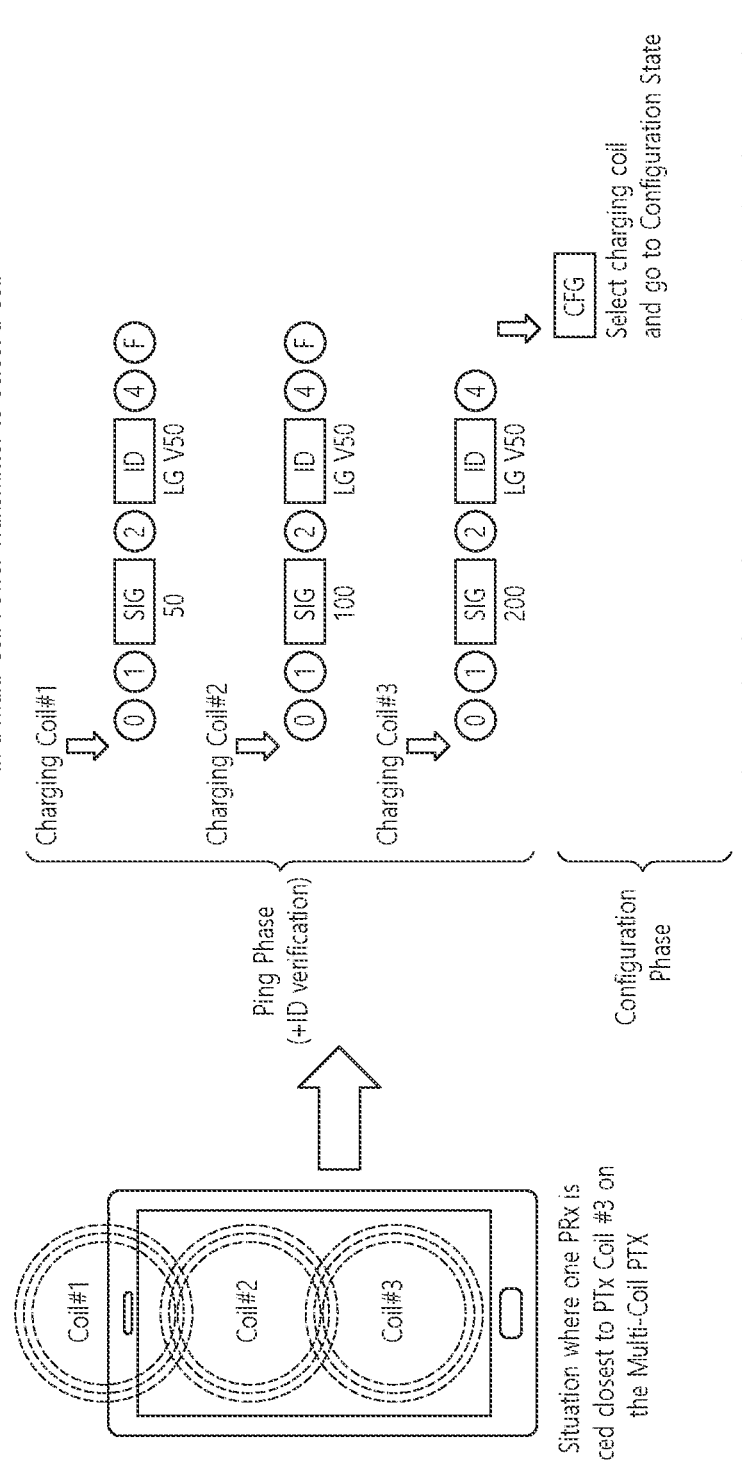
FIG. 20 schematically shows an example of a problem situation that occurs because the wireless power transmitter only receives status information for one coil at a time.

FIG. 20 schematically shows an example of a problem situation that occurs because the wireless power transmitter only receives status information for one coil at a time.

In the example of FIG. 20, for convenience of explanation, an example of communication between a wireless power transmitter including a plurality of coils and one wireless power receiver is described. However, this is only an example, and the following problems may occur in communication between a wireless power transmitter including a plurality of coils and a plurality of wireless power receivers.

According to the left side of FIG. 20, for example, a wireless power receiver may be located on a wireless power transmitter including three coils (e.g., coil #1, coil #2, and coil #3). And, for example, the wireless power receiver may be placed closest to coil #3.

At this time, as described above, the wireless power transmitter and wireless power receiver currently support only one-to-one communication, so the wireless power transmitter can receive the SIG for each charging coil as shown on the right side of FIG. 20.

According to the right side of FIG. 20, in the ping phase, the wireless power transmitter may receive the SIG for charging coil #1 from the wireless power receiver. Afterwards, the wireless power transmitter can receive the SIG for charging coil #2 from the wireless power receiver. And, the wireless power transmitter can receive the SIG for charging coil #3 from the wireless power receiver. That is, the wireless power transmitter can sequentially receive SIGs for charging coils #1, #2, and #3 from the wireless power receiver. Thereafter, the wireless power transmitter and/or wireless power receiver may move to the setting state after selecting the charging coil. For reference, in the example of FIG. 20, since the signal in coil #3, that is, SIG, is the maximum, the wireless power transmitter and/or wireless power receiver may select coil #3 as the optimal coil.

As previously explained, current wireless power transmitters can obtain information from only one coil at a time. And, information about one coil can be obtained through in-band communication, which corresponds to low-speed communication. Accordingly, there is a delay in the wireless power transmitter determining the status of multiple coils, so it takes a long time for the wireless power transmitter to select the optimal coil.

In other words, a wireless power transmitter including a plurality of coils sequentially acquires data (e.g. SIG (signal strength), device ID, etc.) for coil selection between one or more wireless power receivers for each coil through low-speed in-band communication, this may cause delays.

In summary, in the current case, as shown in FIG. 20, (re)negotiation between one or more wireless power receivers and a wireless power transmitter including a plurality of coils has a communication sequence, which may cause a large delay.

So far, problems arising from one-to-one communication between a wireless power transmitter and a wireless power receiver have been described. The problems described above mainly correspond to problems that occur because only one-to-one communication is provided between a wireless power transmitter and a wireless power receiver.

Accordingly, in the following, configurations that provide one-to-many (or many-to-many, or many-to-one) communication using out-of-band communication (e.g., BLE communication) between a wireless power transmitter and a wireless power receiver will be provided.

First of all, communication about wireless power to a plurality of wireless power receivers is the main aspect, exchange of information about wireless power (for example, through out-of-band communication) between one wireless power transmitter and a plurality of wireless power receivers will be described.

Hereafter, taking into account the fact that a plurality of charging coils are included in one wireless power transmitter, exchange of information about a plurality of charging coils (for example, through out-of-band communication) between one wireless power transmitter and at least one wireless power receiver will be described.

1. Communication Regarding Wireless Power to Multiple Wireless Power Receivers

Hereinafter, communication regarding wireless power for a plurality of wireless power receivers will be described. In the case of the configuration provided in this content, the effect of the configuration is maximized in the case of multiple wireless power receivers, the configuration provided in this content does not necessarily apply to communication regarding wireless power with a plurality of wireless power receivers. That is, the configuration provided in this content can also be applied to communication between one wireless power transmitter (or multiple wireless power transmitters) and one wireless power receiver.

In addition, in the following description, communication between one wireless power transmitter and a plurality of wireless power receivers is mainly described, so the content that the wireless power transmitter includes a plurality of coils may not be emphasized. However, this is only a description for convenience of explanation, and in the embodiments of the present specification, the wireless power transmitter may include a plurality of coils. Accordingly, embodiments of the present specification can also be applied to exchanging information about a plurality of charging coils, which will be described later.

The following drawings were prepared to explain a specific example of the present specification. Since the names of specific devices or specific signals/messages/fields described in the drawings are provided as examples, the technical features of this specification are not limited to the specific names used in the drawings below.

Figure 21:
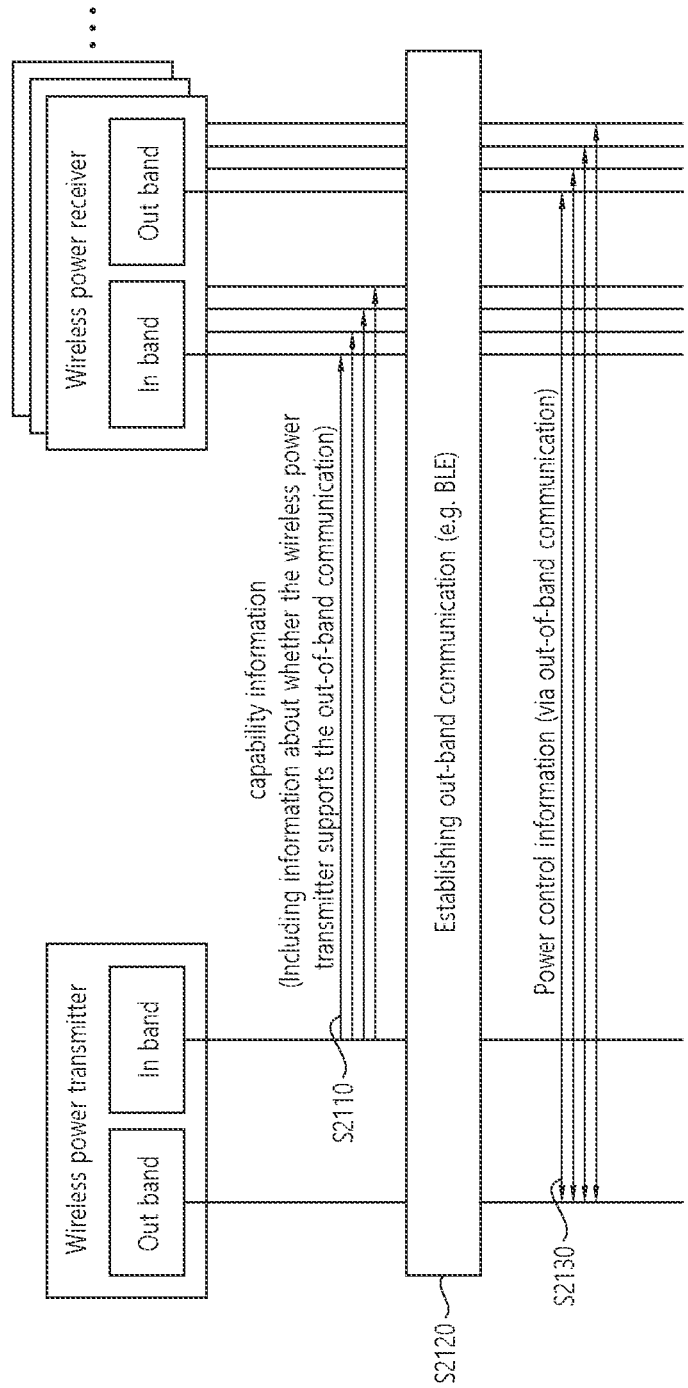
FIG. 21 is a flowchart of a method for establishing out-of-band communication in a wireless power transmission system, according to an embodiment of the present specification.

FIG. 21 is a flowchart of a method for establishing out-of-band communication in a wireless power transmission system, according to an embodiment of the present specification.

According to FIG. 21, the wireless power transmitter may transmit a plurality of capability information to each of a plurality of wireless power receivers through in-band communication (S2110). At this time, although a plurality of wireless power receivers are shown in this drawing, the example in this drawing can be applied even in the case of a single wireless power receiver, as described above.

Each of the capability information may include information on whether the wireless power transmitter supports the out-of-band communication, and the capability information at this time may be transmitted/received, for example, in a negotiation phase. The capability information here may correspond, for example, to the CAP or XCAP packet described in FIG. 17. And, as described in FIG. 17, whether the wireless power transmitter supports out-band communication can be indicated through an OB packet included in the CAP or XCAP packet. Here, if the value of OB is 1, it may indicate that the wireless power transmitter supports out-of-band communication. In addition, if the value of OB is 0, it may indicate that the wireless power transmitter does not support out-band communication.

At this time, when the value of OB is 1, the wireless power transmitter supports out-band communication, and when the value of OB is 0, the wireless power transmitter does not support out-band communication. This may be just an example. That is, when the value of OB is 0, the wireless power transmitter may support out-band communication, and when the value of OB is 1, the wireless power transmitter may not support out-band communication.

Meanwhile, although not separately shown, the wireless power receiver may also transmit information indicating whether the wireless power receiver itself supports out-band communication to the wireless power transmitter in advance, for example. And, at this time, the information transmitted in advance may be included in, for example, CFG, that is, a configuration packet, that the wireless power transmitter receives from the wireless power receiver. At this time, the configuration packet may be transmitted/received in the configuration phase before the negotiation phase, as described above.

Similarly, in this case, if the OB packet included in the CFG packet is 1, the wireless power receiver supports out-band communication, if the OB packet is 0, the wireless power receiver may not support out-of-band communication. Of course, the reverse situation (that is, when the OB packet is 0, the wireless power receiver supports out-band communication, and when the OB packet is 1, the wireless power receiver does not support out-band communication) may apply.

Thereafter, the wireless power transmitter may establish the out-of-band communication with the plurality of wireless power receivers based on transmission of a plurality of capability information (S2120). An example in which a wireless power transmitter establishes out-band communication based on transmission of capability information may be described in more detail as follows.

Although not separately shown, the wireless power transmitter may receive a GRQ/CAP or XCAP packet from the wireless power receiver (at the start of the negotiation phase). And at this time, the GRQ/CAP or XCAP packet may correspond to information requesting capability information to determine whether BLE OOB is available to the wireless power transmitter.

Thereafter, the wireless power transmitter may transmit a CAP or XCAP packet (in response to the GRQ/CAP or XCAP packet) to the wireless power receiver. And, the wireless power receiver can check the OB bit in the CAP or XCAP packet to confirm that the OB bit is valid.

Here, for example, the wireless power transmitter may receive a GRQ/COMM requesting specific OOB information from the wireless power receiver, and then the wireless power transmitter may transmit OOB information to the wireless power receiver.

Thereafter, for example, the wireless power transmitter and the wireless power receiver may establish out-of-band communication (e.g., BLE communication) by exchanging encryption keys, encryption information, etc.

After out-of-band communication is established, the wireless power transmitter may exchange power control information about the plurality of wireless power receivers with the plurality of wireless power receivers through the out-of-band communication (S2130). That is, the wireless power transmitter can transmit power control information to the wireless power receiver. Additionally, the wireless power transmitter may receive power control information from the wireless power receiver. At this time, specific examples of information transmitted by the wireless power transmitter to the wireless power receiver and information received by the wireless power transmitter from the wireless power receiver will be described later.

Below, when wireless power transmitters and wireless power receivers exchange power control information, what the power control information at this time, that is, the out-of-band communication (e.g. BLE) packet structure, will be explained.

Figure 22:
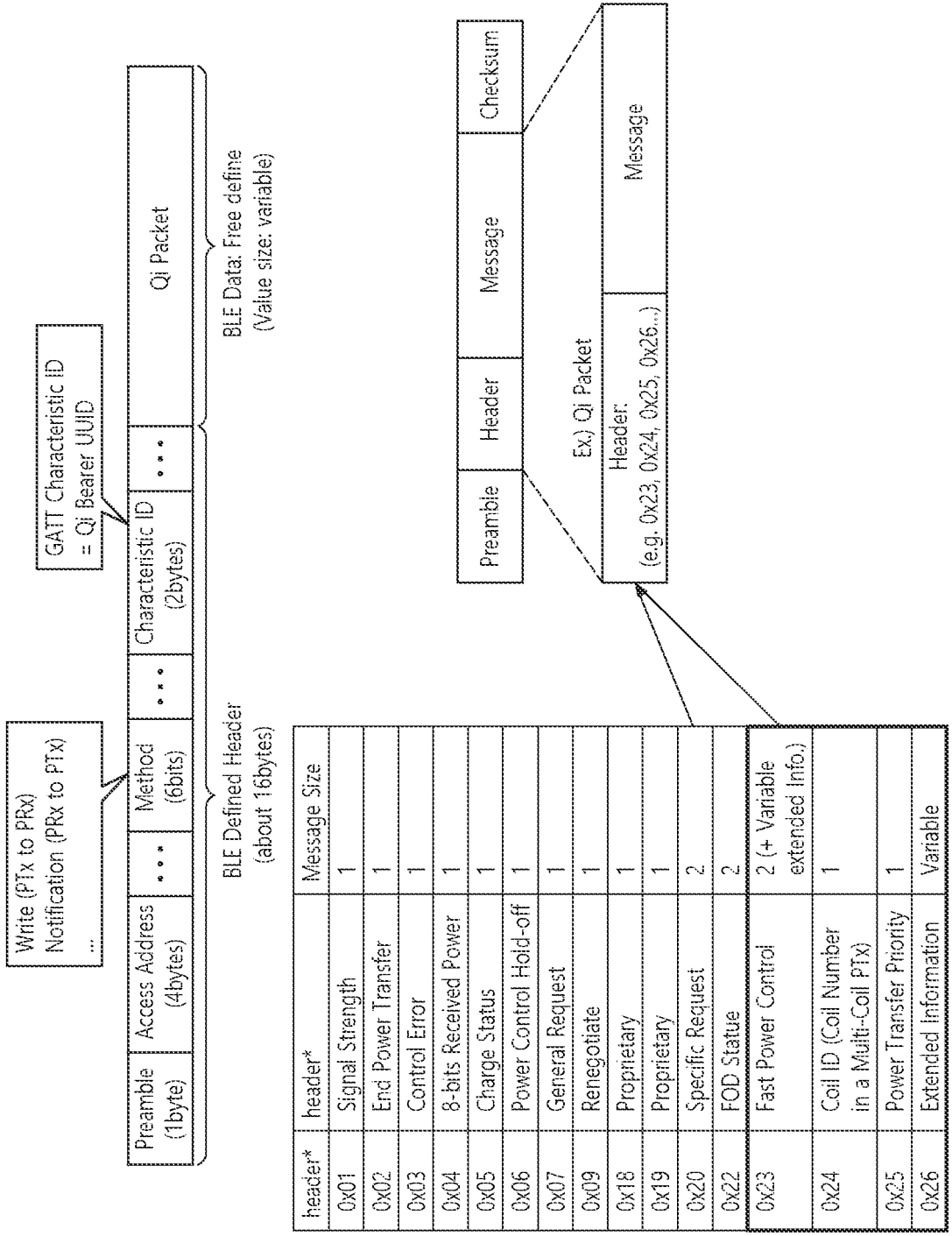
FIG. 22 schematically shows an example of the structure of an out-of-band communication packet for power control information.

(1) Out-of-Band Communication (e.g. BLE) Packet Structure for Power Control Information FIG. 22 schematically shows an example of the structure of an out-of-band communication packet for power control information.

As shown at the top of FIG. 22, an out-of-band communication packet, for example for power control information, may be composed of, for example, a BLE definition header and BLE data. Here, the BLE definition header may include, for example, 'preamble'. 'access address', 'method', and characteristic ID'. And, in the case of BLE data, Qi packets provided in our specification, that is, power control information, may be included.

Here, as shown at the bottom of FIG. 22, types of power control information included in the out-of-band packet may include, for example, fast power control information with 0x23 header, for example, a coil ID (coil number in a multi-coil wireless power transmitter) with a 0x24 header, for example, power transfer priority with a 0x25 header, extended information with a 0x26 header, etc.

More specifically, in addition to the information shown in FIG. 22, the BLE power control message may include at least one of, for example, coil ID, signal strength (SIG), ID (PRx Device & Manufacturer ID), power class via OOB, mis-alignment status, FOD status, power transfer enable, wireless power receiver received power, and/or wireless power receiver power transfer priority (PRX Power Transfer Priority).

Here, as an example, in the case of priority, the wireless power transmitter (or wireless power receiver) selects the priority according to the device type, or the wireless power transmitter (or wireless power receiver) can select priority in order of first request (i.e., first-come, first-served) or most recent request. Additionally, the wireless power transmitter (or wireless power receiver) can select priority depending on the manufacturer's selection.

(2) Power Negotiation/Allocation Based on Priorities

So far, we have explained the out-of-band communication (e.g. BLE) packet structure for power control information. Below, an example of a method for power negotiation/ allocation based on priority will be described using the out-of-band communication packet for power control information.

First, let us conceptually describe the embodiments provided in this specification.

FIG. 23 shows an example of a schematic comparison between the existing technology and the proposed technology from the perspective of priority-based power negotiation/allocation. The left side of FIG. 23 corresponds to an example schematically showing the existing technology, and the right side of FIG. 23 corresponds to an example schematically showing the proposed technology.

According to the left side of FIG. 23, the wireless power transmitter can be equipped with, for example, three charging coils, through which wireless charging can be performed for three wireless power receivers at the same time.

In the above situation, as specifically explained above in Problem 1, if the wireless power receiver that is currently charging (e.g., the first wireless power receiver and the second wireless power receiver) has already consumed all the power of the wireless power transmitter, there is a problem that the third wireless power receiver, which is a new wireless power receiver, cannot be charged.

For that reason, in the case of Qi EPP, in the negotiation phase, information is exchanged about how much load power is currently available through the capability information of the wireless power transmitter, this is because in the current BPP/EPP protocol, communication between a wireless power transmitter and a wireless power receiver is based on one-to-one communication. That is, the current BPP/EPP protocol does not support one-to-many (wireless power transmitter to multi-wireless power receiver) negotiation.

Accordingly, this specification seeks to provide a configuration that performs wireless power transmission based on charging priority, as shown on the right side of FIG. 23. In this specification, an example where the higher the priority level is, the higher the priority.

As an example on the right side of FIG. 23, the wireless power transmitter is used when the total available power of the wireless power device is 50 W, the first wireless power receiver may have priority level 3, the second wireless power receiver may have priority level 1, and the third wireless power receiver may have priority level 2.

In the above priority situation, as shown on the left side of FIG. 23, a situation in which the third wireless power receiver, which has the second highest priority, receives power of 0W, that is, a situation in which the third wireless power receiver does not receive wireless power from the wireless power transmitter, is an undesirable situation. This is because, even though the second wireless power receiver with the lowest priority is receiving power, the third wireless power receiver with the second highest priority is not receiving power.

Therefore, in this specification, as shown in the example on the right side of FIG. 23, allocating some or all of the power of the second wireless power receiver with the lowest priority to the third wireless power receiver, for example, it is intended to provide a configuration that allows the second wireless power receiver to receive 8 W of power and the third wireless power receiver to receive 5 W of power.

That is, in this specification, based on the wireless power transmitter supporting multiple coils, when multiple wireless power receivers request power exceeding the maximum output of the wireless power transmitter, the wireless power transmitter/wireless power receiver provides a configuration that negotiates/allocates BLE OOB-based differential power with multiple wireless power receivers based on the priorities of the wireless power receivers.

To this end, the wireless power transmitter determines the power class, misalignment, FOD, charging status, etc. of the wireless power receiver(s) through BLE OOB, the wireless power transmitter/wireless power receiver can display this to the user (e.g. LED display, sound alarm, etc.).

Here, the charging priority of the wireless power receiver may be set in advance to the wireless power transmitter and/or wireless power receiver through BLE OOB. Through this, if the existing charging wireless power receiver (PRx #1, #2) has already been allocated the power of all wireless power transmitters, it becomes possible for the wireless power transmitter and/or the wireless power receiver to reset the charging power according to the charging priority to charge the new wireless power receiver (PRx #3). At this time, as an example of the criteria for multi-wireless power receiver charging settings, that is, the priority of the wireless power receiver, examples may be provided such as priority based on wireless power receiver device type (SoC setting) and (priority) allocation by wireless power receiver request power ratio. Specific details regarding this will be described later.

Meanwhile, when the wireless power transmitter receives a request from the wireless power receiver(s) for power exceeding the maximum allowable power, a wireless power transmitter may attempt to change the power delivery agreement with the negotiable wireless power receiver(s). And, if negotiation is not possible, it is necessary to transfer power using the maximum available power or BPP (basic power profile).

Accordingly, the following provides a specific protocol through which a wireless power transmitter negotiates with a multi-wireless power receiver.

1) Power Negotiation/Allocation Protocol Based on Priority

Hereinafter, a protocol in which a wireless power transmitter negotiates differential power and/or controls power allocation with multiple wireless power receivers based on BLE OOB will be described.

Figure 24:
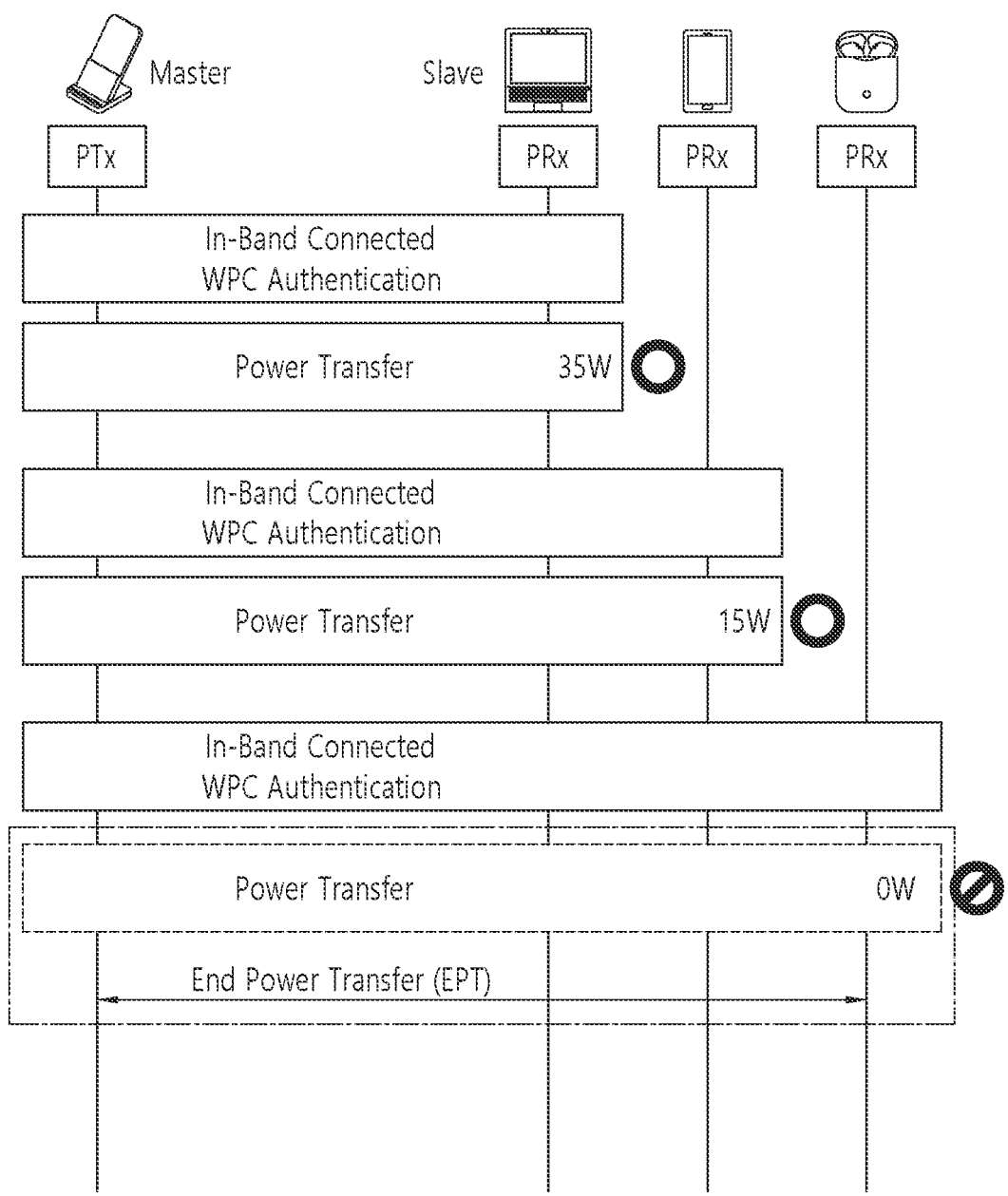
FIG. 24 is a flowchart schematically showing the wireless power transfer protocol of a current wireless power transmitter.

FIG. 24 is a flowchart schematically showing the wireless power transfer protocol of a current wireless power transmitter.

According to FIG. 24, the wireless power transmitter may enter into a power transmission contract with the first wireless power receiver through in-band communication. And, the wireless power transmitter can transmit 35 W of power to the first wireless power receiver.

The wireless power transmitter may enter into a power transmission contract with the second wireless power receiver through in-band communication. And, the wireless power transmitter can transmit 15 W of power to the second wireless power receiver.

In this situation, sequentially, the wireless power transmitter may attempt to enter into a power transfer agreement with a third wireless power transmitter through in-band communication. However, as previously explained, for example, if the maximum available power of the wireless power transmitter is 50 W, the first and second wireless power receivers may consume all available power.

Because of this, the wireless power transmitter has no power to transmit to the third wireless power receiver, and the wireless power transmitter and wireless power receiver can exchange end power transfer (EPT).

To summarize the situation in FIG. 24, since the wireless power receiver (e.g., the first wireless power receiver and the second wireless power receiver) that is currently charging has already consumed all the power of the wireless power transmitter, a problem arises in that it is impossible to charge the third wireless power receiver corresponding to the new wireless power receiver. As described above, this problem is maximized when the charging priority of the third wireless power receiver is higher than, for example, the charging priority of the first and/or second wireless power receiver.

Accordingly, this specification proposes the following protocol.

The following drawings were prepared to explain a specific example of the present specification. Since the names of specific devices or specific signals/messages/fields described in the drawings are provided as examples, the technical features of this specification are not limited to the specific names used in the drawings below.

Figure 25:
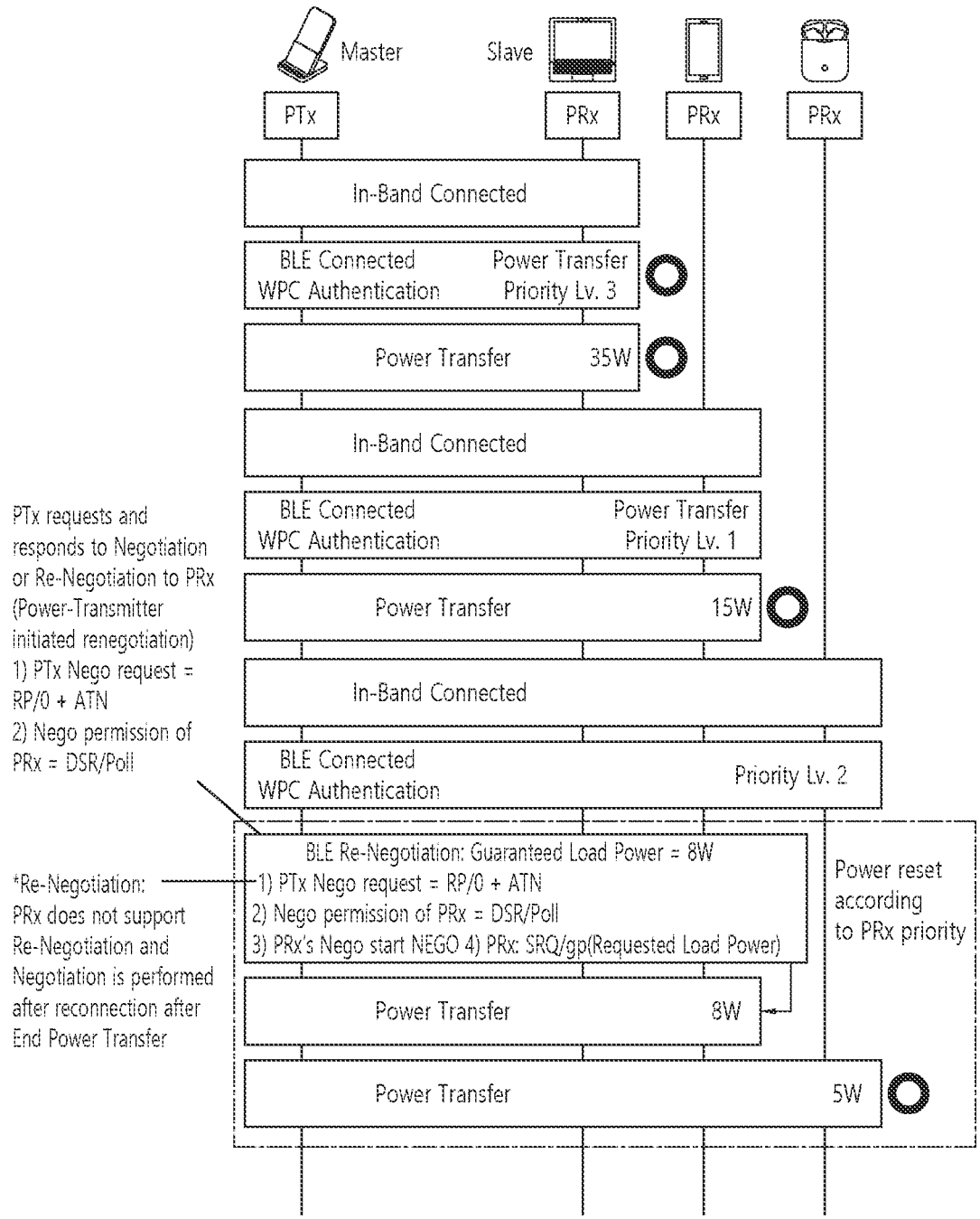
FIG. 25 is a flowchart of the priority-based power negotiation/allocation protocol proposed in this specification.

FIG. 25 is a flowchart of the priority-based power negotiation/allocation protocol proposed in this specification.

According to FIG. 25, as previously described, the first wireless power receiver has the highest charging priority (e.g., power delivery priority level 3), next, a third wireless power receiver has a high charging priority (e.g., power delivery priority level 2), finally, the second wireless power receiver may have the lowest charging priority (e.g., power transfer priority level 1).

Here, the wireless power transmitter can establish an in-band and BLE connection with the first wireless power receiver. And, the wireless power transmitter can transmit, for example, 35 W of power to the first wireless power receiver.

In addition, the wireless power transmitter can establish an in-band and BLE connection with the second wireless power receiver. And, the wireless power transmitter can transmit, for example, 15 W of power to the second wireless power receiver.

In the above situation, the wireless power transmitter can establish an in-band and BLE connection with a third wireless power receiver. And, the wireless power transmitter may determine that there is no remaining power that can be transmitted to the third wireless power receiver.

At this time, even though the wireless power transmitter is transmitting power to the second wireless power transmitter with lower priority, for a third wireless power transmitter that has a higher priority, a situation in which the wireless power transmitter is not transmitting power is an undesirable situation.

Accordingly, the wireless power transmitter may renegotiate the guaranteed load power with the second wireless power receiver, which is a wireless power receiver that has a lower priority than the third wireless power receiver. And at this time, renegotiation can be performed through BLE communication (i.e., BLE packet including Qi packet).

At this time, (re)negotiation can be implemented by the wireless power transmitter requesting negotiation or renegotiation from the wireless power receiver, and the wireless power receiver responding.

More specifically. (re)negotiation of power can be performed through the following protocol.

i) The wireless power transmitter may receive RP/0 from the wireless power receiver, and the wireless power transmitter may transmit an ATN to the wireless power receiver to request negotiation from the wireless power receiver.

ii) The wireless power receiver may transmit a DSR/Poll to the wireless power transmitter in response to the above negotiation request. That is, the wireless power receiver can allow negotiation.

iii) Negotiation can begin by the wireless power receiver transmitting NEGO to the wireless power transmitter.

iv) Afterwards, the wireless power receiver may transmit the requested load power (e.g. SRQ/gp) to the wireless power transmitter.

At this time, the previously described RP/0, ATN, DSR/poll, NEGO and/or SRQ/gp can be exchanged between the wireless power transmitter and wireless power receiver through the previously described BLE packet. Accordingly, compared to RP/0, ATN, DSR/poll, NEGO and/or SRQ/gp being exchanged through existing in-band communication, RP/0, ATN, DSR/poll, NEGO and/or SRQ/gp can be exchanged between the wireless power transmitter and wireless power receiver at a faster rate.

Here, if the wireless power receiver does not support renegotiation, the wireless power transmitter and the wireless power receiver can exchange EPT (end power transfer) to perform reconnection. Then, the wireless power transmitter and the wireless power receiver can perform negotiation.

Through the above process, the wireless power transmitter can change the power delivered to the second wireless power transmitter to, for example, 8 W.

And, through the above (re)negotiation, the wireless power transmitter has remaining available power. Accordingly, the wireless power transmitter can transmit 5 W of the remaining power to the third wireless power receiver.

Meanwhile, the method of performing renegotiation between the previously described wireless power transmitter and the second wireless power receiver may be described in separate drawings as follows.

Figure 26:
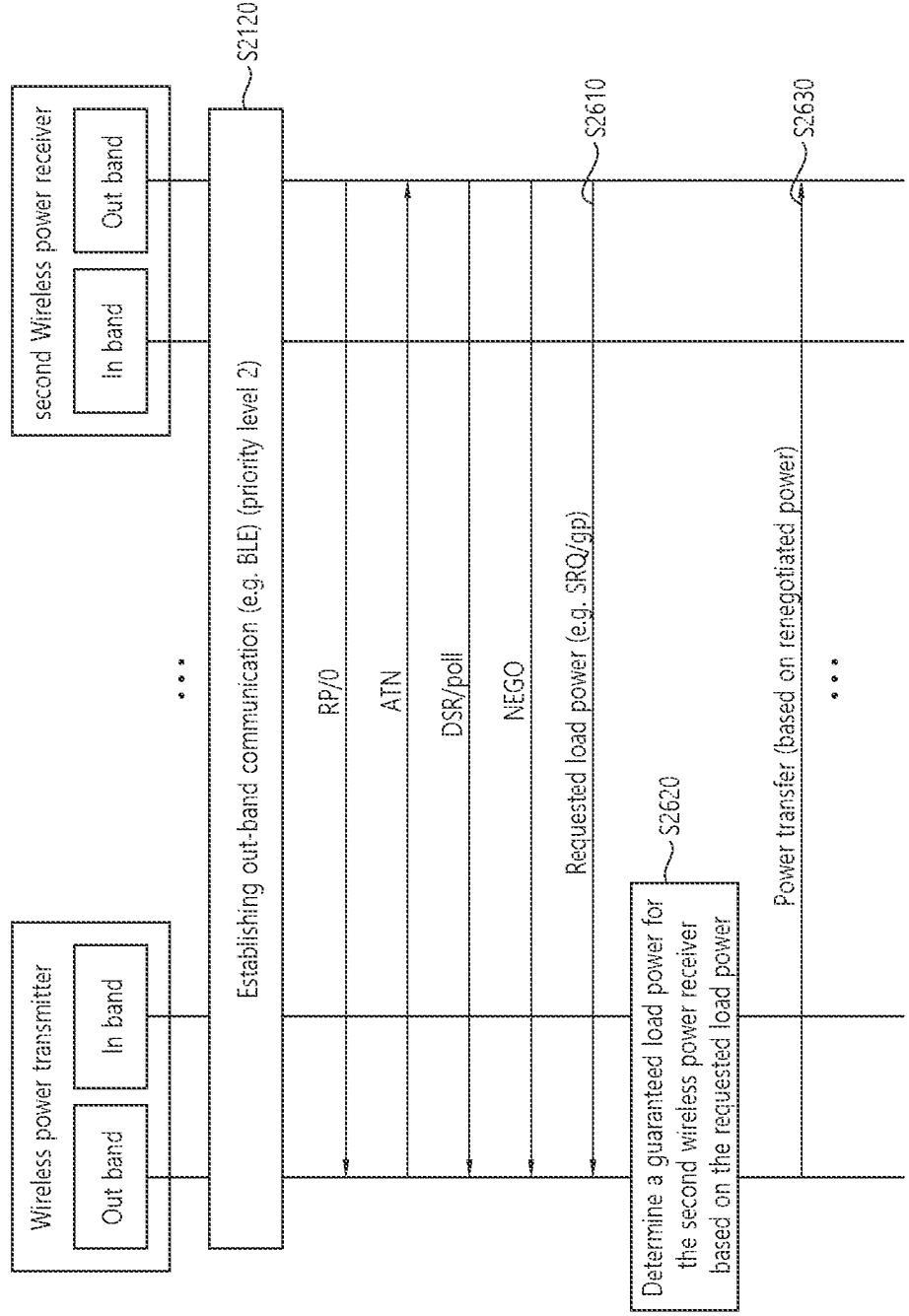
FIG. 26 shows a flowchart of the priority-based power negotiation/allocation protocol proposed in this specification in another form.

FIG. 26 shows a flowchart of the priority-based power negotiation/allocation protocol proposed in this specification in another form.

According to FIG. 26, the wireless power transmitter can establish out-of-band communication with the second wireless power receiver. And the priority level of the second wireless power receiver may correspond to, for example, power transfer priority level 2.

The wireless power transmitter may receive RP/0 from the second wireless power receiver. And, the wireless power transmitter can transmit the ATN to the second wireless power receiver. Afterwards, the wireless power transmitter can receive DSR/poll and NEGO from the wireless power receiver.

At this time, the wireless power transmitter can receive the load power (e.g. SRQ/gp) requested from the wireless power receiver (S2610).

Thereafter, the wireless power transmitter may determine the load power guaranteed for the second wireless power receiver based on the requested load power (S2620).

Based on the determination of the guaranteed load power as above, the wireless power transmitter and the second wireless power receiver may complete renegotiation of power. And, the wireless power transmitter may transfer power to the second wireless power receiver based on the renegotiated power (S2630). The specific details of the example described in FIG. 26 are the same as previously described in FIG. 25. Accordingly, description of repeated content will be omitted.

As explained so far, according to the proposed technology herein as in FIGS. 25 and 26, (when the wireless power transmitter supports multiple coils) even when the wireless power receivers request power exceeding the maximum output of the wireless power transmitter, it is possible for a wireless power transmitter to negotiate and/or allocate differential power with wireless power receivers through BLE OOB according to the priority of the wireless power receivers.

Hereinafter, information on charging priorities exchanged between the wireless power transmitter and the wireless power receiver will be described in more detail.

2) Configuration of Charging Priority Information

As previously described, the priority of the wireless power receiver may be selected based on the wireless power transmitter supporting multiple coils. In addition, differential power negotiation and/or power allocation may be performed with multiple wireless power receivers through BLE OOB according to priority.

Here, data for differential power negotiation and/or power allocation with multiple wireless power receivers may include the following packets. That is, the following data can be exchanged between the wireless power transmitter and each wireless power receiver through, for example, BLE packets.

Power class via OOB
Misalignment
FOD
power transfer enable
Receiving power of wireless power receiver (PRX receiving power)
Power transfer priority of wireless power receiver (PRX power transfer priority)

Assuming that the above data is exchanged, an example in which a wireless power transmitter including a plurality of charging coils provides wireless power to each of a plurality of wireless power receivers will be described with the help of the drawings as follows.

Figure 27:
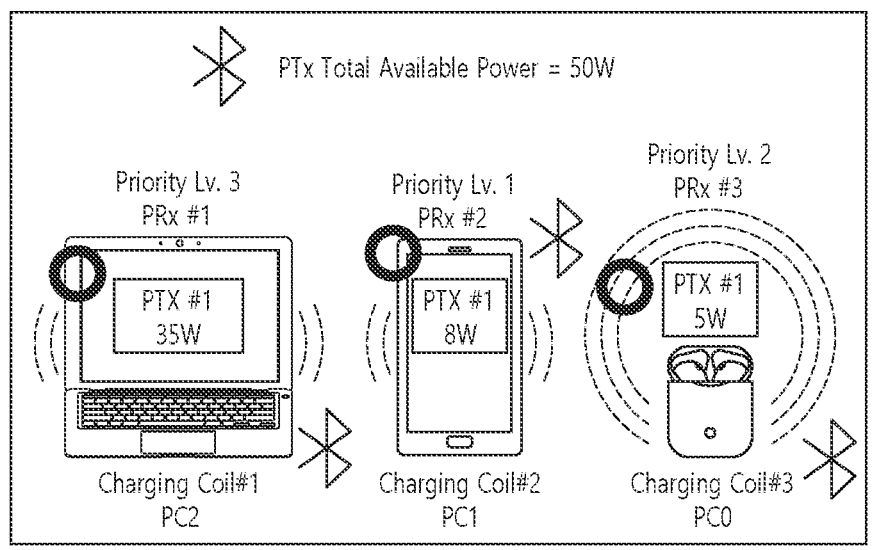

FIGS. 27 and 28 schematically illustrate examples of differential power negotiation and/or power allocation, and examples of data according to these examples.

According to FIG. 27, a wireless power transmitter including three charging coils can transmit wireless power to each of three wireless power receivers. And, in the situation in FIG. 27, an example of data used for negotiation and/or allocation between the wireless power transmitter and the wireless power receiver is shown in FIG. 28.

According to FIG. 28, on 1_pad1 corresponding to charging coil #1, the wireless power transmitter and wireless power receiver can exchange the following data. In the data at this time, for example, the power class through OOB is set to 'PC1', misalignment is set to 'No', FOD is set to 'No', power transfer enable is set to 'Yes', the receiving power (PRX receiving power) of the wireless power receiver is set to '35 W', the power transfer priority (PRX power transfer priority) of the wireless power receiver may be set to 'Level 3'.

In addition, on 1_pad2 corresponding to charging coil #2, the wireless power transmitter and wireless power receiver can exchange the following data. In the data at this time, for example, the power class through OOB is set to 'PC1', misalignment is set to 'No', FOD is set to 'No', power transfer enable is set to 'Yes', the receiving power (PRX receiving power) of the wireless power receiver is set to '8 W', the power transfer priority (PRX power transfer priority) of the wireless power receiver may be set to 'Level 1'.

Additionally, on 2_pad3 corresponding to charging coil #2, the wireless power transmitter and wireless power receiver can exchange the following data. In the data at this time, for example, the power class through OOB is set to 'PC0', misalignment is set to 'No', FOD is set to 'No', power transfer enable is set to 'Yes', the receiving power (PRX receiving power) of the wireless power receiver is set to '5 W', the power transfer priority (PRX power transfer priority) of the wireless power receiver may be set to 'Level 2'.

Meanwhile, information about power transfer priority, that is, negotiation priority, can be exchanged between the wireless power transmitter and wireless power receiver using the following Qi packet. This can be explained through drawings as follows.

FIG. 29 shows an example of a Qi packet to which information about negotiation priority is added.

According to FIG. 29, information about negotiation priority may be named, for example, 'power transfer priority'. And, the Qi packet to which information about negotiation priority is added may be, for example, a packet based on a CFG packet. At this time, the CFG packet may be, for example, a packet transmitted from a wireless power receiver to a wireless power transmitter.

Here, as described above, information about power transfer priority may be transmitted through, for example, BLE OOB. That is, a CFG packet containing information about power transfer priority can be transmitted from the wireless power receiver to the wireless power transmitter through the BLE data field in the BLE packet, for example, as shown in FIG. 22.

Of course, this is only according to one embodiment of the present specification. That is, this specification can also provide an example in which the information about the power transfer priority is transmitted from the wireless power receiver to the wireless power transmitter through a packet in in-band communication (e.g., CFG packet in the configuration phase).

3) Charging Priority/Allocation of Charging Power

Basically, as described above, the wireless power transmitter can receive the charging priority from the wireless power receiver and apply it.

In addition to the above configuration, in this specification, the wireless power transmitter sets/assigns charging priority based on information received from the wireless power receiver, this specification is intended to provide an example in which wireless power is transferred between a wireless power transmitter and a wireless power receiver based on the charging priority assigned by the wireless power transmitter. An example of this may be explained through drawings as follows.

Figure 30:
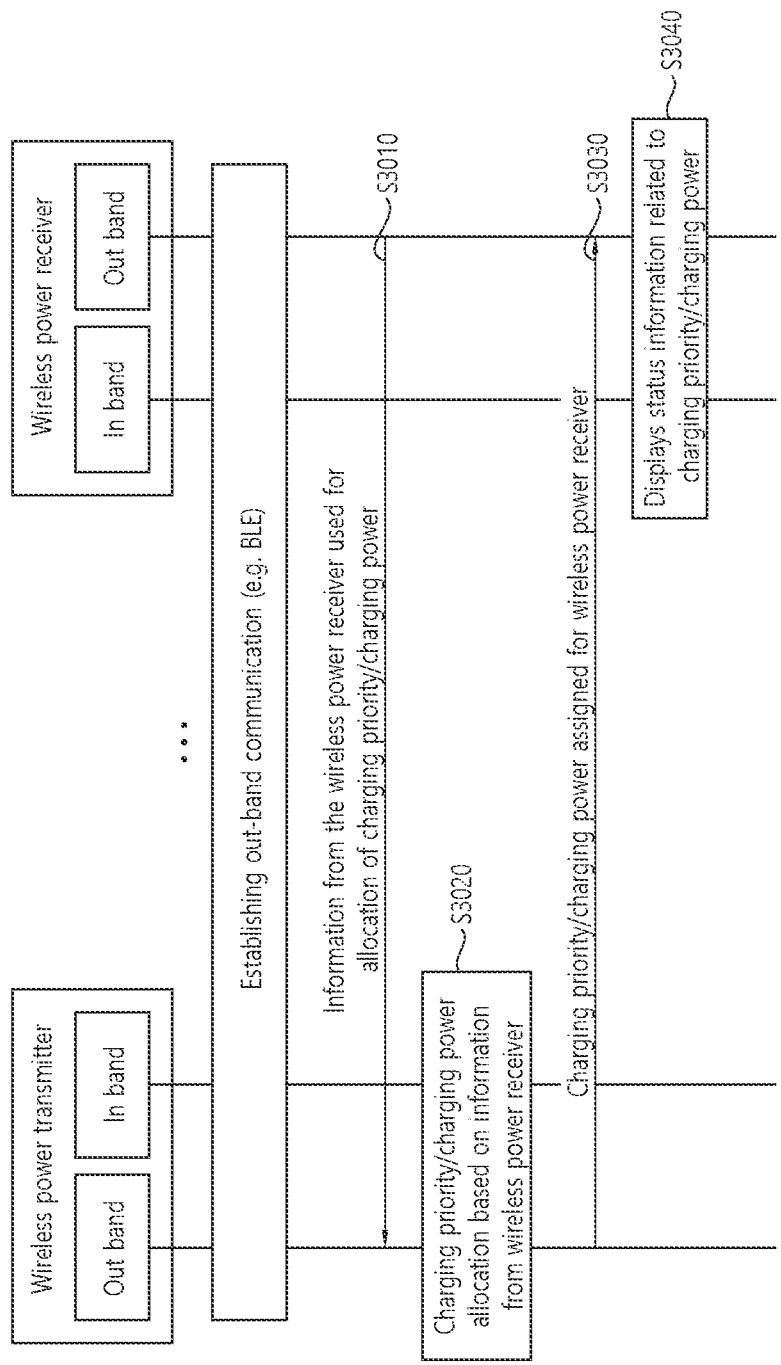
FIG. 30 is a flowchart of a method by which a wireless power transmitter assigns a charging priority to a wireless power receiver, according to an embodiment of the present specification.

FIG. 30 is a flowchart of a method by which a wireless power transmitter assigns a charging priority to a wireless power receiver, according to an embodiment of the present specification.

According to FIG. 30, the wireless power transmitter may receive information about the wireless power receiver used for allocation of charging priority/charging power from the wireless power receiver (S3010). Here, specific examples of the information of the wireless power receiver used for allocation of charging priority/charging power will be described later.

The wireless power transmitter may allocate charging priority/charging power to the wireless power receiver(s) based on the information received from the wireless power receiver (S3020).

Thereafter, the wireless power transmitter may transmit information about the charging priority/charging power assigned to the wireless power receiver to the wireless power receiver (S3030).

Afterwards, the wireless power receiver may display status information related to the above charging priority/charging power to the user (S3040).

Here, although not separately shown, the wireless power receiver may receive additional information from the user instructing to change the charging priority/charging power. In this case, the wireless power receiver may transmit information instructing the wireless power transmitter to change the charging priority/charging power.

Although not separately shown, the wireless power transmitter that receives the information instructing to change the charging priority/charging power as above based on the above instruction information, this can change the charging priority/charging power for the wireless power receiver(s) and apply the changed priority/power.

So far, the configuration in which information related to charging priority/charging power is exchanged between the wireless power transmitter and the wireless power receiver has been described. At this time, it is necessary to additionally define how charging priority/charging power will be determined. Accordingly, the following will explain how charging priority/charging power will be defined.

SoC-Based Priority Setting

The wireless power transmitter can set charging priority based on SoC. And, Qi packets with negotiation priority information added can be exchanged between the wireless power transmitter and the wireless power receiver as described above (the Qi packets at this time can also be transmitted through BLE OOB), at this time, a Qi packet to which negotiation priority information is added may be defined.

At this time, the assignment of charging priority and subsequent procedures can be determined as follows.

i) The wireless power transmitter can assign charging priority.

At this time, the wireless power transmitter may assign charging priority based on information received from the wireless power receiver.

For example, the wireless power transmitter may assign charging priority based on the device type of the wireless power receiver received from the wireless power transmitter. For example, the wireless power transmitter assigns the highest priority to the wireless power receiver corresponding to the smartphone, the following priorities can be assigned to the wireless power receiver corresponding to the earbuds (earphones). Also, the lowest priority can be assigned to the wireless power receiver corresponding to the laptop.

Also, as an example, the wireless power transmitter may assign high priority to a device (wireless power receiver) with high power based on the above information.

As another example, the wireless power transmitter may assign high priority to a device (wireless power receiver) with low power based on the above information.

As another example, the wireless power transmitter may assign high priority to a device (wireless power receiver) with a low current battery power (CHS: Charge status value) based on the above information.

ii) Afterwards, the wireless power transmitter may transmit to each wireless power receiver the priority assigned by the wireless power transmitter to each wireless power receiver.

iii) The wireless power receiver that has received the assigned priority can inform the user of status information, that is, information about priorities among wireless power receivers, charging information for the wireless power receivers, etc., through UI, etc. That is, the wireless power receiver can display the above information and inform the user.

For convenience of understanding, this example may be explained through drawings as follows. In the drawing below, for example, it is assumed that the smartphone has the highest priority, the earbuds have the next priority, and the laptop has the lowest priority.

Figure 32:
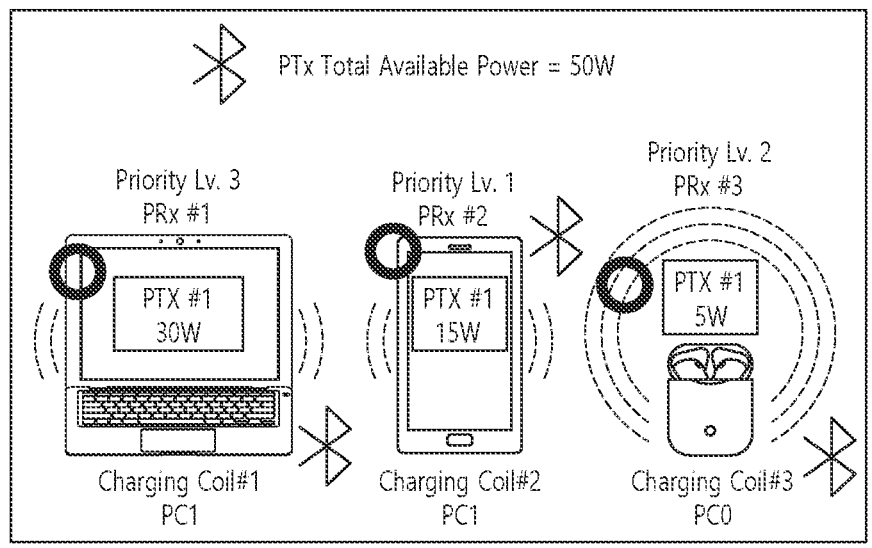

FIGS. 31 and 32 schematically show an example of charging priority allocation based on the device type of the wireless power receiver.

According to the left side of FIG. 31, before power negotiation, the wireless power transmitter can transmit 35 W of power to the first wireless power receiver corresponding to the laptop on 1_pad1 corresponding to charging coil #1. And in this situation, the first wireless power receiver may have power transfer priority level 1.

In addition, before power negotiation, the wireless power transmitter can transmit 15 W of power to the second wireless power receiver corresponding to the smart phone on 1_pad2 corresponding to charging coil #2. And in this situation, the second wireless power receiver may have power transfer priority level 2.

Additionally, before power negotiation, the wireless power transmitter may transmit 0W of power to the third wireless power receiver corresponding to the earbud on 2_pad3 corresponding to charging coil #3. And in this situation, the third wireless power receiver may have power transfer priority level 1.

If your smartphone has the highest priority, your earbuds the next priority, and your laptop the lowest priority, this is not a desirable situation. This is because, even though wireless power is being delivered to the laptop having the lowest priority, wireless power is not being delivered to the earbuds having a relatively high priority.

Accordingly, the wireless power transmitter can set the charging priority based on information received from the wireless power receiver. In other words, the wireless power transmitter can set charging priority and delivery power based on SoC as shown below.

Accordingly, as shown on the right side of FIG. 31, after power negotiation, the wireless power transmitter can transmit 30 W of power to the first wireless power receiver corresponding to the laptop on 1_pad1 corresponding to charging coil #1. And in this situation, the first wireless power receiver may have power transfer priority level 1 as set by the wireless power transmitter.

In addition, after power negotiation, the wireless power transmitter can transmit 15 W of power to the second wireless power receiver corresponding to the smart phone on 1_pad2 corresponding to charging coil #2. And in this situation, the second wireless power receiver may have power transfer priority level 3 as set by the wireless power transmitter.

Additionally, after power negotiation, the wireless power transmitter can transmit 5 W of power to the third wireless power receiver corresponding to the earbud on 2_pad3 corresponding to charging coil #3. And in this situation, the third wireless power receiver may have power transfer priority level 2 as set by the wireless power transmitter.

Accordingly, as shown in FIG. 32, the first wireless power receiver is assigned priority level 1 and can receive 30 W of power. In addition, the second wireless power receiver is assigned priority level 3 and can receive 15 W of power. Finally, the third wireless power receiver is assigned priority level 2 and can receive 5 W of power.

Power Allocation Based on Requested Power Ratio

The wireless power transmitter can allocate power according to the requested power ratio of the wireless power receiver. In addition, Qi packets to which information related to allocated power is added can be exchanged between the wireless power transmitter and the wireless power receiver as described above (the Qi packets at this time can also be transmitted through BLE OOB), at this time, a Qi packet to which information related to allocated power is added may be defined.

At this time, power allocation and follow-up procedures can be determined as follows.

i) The wireless power transmitter may allocate power based on the ratio of the guaranteed power of the wireless power receiver(s) to the total available power.

At this time, an example of the total available power of the wireless power transmitter and the ratio compared to this is explained through the drawings as follows.

FIG. 33 shows an example of power allocation when the total available power of the wireless power transmitter is 50 W.

According to FIG. 33, before negotiations, the requested guaranteed power for the first wireless power receiver may be 30 W, the requested guaranteed power for the second wireless power receiver may be 20 W, and the requested guaranteed power for the third wireless power receiver may be 10 W. And, since the power requested by all wireless power receivers is 60 W, the power requested by the first wireless power receiver is 50% of the total requested power, the power requested by the second wireless power receiver is about 33% of the total requested power, the power requested by the third wireless power receiver may be about 17% of the total requested power.

At this time, although the power requested by all wireless power receivers is 60 W, the total available power of the wireless power transmitter is only 50 W. Accordingly, through negotiation, the wireless power transmitter can determine and allocate wireless power to be received by the wireless power receivers.

Accordingly, for example, after negotiation, the wireless power transmitter allocates 15 W of power to the first wireless power receiver, the wireless power transmitter may allocate 10 W of power to the second wireless power receiver, and the wireless power transmitter may allocate 5 W of power to the third wireless power receiver.

ii) Afterwards, the wireless power transmitter may transmit information about the power (or priority) allocated by the wireless power transmitter to each wireless power receiver to each wireless power receiver.

iii) The wireless power receiver that has received information about the allocated power (or priority) can inform the user of the status information, i.e., information about the allocated power between wireless power receivers, charging information for wireless power receivers, etc. through UI, etc. That is, the wireless power receiver can display the above information and inform the user.

Figure 35:
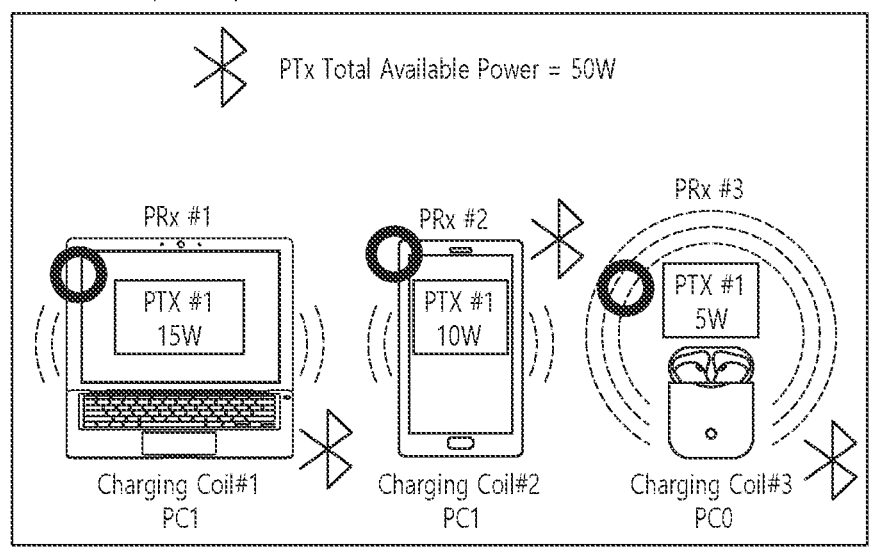

FIGS. 34 and 35 schematically show examples of power allocation based on the requested power of the wireless power receiver.

According to the left side of FIG. 34, before power negotiation, the wireless power transmitter can transmit 30 W of power according to the requested power of the first wireless power receiver on 1_pad1 corresponding to charging coil #1.

In addition, before power negotiation, the wireless power transmitter can transmit 20 W of power on 1_pad2 corresponding to charging coil #2 according to the requested power of the second wireless power receiver.

However, before power negotiation, the wireless power transmitter cannot transmit 10 W of power, corresponding to the requested power of the third wireless power receiver, on 2_pad3, which corresponds to charging coil #3. This is because the wireless power transmitter has transmitted all of its maximum available power to the first wireless power receiver and the second wireless power receiver.

Accordingly, the wireless power transmitter can set the charging priority based on information received from the wireless power receiver. In other words, the wireless power transmitter can reallocate power based on the ratio of power requested by the wireless power receivers as shown below.

Accordingly, as shown on the right side of FIG. 31, after power negotiation, the wireless power transmitter can transmit 15 W of power to the first wireless power receiver on 1_pad1 corresponding to charging coil #1.

In addition, after power negotiation, the wireless power transmitter can transmit 10 W of power to the second wireless power receiver on 1_pad2 corresponding to charging coil #2.

Additionally, after power negotiation, the wireless power transmitter can transmit 5 W of power to the third wireless power receiver on 2_pad3 corresponding to charging coil #3.

Accordingly, as shown in FIG. 35, the first wireless power receiver can receive 15 W of power. In addition, the second wireless power receiver can receive 10 W of power. Finally, the third wireless power receiver can receive 5 W of power.

2. Communication of Wireless Power Transmitter Containing Multiple Charging Coils Hereinafter, the main point of view is that a plurality of charging coils are included in one wireless power transmitter, exchange of information about a plurality of charging coils (for example, through out-of-band communication) between one wireless power transmitter and at least one wireless power receiver will be described. According to the contents below, for example, it can be particularly helpful in solving the problem in problem 2 described above.

In the following description, communication between one wireless power transmitter and one wireless power receiver is mainly described, it may not be emphasized that there are a plurality of wireless power receivers that communicate with the wireless power transmitter. However, this is only a description for convenience of explanation, and in the embodiments of the present specification, one wireless power transmitter can communicate with a plurality of wireless power receivers. Accordingly, embodiments of the present specification can also be applied to the content of exchanging power control information described above.

The following drawings were prepared to explain a specific example of the present specification. Since the names of specific devices or specific signals/messages/fields described in the drawings are provided as examples, the technical features of this specification are not limited to the specific names used in the drawings below.

Figure 36:
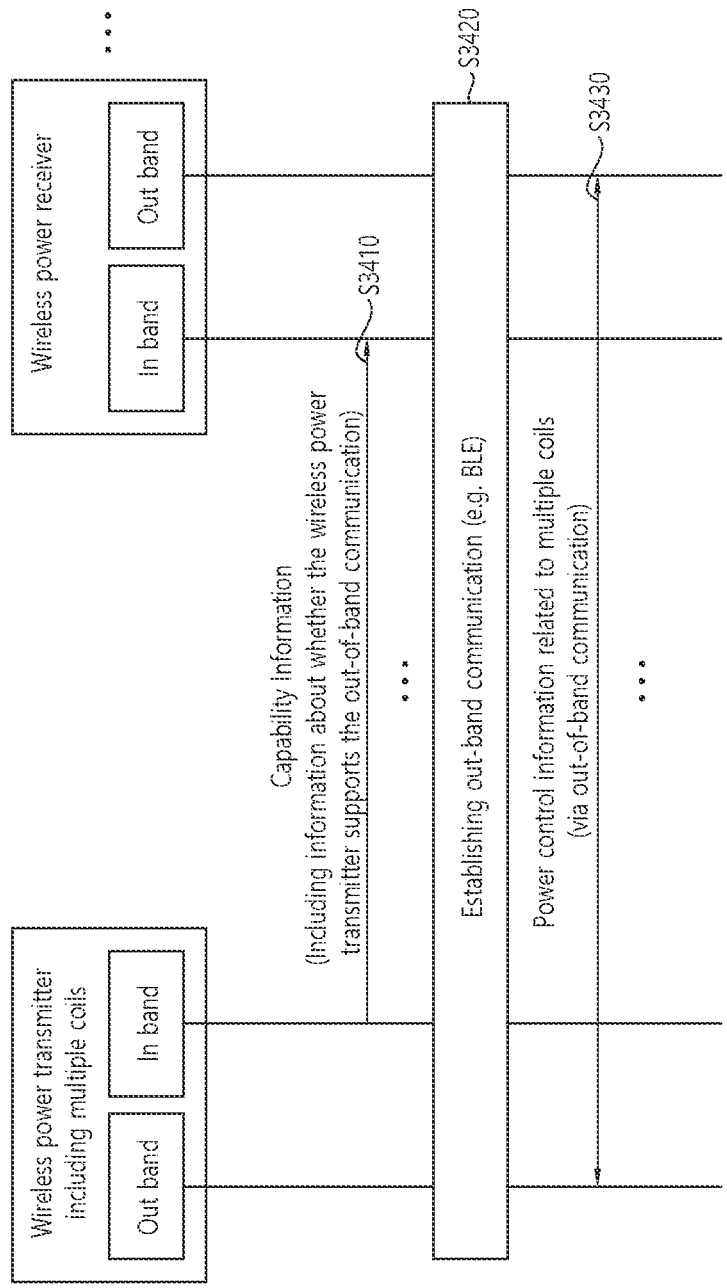
FIG. 36 is a flowchart of a method for establishing out-of-band communication in a wireless power transmission system, according to another embodiment of the present specification.

FIG. 36 is a flowchart of a method for establishing out-of-band communication in a wireless power transmission system, according to another embodiment of the present specification.

According to FIG. 36, the wireless power transmitter may transmit at least one capability information to each of the at least one wireless power receivers through in-band communication (S3610). Here, each of the at least one capability information may include information about whether the wireless power transmitter supports the out-of-band communication. A specific example of this is as described above.

The wireless power transmitter may establish the out-of-band communication with the at least one wireless power receiver based on transmission of the at least one capability information (S3620). The example for this content is also the same as described above.

The wireless power transmitter may exchange power control information related to the plurality of coils with the at least one wireless power receiver through the out-of-band communication (S3630). And a more specific example of this is as follows.

(1) Out-of-Band Communication (e.g. BLE) Packet Structure for Power Control Information Related to Multiple Coils Hereinafter, when the wireless power transmitter and wireless power receiver exchange power control information related to a plurality of coils, this specification explains what the power control information at this time, that is, the out-of-band communication (e.g. BLE) packet structure, is.

Figure 37:
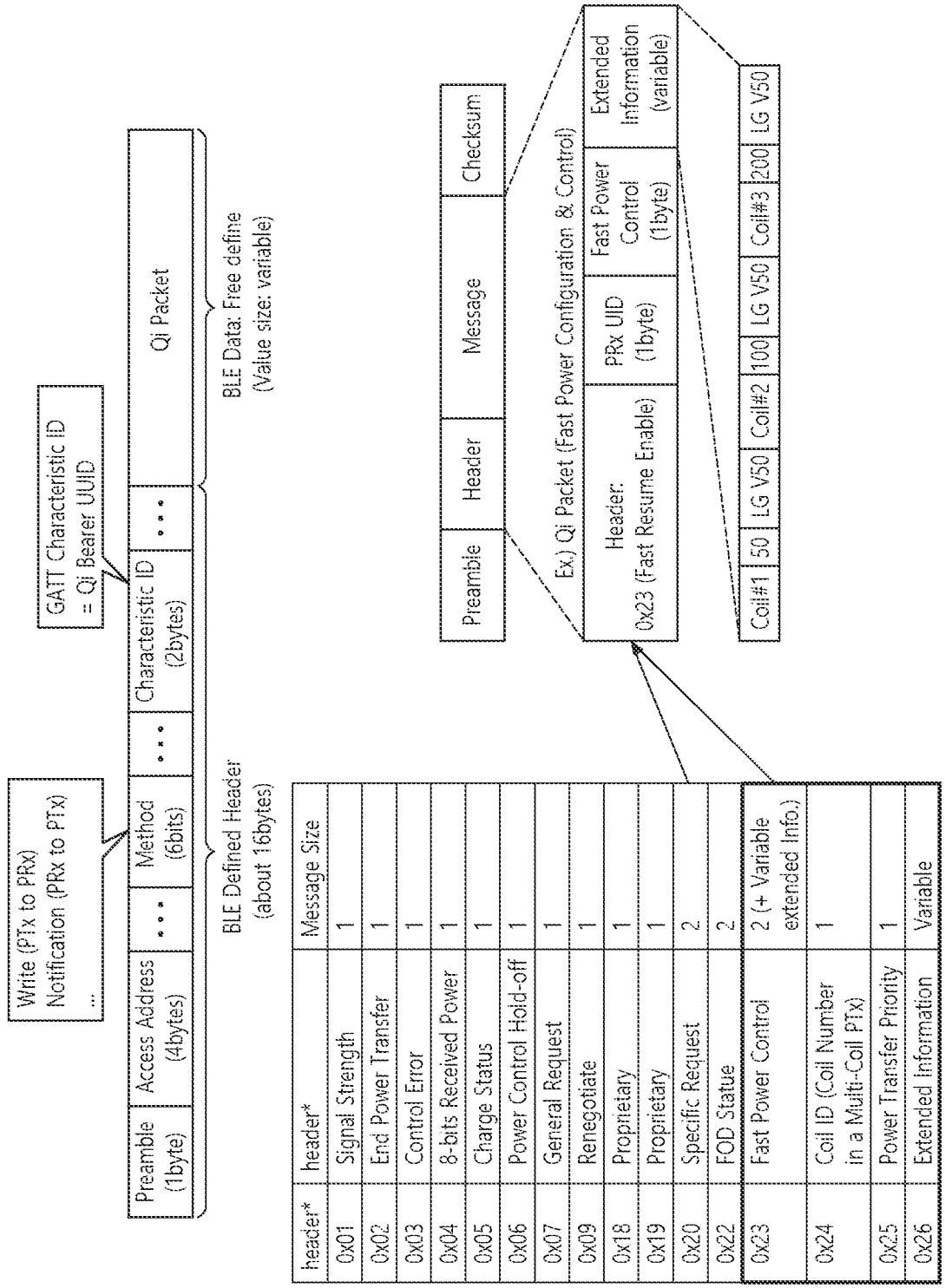
FIG. 37 schematically shows an example of the structure of an out-of-band communication packet for power control information related to a plurality of coils.

FIG. 37 schematically shows an example of the structure of an out-of-band communication packet for power control information related to a plurality of coils.

Basically, the drawing of FIG. 37 is similar to that shown in FIG. 22. However, in FIG. 37, unlike FIG. 22, a specific example of a Qi packet is merely used as a packet for a plurality of coils. Accordingly, the example of FIG. 22 can also be applied to the example of FIG. 37.

According to FIG. 37, the Qi packet may include, for example, information about the signal strength of the wireless power receiver for each of a plurality of coils. For example, in the example in FIG. 37, 'LG V50' corresponding to the wireless power receiver may have a SIG value of 50 for coil #1. In addition, for coil #2 of 'LG V50', SIG may have a value of 100. Additionally, for coil #3 of 'LG V50', SIG may have a value of 200.

That is, according to the example of FIG. 37, the wireless power transmitter can receive the SIG value for each charging coil at once from the wireless power receiver through a BLE packet.

(2) a Protocol Between a Wireless Power Transmitter Including a Plurality of Coils and at Least One Wireless Power Receiver Hereinafter, a protocol that can be applied between a wireless power transmitter including a plurality of coils and at least one wireless power receiver will be described. The protocol at this time may correspond to, for example, a fast coil selection protocol between a multi-coil wireless power transmitter using BLE OOB and one or multiple wireless power receivers.

Figure 38A:
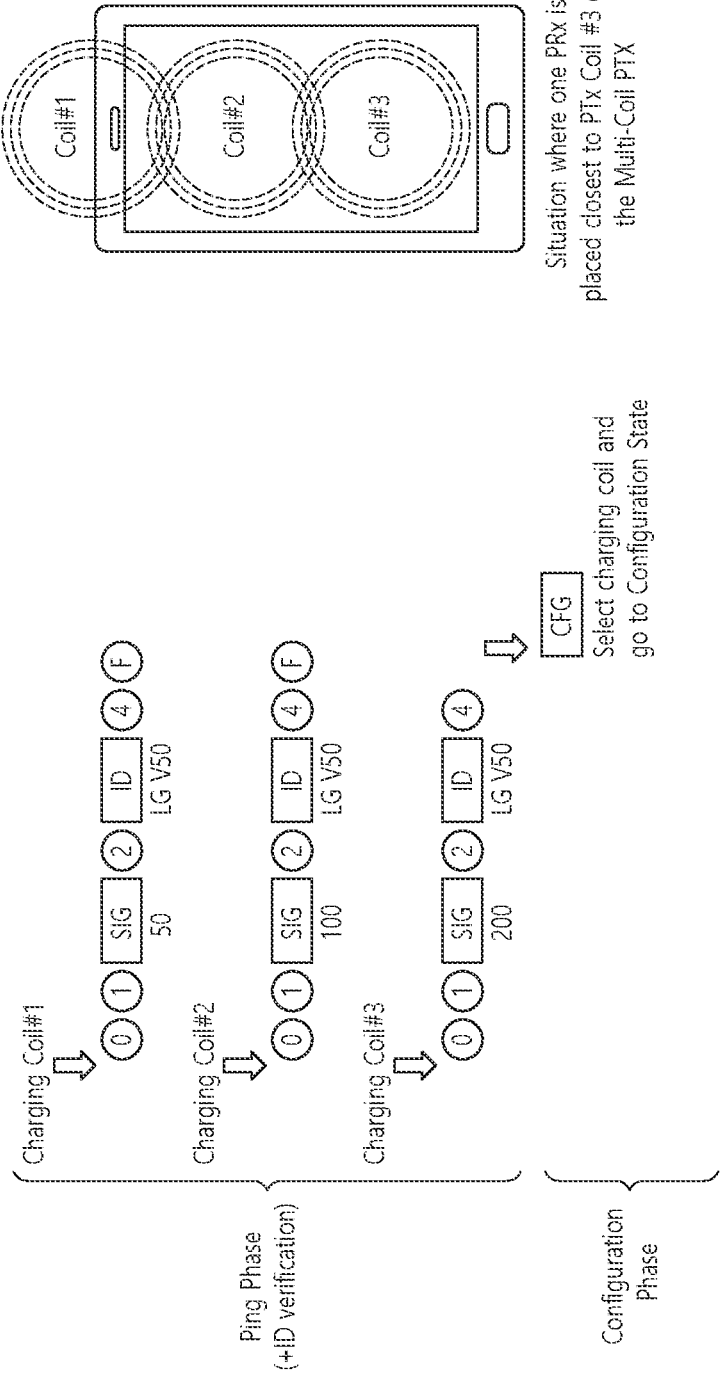
FIGS. 38A and 38B are examples of a method of selecting a coil by a wireless power transmitter including a plurality of coils, according to an embodiment of the present specification.
Figure 38B:
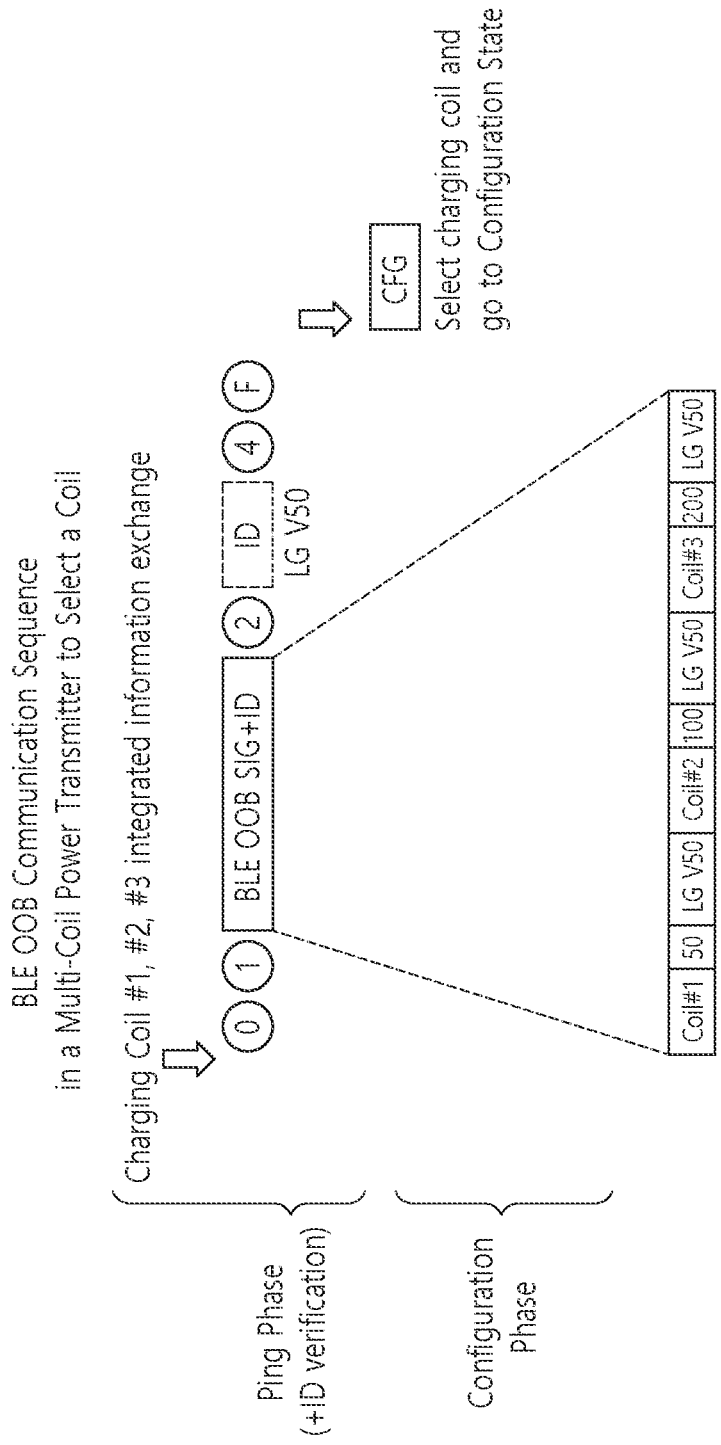

FIGS. 38A and 38B are examples of a method of selecting a coil by a wireless power transmitter including a plurality of coils, according to an embodiment of the present specification.

FIG. 38A shows an example of a wireless power transmitter including a plurality of coils based on an in-band communication sequence selecting a coil. This corresponds to an example explaining problem 2 shown in FIG. 20.

In this case, as explained earlier, a wireless power transmitter that acquires information through a low-speed in-band can only acquire information from one coil at a time, there is a delay in the wireless power transmitter determining the status of multiple coils. Because of this, it may take a long time for the wireless power transmitter to select the optimal coil.

That is, the multi-coil wireless power transmitter sequentially acquires data for coil selection (SIG (Signal Strength), device ID, etc.) for each coil among multiple wireless power receivers through low-speed in-band communication. This may cause delays.

In other words, the wireless power transmitter receives the SIG for charging coil #1 from the wireless power receiver. Afterwards, the wireless power transmitter receives the SIG for charging coil #2 from the wireless power receiver. Once this is complete, the wireless power transmitter receives the SIG for charging coil #3 from the wireless power receiver.

The wireless power transmitter must sequentially obtain the SIG for each coil in the ping phase, but since it performs the subsequent phase, a delay may occur.

Accordingly, in this specification, as shown in FIG. 38B, the wireless power transmitter receives SIGs for several coils at once (in the ping phase) through one BLE data packet, the specification seeks to provide a method for a wireless power transmitter to select a specific coil based on a received BLE packet.

That is, according to the embodiment of the present specification, through Bluetooth OOB, a multi-coil wireless power transmitter can obtain data (SIG (Signal Strength), device ID, etc.) for coil selection between multiple wireless power receivers in one BLE packet. Accordingly, since the wireless power transmitter can quickly acquire multiple coil states at once through BLE OOB, optimal coil selection can be quickly performed.

(3) Definition of Out-of-Band Communication (e.g. BLE) Packet Data for Power Control Information Related to Multiple Coils So far, the specification have described how a wireless power transmitter and a wireless power receiver exchange power control information related to a plurality of coils. Below, it will be explained what information/data is included in the power control information related to the plurality of coils. That is, when the wireless power transmitter supports multiple coils, the multi-coil wireless power transmitter defines data for selecting a coil between one or multiple wireless power receivers (via Bluetooth OOB).

Here, data for selecting a coil may include at least one piece of information and/or data as follows.

Coil number of wireless power transmitter
SIG (signal strength)
ID (wireless power receiver device & manufacturer ID)
Power class
Power delivery priority of wireless power receiver Based on receiving the above data from the wireless power receiver, the wireless power transmitter can obtain SIG from coils around where at least one wireless power transmitter is placed.

Thereafter, the wireless power transmitter selects the coil with the maximum signal strength among the signal strengths (i.e., SIG) obtained by at least each wireless power receiver for each coil as the optimal coil, wireless charging can be started based on the selected coil.

For convenience of understanding, the example described above can be explained through drawings as follows.

Figure 39:
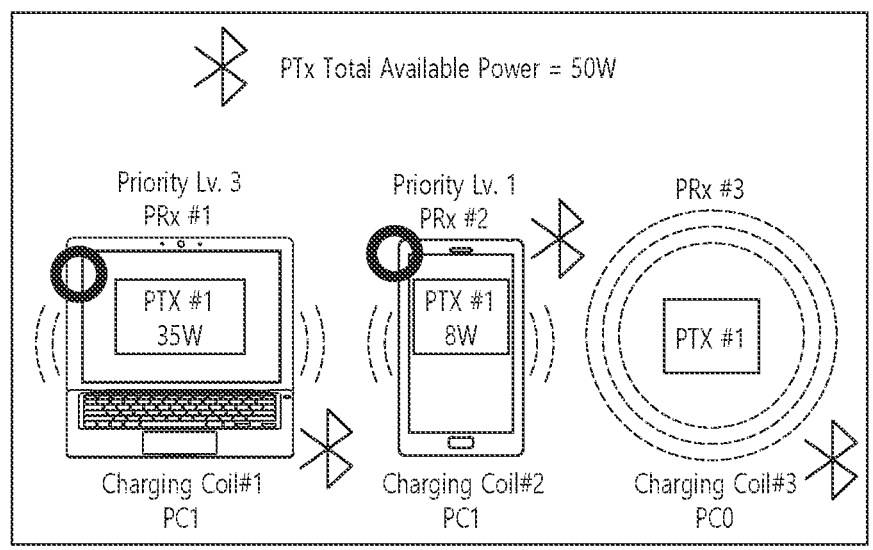

FIGS. 39 and 40 schematically show a conceptual diagram of a wireless power transmitter receiving data for coil selection from at least one wireless power receiver and an example of data for coil selection.

According to FIG. 39, the wireless power transmitter may receive data for coil #1 of the first wireless power receiver (where the data includes the SIG for coil #1), data for coil #2 of the first wireless power receiver (where the data includes SIG for coil #2), data for coil #3 of the first wireless power receiver (where the data includes the SIG for coil #3) from the first wireless power receiver. At this time, as explained previously, data about coil #1 of the first wireless power receiver, data about coil #2 of the first wireless power receiver, and data about coil #3 of the first wireless power receiver can be exchanged through BLE OOB.

In addition, the wireless power transmitter may receive data for coil #1 of the second wireless power receiver (where the data includes SIG for coil #1), data for coil #2 of the second wireless power receiver (where the data includes SIG for coil #2), data for coil #3 of the second wireless power receiver (where the data includes the SIG for coil #3) from the second wireless power receiver. At this time, as explained previously, data about coil #1 of the second wireless power receiver, data about coil #2 of the second wireless power receiver, and data about coil #3 of the second wireless power receiver can be exchanged through BLE OOB.

Likewise, the wireless power transmitter may receive data for coil #1 of the third wireless power receiver (where the data includes SIG for coil #1), data for coil #2 of the third wireless power receiver (where the data includes SIG for coil #2), data for coil #3 of the third wireless power receiver (where the data includes the SIG for coil #3) from a third wireless power receiver. At this time, as explained previously, data about coil #1 of the third wireless power receiver, data about coil #2 of the third wireless power receiver, and data about coil #3 of the third wireless power receiver can be exchanged through BLE OOB.

That is, the wireless power transmitter can receive data for a plurality of coils from at least one wireless power receiver.

According to FIG. 40, the data exchanged in the situation of FIG. 39 may include, for example, at least one of the wireless power transmitter's coil number, signal strength (SIG), ID (wireless power receiver device & manufacturer ID), power class, guaranteed power, and/or power delivery priorities of the wireless power receiver for each of at least one wireless power receiver, as described above.

So far, the embodiments of this specification have been described. Among the drawings for the previously described embodiments, a wireless power transmitter is shown as establishing an out-of-band communication connection with a plurality of wireless power receivers at once (e.g., FIG. 21 and/or FIG. 36, etc.). However, this is just a city for convenience of explanation. That is, according to the present specification, it is also intended to provide a configuration in which a wireless power transmitter establishes an out-band communication connection with a wireless power receiver one by one (However, the embodiments of the present specification do not exclude the wireless power transmitter establishing an out-of-band communication connection with a plurality of wireless power receivers at once).

In this way, the wireless power transmitter establishes out-band communication connections with a plurality of wireless power receivers one by one, an example in which a wireless power transmitter exchanges power control information (e.g., the information described in FIGS. 21 to 40 previously described) with a plurality of wireless power receivers based on connected out-of-band communication may be described with reference to the drawings.

FIG. 41 is a flowchart of a method for establishing out-of-band communication in a wireless power transmission system, according to another embodiment of the present specification.

According to FIG. 41, the wireless power transmitter may transmit capability information to the first wireless power receiver through in-band (S4110). Here, the capability information at this time may include information about whether the wireless power transmitter supports out-band communication.

The wireless power transmitter may establish out-of-band communication with the first wireless power receiver based on capability information (S4120).

Thereafter, the wireless power transmitter may exchange power control information with the first wireless power receiver through out-of-band communication (S4130). The power control information here is the same as described above. For example, the power control information may include information about the priority described above, and the power control information may also include the SIG for each of the plurality of coils described above. In addition, the power control information may also include other information described above.

The wireless power transmitter may transmit capability information to the second wireless power receiver through in-band (S4140). Here, the capability information at this time may include information about whether the wireless power transmitter supports out-band communication.

The wireless power transmitter may establish out-of-band communication with the second wireless power receiver based on capability information (S4150).

Afterwards, the wireless power transmitter can exchange power control information with the second wireless power receiver through out-of-band communication (S4160). The power control information here is the same as described above. For example, the power control information may include information about the priority described above, and the power control information may also include the SIG for each of the plurality of coils described above. In addition, the power control information may also include other information described above.

Hereinafter, embodiments of the present specification will be described again from the viewpoint of various subjects.

The following drawings were prepared to explain a specific example of the present specification. Since the names of specific devices or specific signals/messages/fields described in the drawings are provided as examples, the technical features of this specification are not limited to the specific names used in the drawings below.

Figure 42:
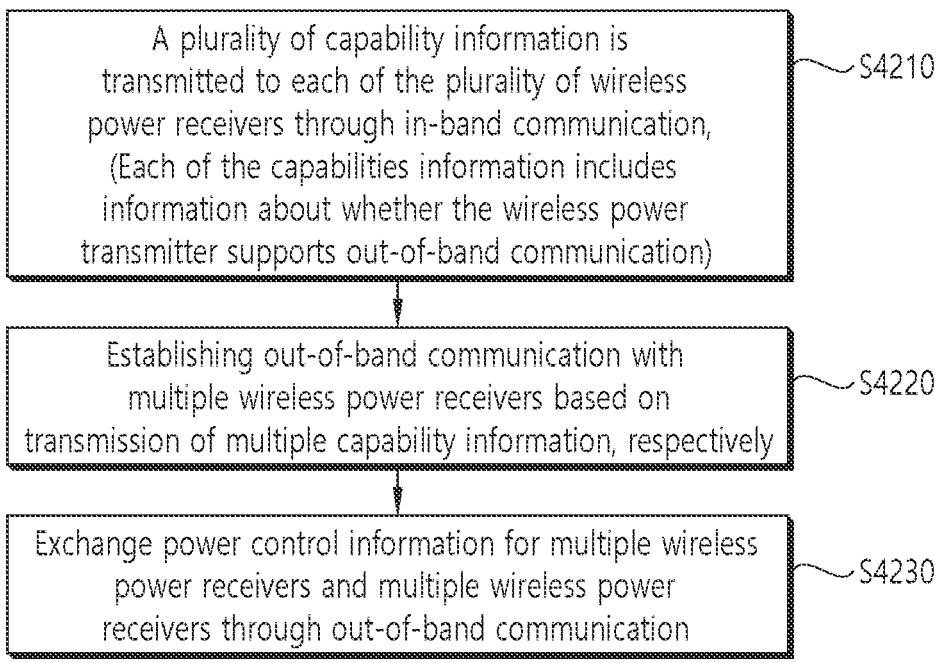
FIG. 42 is a flowchart of a method for establishing out-of-band communication performed by a wireless power transmitter, according to an embodiment of the present specification.

FIG. 42 is a flowchart of a method for establishing out-of-band communication performed by a wireless power transmitter, according to an embodiment of the present specification.

According to FIG. 42, the wireless power transmitter may transmit a plurality of capability information to each of a plurality of wireless power receivers through in-band communication (S4210). Here, each of the capability information may include information about whether the wireless power transmitter supports the out-band communication. In addition, the method is characterized in that the wireless power transmitter includes a plurality of coils.

The wireless power transmitter may establish the out-of-band communication with the plurality of wireless power receivers based on transmission of the plurality of capability information (S4220).

The wireless power transmitter may exchange power control information for the plurality of wireless power receivers with the plurality of wireless power receivers through the out-of-band communication (S4230).

Since specific examples of the above configurations have been described previously, the examples described above will be summarized and explained below.

For example, exchanging the power control information may include the wireless power transmitter performing renegotiation of a power transfer contract.

At this time, performing the renegotiation includes receiving requested load power from at least one wireless power receiver among the plurality of wireless power receivers, it may include determining a guaranteed load power for the at least one wireless power receiver based on the requested load power and performing power transfer based on the guaranteed load power.

For example, exchanging the power control information may include the wireless power transmitter exchanging information about charging priority.

At this time, exchanging information about the charging priority may include receiving information about charging priorities for each of the plurality of wireless power receivers from the plurality of wireless power receivers and performing power transfer based on the information about the charging priorities.

In addition, the wireless power transmitter may renegotiate the power transfer contract based on information about the charging priority, and the wireless power transmitter may perform the power transfer based on the renegotiation.

Also at this time, exchanging information about the charging priority assigns the charging priority to the plurality of wireless power receivers, it may include transmitting information about the charging priority to at least one wireless power receiver among the plurality of wireless power receivers. In addition, the wireless power transmitter may assign the charging priority based on at least one of i) device type, ii) required power of the device, or iii) battery power.

Here, in response to the transmission of the information about the charging priority, the wireless power transmitter may receive information about the user-set charging priority from the at least one wireless power receiver.

Meanwhile, the wireless power transmitter may receive charging priority information from the wireless power receiver through the in-band.

As previously described, the in-band communication may be communication based on a power signal of wireless power, and the out-band communication may be communication based on Bluetooth.

Although not separately shown, embodiments according to the present specification may provide a wireless power transmitter. At this time, the wireless power transmitter may include a power converter involved in transferring wireless power to a plurality of wireless power receivers, and a communicator/controller involved in communicating with the plurality of wireless power receivers and controlling the transfer of the wireless power. Here, the communicator/controller may be configured to transmit a plurality of capability information to each of the plurality of wireless power receivers through in-band communication, each of the capability information includes information about whether the wireless power transmitter supports out-band communication, configured to respectively establish the out-of-band communication with the plurality of wireless power receivers based on transmission of the plurality of capability information, and configured to exchange power control information about the plurality of wireless power receivers with the plurality of wireless power receivers through the out-of-band communication.

Figure 43:
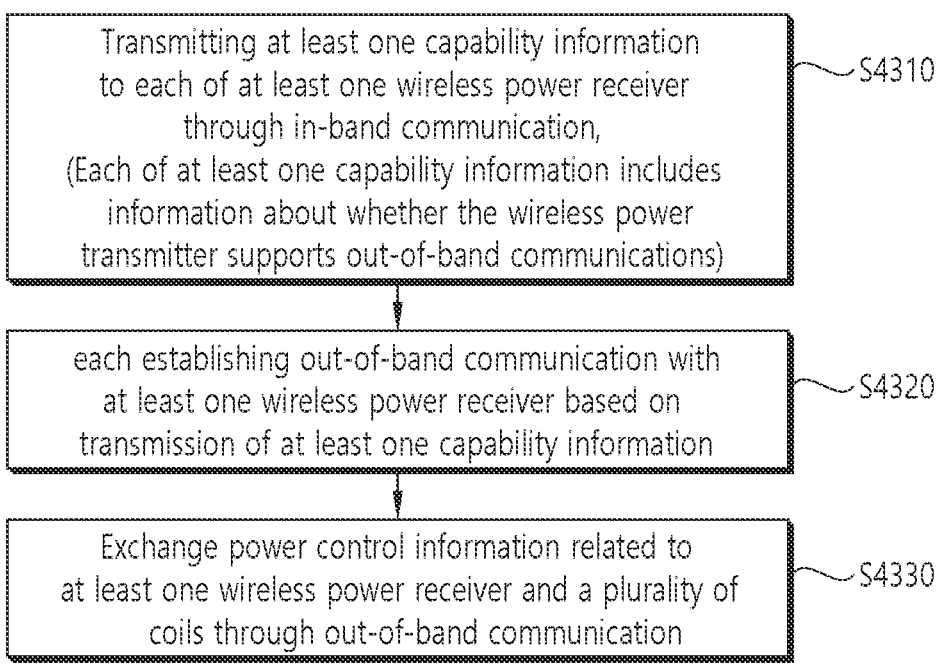
FIG. 43 is a flowchart of a method for establishing out-of-band communication performed by a wireless power transmitter according to another embodiment of the present specification.

FIG. 43 is a flowchart of a method for establishing out-of-band communication performed by a wireless power transmitter according to another embodiment of the present specification.

According to FIG. 43, the wireless power transmitter may transmit at least one capability information to each of the at least one wireless power receivers through in-band communication (S4310). Here, each of the at least one capability information may include information about whether the wireless power transmitter supports the out-of-band communication.

The wireless power transmitter may establish the out-of-band communication with the at least one wireless power receiver based on transmission of the at least one capability information (S4320).

The wireless power transmitter may exchange power control information related to the plurality of coils with the at least one wireless power receiver through the out-of-band communication (S4330).

Since specific examples of the above configurations have been described previously, the examples described above will be summarized and explained below.

For example, the wireless power transmitter transmits information about the plurality of coils to the at least one wireless power receiver through the in-band, the information about the plurality of coils may include ID information about each of the plurality of coils.

Here, the wireless power transmitter receives the power control information from the at least one wireless power receiver, the power control information may include information about a plurality of power levels of the at least one wireless power receiver for each of the plurality of coils.

At this time, the wireless power transmitter selects a specific coil with the maximum power level among the plurality of coils based on the power control information, the wireless power transmitter may transmit power to the at least one wireless power receiver based on the specific coil.

Meanwhile, the power control information may include information about the charging priority of the at least one wireless power receiver. In addition, the power control information may include an ID for the at least one wireless power receiver.

Although not separately shown, an embodiment according to the present specification may provide a wireless power transmitter including a plurality of coils. At this time, the wireless power transmitter including a plurality of coils may include a power converter involved in transferring wireless power to at least one wireless power receiver and a communicator/controller involved in communicating with the at least one wireless power receiver and controlling the transfer of the wireless power. Here, the communicator/controller may be configured to transmit at least one capability information to each of the at least one wireless power receiver through in-band communication, each of the at least one capability information includes information about whether the wireless power transmitter supports out-band communication, configured to establish the out-of-band communication with the at least one wireless power receiver based on transmission of the at least one capability information, respectively, and configured to exchange power control information related to the at least one wireless power receiver and the plurality of coils through the out-of-band communication.

So far, the embodiments of this specification have been described. And, according to the embodiment described above, the following effects may occur. In order to explain the effects of the embodiments of the present specification, the effects of the present specification will be largely described from two perspectives.

Solution Perspective for Problem 1

In the current case, one wireless power transmitter does not support communication for power charging with multiple wireless power receivers. For this reason, as explained in Problem 1, when wireless power receivers request power exceeding the total available power of the wireless power transmitter, the wireless power transmitter cannot transmit power to a specific wireless power receiver.

In contrast, according to an embodiment of the present specification, one wireless power transmitter supports power (re)negotiation with a plurality of wireless power receivers, even if the wireless power receivers request power that exceeds the total available power of the wireless power transmitter, it becomes possible for a wireless power transmitter to appropriately distribute wireless power.

In particular, in the embodiments of this specification, the fact that charging priorities are defined between wireless power transmitters and wireless power receivers maximizes the effect of the configuration provided in this specification.

For that reason, in the conventional case, when a wireless power receiver with high priority later requests power transfer from a wireless power transmitter, this is because there have been cases where wireless power cannot be received from the wireless power transmitter even though the wireless power receiver above has high priority.

However, the wireless power transmitter of the present specification performs power renegotiation with other wireless power receivers so that the wireless power receiver with high priority can receive power distribution, a situation in which a wireless power receiver with high priority does not receive wireless power can be prevented.

In particular, the above exchange of information about priorities and/or renegotiation of power is not performed over in-band, which has a slower communication speed, the fact that the communication is performed through out-of-band communication (e.g., BLE communication) with a high communication speed may correspond to an additional effect of the present specification.

Solution Perspective for Problem 2

In addition, when information about coils is exchanged between a wireless power transmitter and at least one wireless power receiver through in-band communication, as with Problem 2, a significant delay occurred in selecting an optimized coil between the wireless power transmitter and the wireless power receiver.

The reason why the above delay occurs is because currently only one-to-one communication is supported between the wireless power transmitter and the wireless power receiver. That is, under one-to-one communication, information related to each coil must be exchanged one by one between the wireless power transmitter and the wireless power receiver.

In contrast, according to the embodiment of the present specification, one-to-many (or many-to-many) communication is supported between the wireless power transmitter and the wireless power receiver. Because of this, the wireless power transmitter in this specification can receive information about each of a plurality of coils at once from the wireless power receiver, the time for a wireless power transmitter to select an optimal coil among a plurality of coils can be minimized.

In particular, the exchange of information about the coil as above is not performed through in-band, which has a slow communication speed, the fact that the communication is performed through out-of-band communication (e.g., BLE communication) with a high communication speed may correspond to an additional effect of the present specification.

Effects obtainable through specific examples of the present specification are not limited to the effects listed above. For example, there may be various technical effects that a person having ordinary skill in the related art can understand or derive from this specification. Accordingly, the specific effects of the present specification are not limited to those explicitly described in the present specification, and may include various effects that can be understood or derived from the technical features of the present specification.

The claims set forth herein can be combined in a variety of ways. For example, the technical features of the method claims of this specification may be combined to be implemented as a device, and the technical features of the device claims of this specification may be combined to be implemented as a method. In addition, the technical features of the method claims of the present specification and the technical features of the device claims may be combined to be implemented as a device, and the technical features of the method claims of the present specification and the technical features of the device claims may be combined to be implemented as a method.

What is claimed is:

1. A method for establishing out-band communication in a wireless power transfer system, the method performed by a wireless power transmitter and comprising:
   transmitting a plurality of capability information to each of a plurality of wireless power receivers through in-band communication, respectively,
   wherein each of the plurality of the capability information includes information for whether the wireless power transmitter supports the out-band communication;
   establishing the out-band communication with the plurality of the wireless power receivers based on transmitting the plurality of capability information, respectively; and
   exchanging power control information for the plurality of the wireless power receivers with the plurality of the wireless power receivers through the out-band communication,
   wherein the exchanging the power control information includes performing renegotiation of a power transfer contract.

2. The method of claim 1, wherein the performing the renegotiation includes:
   receiving a requested load power from at least one wireless power receiver among the plurality of wireless power receivers;
   determining a guaranteed load power for the at least one wireless power receiver based on the requested load power; and
   performing a power transfer based on the guaranteed load power.

3. The method of claim 1, wherein the exchanging the power control information includes exchanging information for charging priority.

4. The method of claim 3, wherein the exchanging the information for the charging priority includes:
   receiving information for the charging priority for each of the plurality of the wireless power receivers from the plurality of the wireless power receivers; and
   performing a power transfer based on the information for the charging priority.

5. The method of claim 4, wherein the wireless power transmitter performs renegotiation of a power transfer contract based on the information for the charging priority,
   wherein the wireless power transmitter performs the power transfer based on the renegotiation.

6. The method of claim 3, wherein the exchanging the information for the charging priority includes:
   assigning the charging priority to the plurality of the wireless power receivers;
   transmitting the information for the charging priority to at least one wireless power receiver among the plurality of the wireless power receivers.

7. The method of claim 6, wherein in response to the transmitting of the information for the charging priority, the wireless power transmitter receives information for a user-set charging priority from the at least one wireless power receiver.

8. The method of claim 6, wherein the wireless power transmitter assigns the charging priority based on at least one of i) device type, ii) required power of the device, or iii) battery power.

9. The method of claim 1, wherein the wireless power transmitter receives charging priority information from the wireless power receiver through the in-band communication.

10. The method of claim 1, wherein the in-band communication includes communication based on a power signal of wireless power, and
    wherein the out-band communication is Bluetooth-based communication.

11. The method of claim 1, wherein the wireless power transmitter includes a plurality of coils.

12. A wireless power transmitter, comprising:
    a power converter related to transferring wireless power to a plurality of wireless power receivers; and
    a communicator/controller related to communicating with the plurality of the wireless power receivers and controlling transfer of the wireless power,
    wherein the wireless power transmitter is configured to:
    transmit a plurality of capability information to each of the plurality of the wireless power receivers through in-band communication, respectively,
    wherein each of the plurality of the capability information includes information for whether the wireless power transmitter supports out-band communication;
    establish the out-band communication with the plurality of the wireless power receivers based on transmitting the plurality of capability information, respectively; and
    exchange power control information for the plurality of the wireless power receivers with the plurality of the wireless power receivers through the out-band communication,
    wherein the exchanging the power control information includes performing renegotiation of a power transfer contract.

13. A method for establishing out-band communication in a wireless power transfer system, the method performed by a wireless power transmitter including a plurality of coils and comprising:
    transmitting at least one capability information to each of at least one wireless power receiver through in-band communication, respectively,
    wherein each of the at least one capability information includes information for whether the wireless power transmitter supports the out-band communication;
    establishing the out-of-band communication with the at least one wireless power receiver based on transmitting of the at least one capability information, respectively; and
    exchanging power control information related to the at least one wireless power receiver and the plurality of coils through the out-band communication,
    wherein the exchanging the power control information includes performing renegotiation of a power transfer contract.

14. The method of claim 13, wherein the wireless power transmitter transmits information for the plurality of the coils to the at least one wireless power receiver through the in-band communication,
    wherein the information for the plurality of the coils includes ID information for each of the plurality of coils.

15. The method of claim 14, wherein the wireless power transmitter receives the power control information from the at least one wireless power receiver, wherein the power control information includes information for a plurality of power levels of the at least one wireless power receiver for each of the plurality of the coils.

16. The method of claim 15, wherein the wireless power transmitter selects a specific coil having a maximum power level among the plurality of the coils based on the power control information, wherein the wireless power transmitter performs power transfer to the at least one wireless power receiver based on the specific coil.

17. The method of claim 15, wherein the power control information includes information for a charging priority of the at least one wireless power receiver.

18. The method of claim 15, wherein the power control information includes an ID for the at least one wireless power receiver.

* * * * *